(12) United States Patent
Wajs et al.

(10) Patent No.: US 10,417,399 B2
(45) Date of Patent: Sep. 17, 2019

(54) ACCESSING A SECURED SOFTWARE APPLICATION

(71) Applicant: IRDETO B.V., Hoofddorp (NL)

(72) Inventors: Andrew Augustine Wajs, Hoofddorp (NL); John Wimer, Hoofddorp (NL); Dmitri Jarnikov, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 262 days.

(21) Appl. No.: 15/502,199

(22) PCT Filed: Aug. 21, 2015

(86) PCT No.: PCT/EP2015/069294
§ 371 (c)(1),
(2) Date: Feb. 6, 2017

(87) PCT Pub. No.: WO2016/026972
PCT Pub. Date: Feb. 25, 2016

(65) Prior Publication Data
US 2017/0228525 A1    Aug. 10, 2017

Related U.S. Application Data

(63) Continuation of application No. PCT/EP2014/067841, filed on Aug. 21, 2014.

(51) Int. Cl.
*G06F 21/00* (2013.01)
*G06F 21/16* (2013.01)
(Continued)

(52) U.S. Cl.
CPC ............ *G06F 21/16* (2013.01); *G06F 21/105* (2013.01); *G06F 21/36* (2013.01); *G06T 1/0021* (2013.01);
(Continued)

(58) Field of Classification Search
None
See application file for complete search history.

(56) References Cited

U.S. PATENT DOCUMENTS

| 7,171,558 B1 * | 1/2007 | Mourad | G06F 21/10 705/53 |
| 2004/0054894 A1 * | 3/2004 | Lambert | G06F 21/10 713/165 |

(Continued)

FOREIGN PATENT DOCUMENTS

| WO | 2016/026532 A1 | 2/2016 |
| WO | 2016/026972 A1 | 2/2016 |

OTHER PUBLICATIONS

Mohanty, M. et al., "Media Data Protection during Execution on Mobile Platforms—A Review," SICS Technical Report: T2014:02, Jul. 4, 2014, pp. 1-31.

(Continued)

*Primary Examiner* — Shin-Hon (Eric) Chen
(74) *Attorney, Agent, or Firm* — Rimon PC

(57) ABSTRACT

There is described a method for a first software application to access a secured software application on a computing device. The first software application is not configured to interface with the secured software application. The computing device includes an interfacing application configured to interface with the secured software application. The method comprises the first software application interfacing with the interfacing application to thereby cause the interfacing application to access the secured software application. The first software application is configured to interface with the interfacing application.

There is also described a method of generating an encrypted version of an image using a library of pre-encrypted blocks of data, the same content encryption key having been used to encrypt each of the pre-encrypted blocks of data. The (Continued)

method comprises forming the encrypted version of the image from an ordered sequence of pre-encrypted blocks of data from the library, wherein each pre-encrypted block of data in the ordered sequence corresponds to a respective sub-image of a plurality of sub-images making up the image.

There are also described corresponding computing devices, computer programs and computer-readable media.

32 Claims, 23 Drawing Sheets

(51) Int. Cl.
| | |
|---|---|
| G06F 21/36 | (2013.01) |
| H04L 9/32 | (2006.01) |
| H04N 21/254 | (2011.01) |
| H04W 12/06 | (2009.01) |
| G06F 21/10 | (2013.01) |
| G06T 1/00 | (2006.01) |
| G06F 21/84 | (2013.01) |

(52) U.S. Cl.
CPC ....... *H04L 9/3226* (2013.01); *H04N 21/2541* (2013.01); *H04W 12/06* (2013.01); *G06F 21/10* (2013.01); *G06F 21/84* (2013.01); *G06F 2221/0737* (2013.01); *G06F 2221/0753* (2013.01); *H04L 2209/603* (2013.01)

(56) References Cited

U.S. PATENT DOCUMENTS

| | | | |
|---|---|---|---|
| 2005/0094808 A1 | 5/2005 | Pedlow, Jr. et al. | |
| 2007/0011718 A1 | 1/2007 | Nee, Jr. | |
| 2007/0143624 A1 | 6/2007 | Steeves | |
| 2010/0166054 A1 | 7/2010 | Wirick | |
| 2012/0023590 A1* | 1/2012 | Rothschild | G06F 21/55 726/27 |
| 2013/0301830 A1 | 11/2013 | Bar-El et al. | |
| 2014/0047557 A1* | 2/2014 | Veerubhotla | G06F 21/10 726/28 |
| 2015/0026452 A1* | 1/2015 | Roelse | H04L 63/0428 713/150 |
| 2015/0095376 A1* | 4/2015 | Pathak | G06F 21/10 707/784 |
| 2015/0222633 A1* | 8/2015 | Smith | H04L 63/10 726/29 |

OTHER PUBLICATIONS

Anupkumar, N. N. et al., "Image Encryption based on FEAL algorithm," International Journal of Advances in Computer Science and Technology, vol. 2, No. 3, Mar. 2013, pp. 14-20.
International Search Report and Written Opinion for International Patent Application No. PCT/EP2015/069294 dated Jan. 7, 2016.
International Search Report and Written Opinion for International Patent Application No. PCT/EP2014/067841 dated Jun. 22, 2015.
mmunication Pursuant to Article 94(3) Epc for European Application No. 15759696.6 dated Apr. 25, 2019.

* cited by examiner

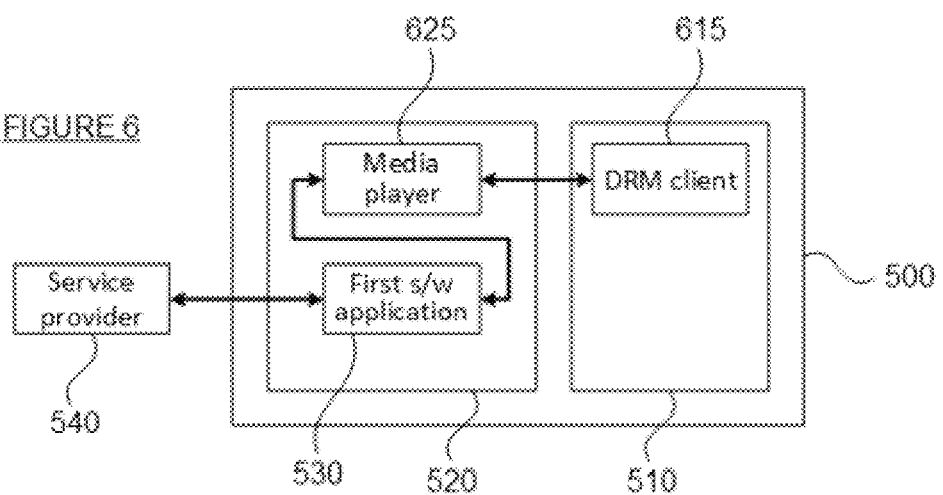

ACCESSING A SECURED SOFTWARE APPLICATION

RELATED APPLICATION DATA

This application is a National Stage of International Patent Application No. PCT/EP2015/069294, filed Aug. 21, 2015, which is a continuation of International Patent Application No. PCT/EP2014/067841, filed Aug. 21, 2014, the disclosure of which is hereby incorporated by reference in its entirety.

FIELD OF THE INVENTION

The present invention relates to methods, computer devices, computer programs and computer-readable media for enabling a first software application to access a secured software application on a computing device.

The present invention further relates to methods, computer devices, computer programs and computer-readable media for generating an encrypted version of an image.

BACKGROUND OF THE INVENTION

A computing device (such as a client device) includes an application processing module for execution and storage of non-protected "normal" client software applications. The computing device may also include a secured processing module for execution and storage of one or more trusted software applications. A trusted software application generally has an associated client application in the application processing module which is configured to interface with the trusted application in the secured processing module. The protection facilities in the secured processing module are only available to trusted applications and their associated client applications. In particular, the functionality and capabilities of existing trusted applications are currently not available to other normal applications in the application processing module of the computing device. This is especially problematic in implementations where it is not possible to install new trusted applications or to extend existing trusted applications with new functionality. The present invention seeks to overcome this problem.

SUMMARY OF THE INVENTION

In essence, embodiments of the invention relate to a software application operating in an application processing module that uses an existing client application to invoke a secured trusted application (e.g. a trusted application in a secured processor module) to gain access to the functionality of the trusted application.

According to a first aspect of the present invention, there is provided a method for a first software application to access a secured software application on a computing device. The first software application is not configured to interface with the secured software application. The computing device includes an interfacing application configured to interface with the secured software application. The method comprises the first software application interfacing with the interfacing application to thereby cause the interfacing application to access the secured software application. The first software application is configured to interface with the interfacing application.

Thus, the first software application uses the interfacing application to indirectly access the functionality of the secured software application, which would not otherwise be available to it. This enables the first software application, by means of the interfacing application, to use the security infrastructure of the secured software application to e.g. gain access to a secured peripheral such as a display, a keyboard, a mouse, a speaker etc.

In one advantageous embodiment, the secured software application is a DRM client and the interfacing application is a media player application such that the method comprises the first software application sending DRM-protected content to the media player application to thereby cause the media player application to access the DRM client so as to enable rendering of the DRM-protected content on the computing device. The DRM client may be configured to prevent and/or restrict other software applications executing on the computing device from accessing the DRM-protected content. The DRM-protected content may comprise a shared secret known by a provider of the first software application and by a user of the first software application. This enables the user to verify that the rendered DRM-protected content derives from the provider of the first software application.

In another embodiment, the computing device comprises an input device for obtaining a user input. The secured software application is configured to securely obtain the user input from the input device such that the method comprises the first software application interfacing with the interfacing application to thereby cause the interfacing application to access the secured software application so as to securely obtain the user input from the input device. The secured software application is configured to prevent other software applications on the computing device from accessing the user input obtained from the input device. The input device may be one of a fingerprint sensor, a touchscreen, a camera, a microphone, a mouse, and a keypad.

Advantageously, the secured software application is secured by means of software obfuscation and/or node-locking and/or isolation provided by the computing device operating system and/or secure loading by the computing device operating system. In one embodiment, the secured software application is secured by means of the secured software application being configured to execute in a secured module of the computing device, the first software application and the interfacing application not being configured to execute in the secured module.

There are many applications of the first aspect of the present invention, particularly when the secured software application is a DRM client and the interfacing application is a media player such that the first software application may leverage the secure video path of the device. Specific applications include robot avoidance, verification of user identity, secure transactions, secure code generation, secure document editing, secure video conferencing, and integrity of display. In each case, there is the possibility of generating the DRM-protected content locally on the device, or alternatively using a client-server implementation whereby the DRM-protected content is generated at a server. The local embodiments mostly involve the use of whitebox encryption. However, in the secure code generation application, it is possible to generate the DRM-protected code content locally without the use of whitebox encryption. This idea forms the basis for another aspect of the invention, as described below.

According to a second aspect of the invention, there is described a method of generating an encrypted version of an image using a library of pre-encrypted blocks of data, the same content encryption key having been used to encrypt each of the pre-encrypted blocks of data. The method comprises forming the encrypted version of the image from an ordered sequence of pre-encrypted blocks of data from the library, wherein each pre-encrypted block of data in the ordered sequence corresponds to a respective sub-image of a plurality of sub-images making up the image.

The method may further comprise packaging the encrypted version of the image with an encrypted version of the content encryption key to form a DRM-protected version of the image.

The image may comprise a machine-readable code (e.g. a QR code) and/or a keypad.

Each block of data in the ordered sequence of pre-encrypted blocks of data may form a respective slice of an I-frame in the encrypted version of the image.

Each block of data in the library of pre-encrypted blocks of data may represent a sub-image of n×m pixels, where n and m are integers.

In one embodiment, each block of data in the library of pre-encrypted blocks of data corresponds to a macro-block in MPEG-2 video encoding format.

The encrypted version of the image may form part of an encrypted video.

The method may further comprise receiving at least one encrypted block of data from a server. The at least one encrypted block of data corresponds to a respective at least one sub-image of the plurality of sub-images making up the image. The at least one encrypted block of data has been encrypted using said content encryption key. The at least one encrypted block of data from the server is combined with the ordered sequence of pre-encrypted blocks of data from the library to form the encrypted version of the image.

The sequence of pre-encrypted blocks of data from the library may comprise at least one fixed block of data at a fixed location in the ordered sequence.

According to a third aspect of the invention, there is provided a computing device arranged to carry out a method according to the first aspect.

According to a fourth aspect of the invention, there is provided a computer program which, when executed by one or more processors, causes the one or more processors to carry out a method according to the first aspect.

According to a fifth aspect of the invention, there is provided a computer-readable medium storing a computer program according to the third aspect.

Other preferred features of the present invention are set out in the appended claims.

BRIEF DESCRIPTION OF THE DRAWINGS

Embodiments of the present invention will now be described by way of example with reference to the accompanying drawings in which:

FIG. 6 schematically illustrates a media player embodiment of the present invention;

FIG. 9F is a flow chart schematically illustrating the methodology relating to the local device implementation for secure transactions of FIG. 9E;

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
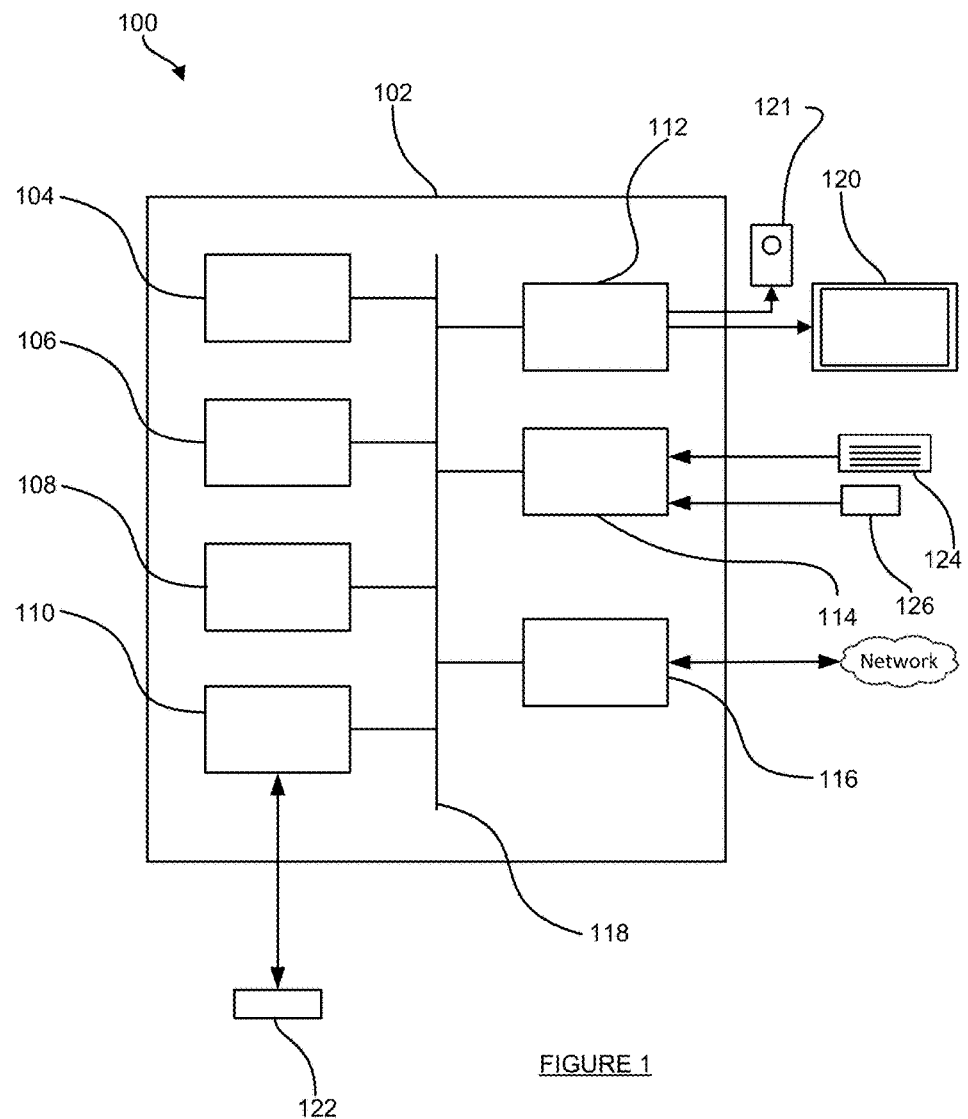
FIG. 1 schematically illustrates an example of a computer system 100 which may be used in embodiments of the present invention.

An example of a computer system 100 is schematically illustrated in FIG. 1. The system 100 comprises a computer 102. The computer 102 comprises a storage medium 104, a memory 106, a processor 108, an interface 110, a user output interface 112, a user input interface 114 and a network interface 116, all of which are linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—Exemplary TEE Architecture

The computer system 100 of FIG. 1 may include a System on a Chip (Soc). Current SoC devices often include multiple processor cores for general purpose applications and a secured processor that only executes trusted applications. Such chip devices are used in a broad range of consumer equipment devices such as Digital TV receivers, mobile telephones and tablet computers.

Figure 2:
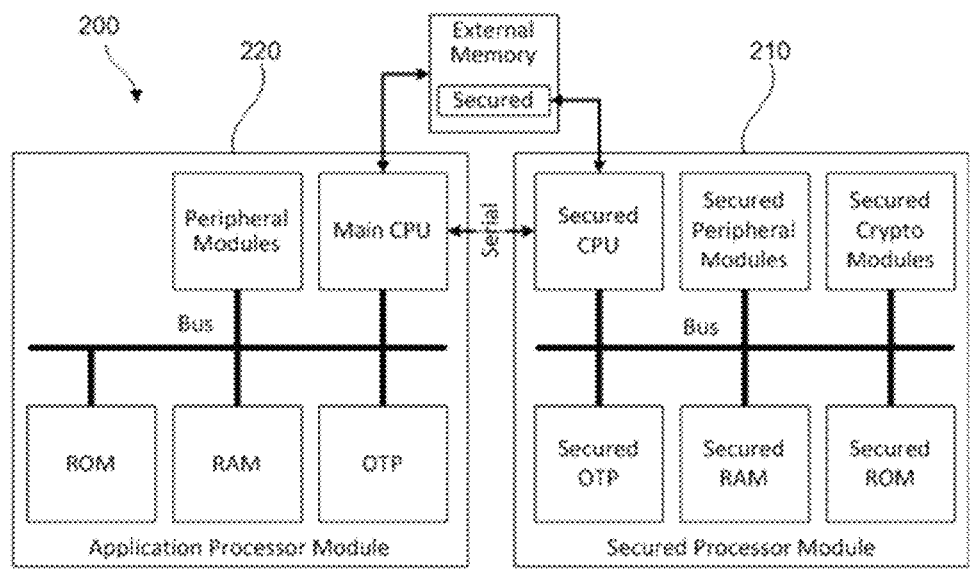
FIG. 2 is a prior art architecture diagram based on the Global Platform TEE architecture.

The cross industry Global Platform association identifies, develops and publishes specifications that promote the secure and interoperable deployment and management of multiple applications on secure chip technology. The Global Platform architecture document describes a Trusted Execution Environment (TEE) and standardised application programming interfaces (APIs) for such environments. FIG. 2 is an architecture diagram based on the Global Platform TEE architecture.

The SoC 200 of FIG. 2 includes a secured processor module 210 and an application processor module 220. The application processor module 220 forms the Rich Execution Environment (in Global Platform terminology) for general software applications and operating systems. The secured processor module 210 forms the TEE and runs only trusted applications that are implementing security sensitive functions. Resources in the secured processor module 210 are not directly accessible to software applications in the application processor module 220. Communication between the two modules is generally implemented in an OS driver.

The secured processor module 210 includes secured peripheral modules for securely interfacing with peripheral hardware components (not shown), in addition to fairly typical computing resources such as a secured CPU, a secured cryptographic module and secured memory modules (e.g. RAM, ROM, and one-time programmable (OTP) memory). All of the modules of the secured processor module 210 are all linked together by one or more communication buses. There is also a serial link for communicating with a serial link of the application processor module 220. The application processor module 220 includes a main CPU and memory modules (e.g. RAM, ROM and OTP memory). The application processor module 220 also includes peripheral modules for interfacing with peripheral components. All of the modules of the application processor module 220 are all linked together by one or more communication buses. An external memory (including a secured component) is also shown in FIG. 2.

A trusted software application in a secured peripheral module (executing in the secured processor module 210) is able to interact with the end user, whilst preventing standard software applications (executing in the application processor module 220) from observing the interaction.

It will be understood that the storage medium 104 and memory 106 of FIG. 1 may include the ROM, RAM and OTP components of both the secured processor module 210 and the application processor module 220 of FIG. 2, as well as the external memory. Similarly, the processor 108 of FIG. 1 may include both the main CPU and the secured CPU of FIG. 2.

There are several different implementation alternatives for establishing the Global Platform TEE. A simple implementation combines the secured processor module 210 and the application processor module 220 as separate modules on a single SoC 200. Another implementation uses a hardware secure context switching component that allows the application processor module 220 and the secured processor module 210 to share the same computing resources but with full separation of access to resources. Yet other implementations use an external secured processor module 210, or even a removable secured processor module 210.

Figure 3:
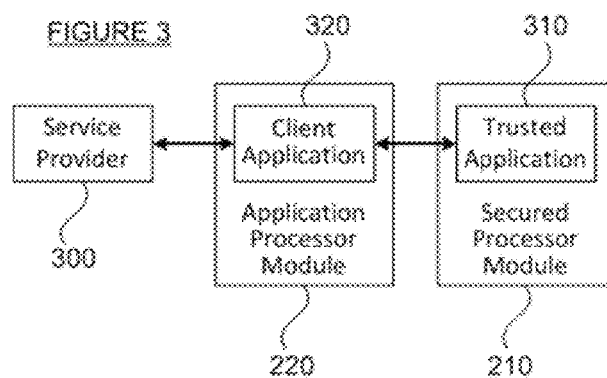
FIG. 3 is a prior art software architecture resulting from the TEE architecture.

The TEE architecture results in a software architecture as illustrated in FIG. 3. A trusted application 310 executes in the secured processor module 210 so it has full access to the protection resources in the secured processor module 210. The trusted application 310 interfaces to a client application 320 that executes in the application processor module 220. The client application 320 acts as an intermediary between a service provider 300 and the trusted application 310. The client application 320 implements the user interface and the functions that are well supported in the software infrastructure of the application processor module 220. Thus, the client application 320 and the trusted application 310 together provide access to secured services that are supported by hardware security measures (trusted peripherals) in the secured module 210.

Figure 4:
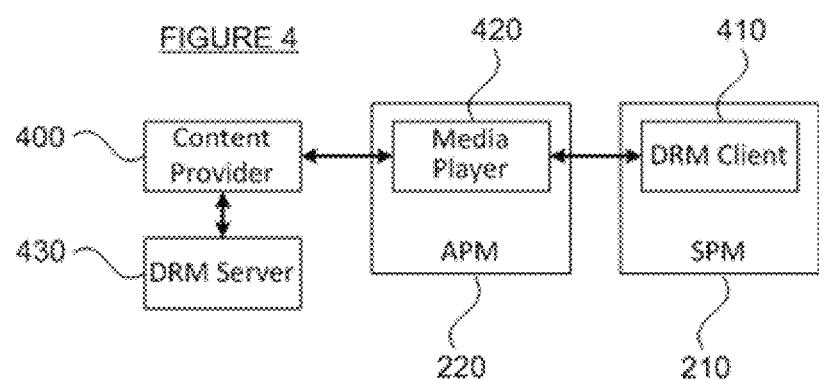
FIG. 4 is an example of the prior art software architecture of FIG. 3 in which the client application is a media player and the trusted application is a DRM client.

A media player example is shown in FIG. 4. In this example, the client application is a media player 420, the trusted application is a DRM client 410, and the service provider is a content provider 400 which is in communication with a DRM server 430 relating to the DRM client 410.

It will be appreciated that the functionality of DRM clients is well understood by those skilled in the art. Further details regarding DRM functionality are provided in WO2013120538, the entire contents of which are incorporated herein by reference. The DRM client 410 may have access to trusted peripherals.

With reference to FIG. 4, the media player 420 may use the DRM client 410 (that operates in the secured processor module 210) to decrypt and decode protected digital media content received from the content provider 400. The DRM client 410 also enables the media player 420 to securely render the content (e.g. audio and video). DRM clients operating in the TEE protect all buffers used in content decoding and content rendering, so normal software applications in the application processor module 220 cannot observe any data associated with the content after the content decryption operation. In this example, the secured processor module 210 prevents attacks that rely on observing data buffers, communication interfaces or the output devices. The secured processor module 210 defends against these attacks even if attackers use software applications executing at the highest privilege level in the application processor module 220. Such DRM functionality is well understood.

The ARM® TrustZone® lists the following objectives for their TEE implemented DRM Client:

The end to end video path, from decryption to decode, decompression and rendering/output to external links, must be hardware isolated such that content is protected from unauthorised software processes and other hardware components.

The memory buffers used in the processing, decoding, mixing and rendering of the content need to be protected by a hardware access control engine such that buffers are not accessible to other unauthorised software or hardware components. Output is only allowed to internal display or exported via protected links such as HDCP and DTCP.

The firmware associated with decoders, mixers and renderers, and any software component such as DRM agents directly used in setting up the protected memory path should be protected against tampering, including having critical components placed in secure processing space, or integrity checked and monitored at boot time and/or at run time or equivalent measures.

The Global Platform specification and the ARM® TrustZone® example show that a TEE implemented DRM client can provide benefits over implementations using only the application processor module. Due to the 'open' nature of popular Operating Systems such as Android, attackers can develop and deploy applications that can tap existing interfaces of protected content processing to obtain high quality unprotected copies of the content. The TEE implementation of a DRM client mitigates this class of attack. As a result most SoC devices for mobile phones and tablets feature a TEE implemented DRM client, as will be understood by those skilled in the art.

It should be noted that Global Platform defines a TEE as the combination of hardware and software that supports a separated environment. In many DRM implementations the TEE as defined by Global Platform is not used. The TEE may simply be a process that is separated at a hardware level from the main application processor (in the case of ARM® TrustZone® this is a hardware hypervisor, in the case of most set-top box systems on chip it is an actual separate processor, in other instances it could even conceivably be an isolated set of logic gates). It will be understood that a DRM client (such as the DRM client 410) may be implemented using any of the TEE implementations mentioned above. The Global Platform TEE is a single exemplary method of implementing a DRM client that is separated from the main CPU.

3—First Aspect of the Invention

Figure 5:
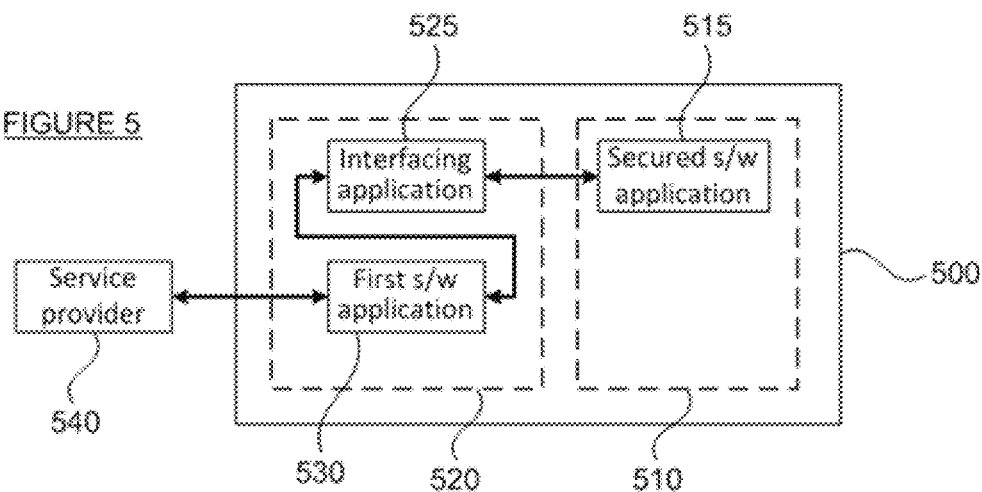
FIG. 5 schematically illustrates an embodiment of the present invention.

The first aspect of the present invention is schematically illustrated in FIG. 5. A computing device 500 includes a first software application 530, an interfacing application 525, and a secured software application 515. The interfacing application 525 is configured to interface with the secured software application 515. The first software application 530 is not configured to interface with the secured software application 515 (such that the functionality of the secured software 515 application is not directly accessible to the first software application 530). In other words, interface(s) of the secured software application 515 are not (directly) accessible to the first software application 530. However, the first software application 530 is configured to interface with the interfacing application 525. The architecture illustrated in FIG. 5 enables the first software application 530 to access the secured software application 515. This is accomplished by the first software application 530 interfacing with the interfacing application 525 to thereby cause the interfacing application 525 to access the secured software application 515.

Thus, the first aspect of the present invention is a method for a first software application to leverage the functionality of a secured software application when the secured software application only exposes its interface(s) to a plurality of predetermined interfacing applications. The first software application is not one of the predetermined interfacing applications. The method comprises the first software application accessing the secured software application indirectly via one of the predetermined interfacing applications.

The computing device 500 may be a client device. Exemplary computing devices 500 include mobile devices (such as a smart phones or tablets), PCs and laptops. Other computing devices 500 are also envisaged.

The secured software application 515 is a secured (or protected) software application. In particular, the secured software application 515 includes protection against at least one form of attack. For example, the secured software application 515 may be secured by means of software obfuscation and/or node-locking and/or isolation provided by the operating system. One exemplary security implementation is the use of a secured module 510, as shown in FIG. 5. Being optional, the secured module 510 is shown in dashed lines in FIG. 5. In this "secured module" implementation of the secured software application 515, the secured module 510 may correspond to the secured processing module 210 in the architecture described above, and may form a Trusted Execution Environment (TEE). In this embodiment, the secured software application 515 is equivalent to the trusted application 310 described above, such that the secured software application 515 securely executes/runs (and may be securely stored) in the secured module 510. The secured software application 515 is subject to protection facilities of the secured module 510 such that the secured software application 515 may be considered to be "secured" (or protected).

As previously mentioned, the interfacing application 525 is configured to interface (i.e. interact or communicate) with the secured software application 515. In other words, the interfacing application 525 is associated with the secured software application 515 such that the secured software application 515 is accessible via the interfacing application 525. The interfacing application 525 may also be "secured" in some way (e.g. by software obfuscation, or other security implementations described above).

In the security implementation of FIG. 5, the interfacing application 525 and the first software application 530 both execute/run outside the secured module 510. In particular, the interfacing application 525 and the first software application 530 may execute and be stored in a first module 520 of the computing device 500, the first module 520 being different (and separate) from the secured module 510. The first module 520 may correspond to the application processing module 220 in the architecture described above. Thus, the interfacing application 525 may be equivalent to the client application 320 described above.

The interfacing application 525 is therefore configured to provide secured functions in cooperation with the secured software application 515 executing in the secured module (TEE). Preferably, the interface between the interfacing application 525 and the secured software application 515 is secured such that communications may not be monitored by other software applications on the computing device. In other words, the interface between the secured software application 515 and the interfacing application 525 is configured such that interactions between the two cannot be observed by other software applications executing on the computing device 500, particularly those outside the secured module 510. Thus, other software applications executing in the first module 520 cannot observe interactions between the secured software application 515 and the interfacing application 525. This "non-observable" functionality is well understood by those skilled in the art (see, for example, prior art DRM clients).

In general, the first software application 530 is a software application which would like to be able to use the secured functionality of the secured software application 515. The first software application 530 may be one of an operating system, a device driver, a binary executable program, and a software application in source code format (e.g. executed in a Browser or a Virtual Machine).

As mentioned above, the first software application 530 is configured to interface with the interfacing application 525 to thereby cause the interfacing application 525 to access the secured software application 515. For example, the first software application 530 may send a request to the interfacing application 525 to access the secured software application 515. Thus, the first aspect of the present invention enables the first software application 530 to indirectly access the secured software application 515. Hence, an end-user of the first software application 530 is able to interact with the secured software application 515 (via the associated interfacing application 525) without being observed by other software applications executing on the computing device 500 outside the secured module 510. The first software application 530 thereby provides secured functions using the interfacing application 525 and the secured software application 515. In practice, the first software application 530 may provide security functions (based on the functionality of the interfacing application 525 and the secured software application 515) for an associated service provider 540.

In the secured module implementation of FIG. 5, the first software application is not configured to interface with any software applications that are configured to execute in the secured module. In other words, the secured module is not accessible to the first software application at all. This is why the interfacing application is used as an intermediary. More generally, any software applications that are configured to execute in the secured module (such as the secured software application) are only accessible via one or more predetermined access applications, the one or more predetermined access applications including the interfacing application but not including the first software application. Thus, the secured module is not accessible except by pre-authorised applications. Such "secured modules" are common in smart phones and the like, particularly for implementation of a secured DRM client.

In accordance with the above described methodology, the first software application 530 is able to use a public feature of the interfacing application 525 to gain access to secured services that are supported by hardware security measures in the secured module (TEE), for example. The secured software application 515 may provide protection against attacks by other applications executing on the device 500. For example, the interfacing application 525 may use functionality in the secured software application 515 to display on the screen of the device 500 an image that cannot be accessed by other software applications operating on the same computing device 500. Alternatively, the interfacing application 525 may use functionality in the secured software application 515 to securely obtain input from a input device (such as a fingerprint reader) in such a way that the input cannot be intercepted or observed by another application in the same computing device 500. In the prior art, such functions are implemented for a particular remote service provider (e.g. the service provide 300) that also has made arrangements to install the interfacing application 525 (e.g. the client application 320) and the secured software application 515 (e.g. the trusted application 310) on the computing device 500. The first software application 530 interfaces with the interfacing application 525 to activate secured functionality provided by the interfacing application 525 and the secured software application 515.

Notably, the interface to trusted applications (such as the secured software application 515) in the secured module 510 is not available to software applications that are distributed in source code formats and that are executed in a virtual machine or evaluated in a scripting language interpreter. In other words, the interfacing application 525 may not be a software application that is distributed in source code format or that is executed in a virtual machine or evaluated in a scripting language interpreter. Thus, another advantage of the use of the first software application 530 is that the functionality of trusted applications can become available to software applications that are distributed in source code formats and that are executed in a virtual machine or evaluated in a scripting language interpreter, since the first software application may be in one of these formats whilst still being able to interface with the interfacing application 525.

Implementation of the first aspect of the invention may be an Android implementation, for example. However, other implementations are envisaged.

The interfacing application 525 may comprise an interface to interface with a third party (for example, the client application 320 of FIG. 3 has an interface to interface with the service provider 300). In this case, the first software application 530 may be configured to interface with the interfacing application 525 using this same third party interface. Since any interface between the client application 320 and the service provider 300 may be proprietary, it might be necessary for the first software application 530 to first acquire the ability to use the proprietary interface. Thus, the first software application 530 may first need to communicate with the service provider 300 to obtain the relevant permissions to access the interface to the client application 320 (i.e. the interfacing application 525). Alternatively, the interface between the client application 320 and the service provider 300 may be public. Alternatively, the first software application 530 may interface with the interfacing application via an alternative public interface (or public functionality) of the interfacing application 525. The first software application 530 uses the interfacing application 525 interface to the service provider to activate secured functionality provided by the interfacing application 525 and the secured software application 515.

The service provider 540 sends messages to the first software application 530 which processes the messages and implements the desired security functions using the interface to the interfacing application 525 and the secured software application 515. Like the interface between the client application 320 and the service provider 300, the interface between first software application 530 and the service provider 540 often is proprietary, and can be secured, encrypted or otherwise protected in order to prevent attacks.

In some embodiments, there may be multiple interfacing applications and/or multiple secured software applications and/or multiple first software applications operating on the same device 500. A single interfacing application (of the plurality) may be able to interface with multiple secured software applications, and/or a single secured software application (of the plurality) may be able to support multiple (different) interfacing applications. Similarly, a single first software application (of the plurality) may be configured to interface with multiple interfacing applications, and/or a single interfacing application (of the plurality) may be able to interface with multiple first software applications.

Consider the embodiment where the interfacing application 525 is one of a plurality of interfacing applications on the computing device 500. Each interfacing application is configured to interface with a respective instance of the secured software application 515. In other words, each interfacing application interfaces to a unique instance of the secured software application 515, thereby providing isolation between the various interfacing applications that communicate with the secured software application 515. When using a "secured module" implementation of the secured software application 515 (as shown in FIG. 5), each interfacing application is outside the secured module 510, and may be in the first module 520.

Similarly, consider the embodiment where the first software application 530 is one of a plurality of first software applications on the computing device 500. Each first software application is configured to interface with a respective instance of the interfacing application 525. In other words, each first software application interfaces to a unique instance of the interfacing application 525, thereby providing isolation between the various first software applications that communicate with the interfacing application 525. When using a "secured module" implementation of the secured software application 515 (as shown in FIG. 5), each first software application is outside the secured module 510, and may be in the first module 520.

The secured software application is only accessible via one or more predetermined access applications, the one or more predetermined access applications including the interfacing application but not including the first software application.

4—Media Player Embodiment

Partly in response to pressure from film and television studios, DRM clients/modules currently exist to enable a secure video path in a user device such as device 500. This means that it is possible to decrypt and display video without a hacker's software on the inside of the device being able to see the video that is being displayed on the screen, as described below.

A media player embodiment is shown in FIG. 6. In this embodiment, the interfacing application is or comprises a media player or media player application 625, and the secured software application is or comprises a DRM client 615. The embodiment of FIG. 6 uses a common "secured module" implementation of the DRM client 615, as described above with reference to FIG. 5. However, it will be understood that other security implementations of the DRM client 615 (e.g. software obfuscation) may be used instead of or as well as this "secured module" implementation.

The media player 625 may use the DRM client 615 (that operates in the secured module 510) to securely decrypt and decode protected digital media content. However, rather than receiving the protected digital content from a content provider, such as the content provider 400, the media player 625 instead receives the protected digital content from the first software application 530, which is associated with its own service provider 540. The protected digital content may be provided by the service provider 540 (with the first software application 530 acting as an intermediary). Such content may be generated by the service provider 540 itself, or may be provided by the service provider in conjunction with a DRM server. Alternatively, the protected digital content may be generated by the first software application 530 itself if the first software application 530 is secured in some manner (e.g. by means of software obfuscation).

The DRM client 410 also enables the media player 420 to securely render the protected digital content (e.g. audio and/or video). Thus, the first software application 530 may be configured to send DRM-protected content to the media player 625 to thereby cause the media player 625 to access the DRM client 615 so as to enable rendering of the DRM-protected content on the computing device 500. The DRM client may be configured to prevent and/or restrict other software applications executing on the computing device 500 from accessing (i.e. viewing/capturing/rendering/etc.) the DRM-protected content. Thus, a DRM-protected file may be used to display an image on the computing device 500 in a way that other applications running on the same platform cannot access the display memory. The DRM client 615 is the DRM client associated with the protection scheme for the protected content to be rendered by the media player 625.

In this embodiment, the first software application 530 may firstly send a rendering request to the media player 625 and secondly send protected content to the media player 625. Alternatively, the rendering request may be implicit in the sending of protected content to the media player 625. This triggers the DRM client 615 that implements the protected playback, including the protected output of the rendered stream. The rendering of protected content is supported in a wide range of software development kits, media libraries and system APIs, as well as in interpreter environments (browsers) and virtual machines environments (Java VM). Thus, in this media player embodiment, the first aspect of the invention allows the first software application 530 to use such an existing content rendering interface (i.e. the media player 625) to gain access to protected output peripherals (audio/video).

In one embodiment, the DRM-protected content may comprise audio content and the DRM client 615 may be configured to prevent other software applications on the computing device 500 from obtaining a recording of the rendered audio content when rendered using a speaker of the computing device 500.

In one embodiment, the DRM-protected content may comprise image content and the DRM client 615 may be configured to prevent other software applications on the computing device 500 from obtaining a screenshot of the image content when rendered on a screen of the computing device 500. The image content may be from still images or video content. It will be understood that a screenshot (or screen capture or screen-cap or screen dump or screen-grab) is an image taken by the device 500 to record the visible items displayed on the screen (or monitor or television or another visual output device). In one embodiment, the image content may include a set of characters (e.g. a number keypad) where locations of the characters in the image are randomly assigned such that a software application monitoring locations (on the image) of inputs by a user is unable to determine the corresponding character inputs. For example, consider the display of such a keypad on a touch-screen to enable a user to enter a login ID or password, for example. A software application monitoring the locations of screen touches by a user would be unable to determine the associated character inputs. The locations of the characters are clearly known to the user viewing the rendered version of the protected DRM content. The locations of the characters are also known to a provider of the first software application 530 (e.g. the service provider 540) so that the provider 540 is able to obtain a secure input from the user without the character inputs being observable to other software applications executing on the device 500.

It will be appreciated that some embodiments envisage user interaction with the securely displayed DRM-protected content. For example, the embodiment described above may require a user to provide character inputs using a displayed set of characters (such as a keypad). In such cases, the first software application 530 is arranged to receive the user interactions (e.g. keypad inputs) and pass them to the service provider 540, preferably by means of a secured (e.g. encrypted) interface. As a result, the service provider 540 may wish to alter the DRM-protected content being displayed to the user. For example, if the user is entering a login ID or password by means of the character keypad, then the service provider 540 may wish to display the login ID or password to the user as it is being entered (so as to provide feedback to the user regarding which character inputs they have so far provided).

Alternatively/additionally, the service provider may wish to alter the locations of the displayed characters after each user input of a single character. Thus, in response to receiving data identifying or specifying one or more user interactions, the service provider 540 provides alternative or updated DRM-protected content in real-time to the first software application 530 for rendering via the protected video pathway provided by the media player 625 and the DRM client 615. To enable this functionality, the service provider 540 may be interfacing with a DRM service provider (such as the DRM server 430 of FIG. 4). It will be appreciated that the service provider 540 may comprise one or more servers, at least one of which may be a cloud server. Similarly, the DRM service provider may comprise one or more DRM servers, at least one of which may be a cloud server. Use of a cloud architecture enables the service provider 540 and the DRM service provider to process interactive content in real-time. In alternative embodiments, the content may be a single file or stream which is not modified as the user interacts with the version of the content rendered securely on the computing device 500.

As will be well understood by those skilled in the art, DRM systems enable content to be protected in such a way that it can only be rendered on a particular computing device which includes a DRM client 615 having a particular DRM client ID. Furthermore, as described above, the first software application 530 enables a user to interact with a computing device to securely provide particular inputs (e.g. a login ID and password). This combination of features provides a highly secured system and methodology in which the first software application 530 may require both (i) the correct computing device and (ii) the correct user to be present to enable continued execution of the first software application 530 on the computing device. For example, with reference to the secure payments example below, the first software application 530 could be configured such that it would only be possible for a payment transaction to be approved if the DRM content were displayed on the correct device with the user inputting the correct PIN (which is known only to them). This provides a double layer of security for such transactions.

The first software application 530 may be configured to provide input and/or content to the interfacing application 525 in a format predetermined by the interfacing application 530. As an example consider the media player embodiment of FIG. 6. The first software application 530 sends a protected content file (or stream) to the media player 625. The media player 625 processes the file in cooperation with the DRM client 615 to render the protected content. In this example, the DRM client 615 in the TEE will also protect the decoded output of the content against observation by other client applications in the computing device. The first software application 530 may support the generation of different protected content files dependent on the feature set of the media player 625 and the DRM client 615 in the computing device 500. For example, if the function of the first software application 530 is to securely display a protected image, but the media player 625 only supports the playback of protected video, then the first software application 530 may be configured to encode the image as a repeating sequence of still images before adding the protection required for the DRM client 615 supported by the media player 625 in the computing device 500.

In general, media player applications have user-friendly interfaces to enable a wide variety of content from a wide variety of sources to be rendered using the media player application. Thus, the media player 625 may have a publically available interface and functionality which enable it to receive DRM-protected content from any third party application. As mentioned above, the DRM-protected content should be provided to the media player 625 in a pre-determined format suitable for processing by the media player 625. Thus, the first software application 530 may itself be configured to output the DRM-protected content in an appropriate format for the media player 625. Alternatively, an API may be used to enable the first software application 530 to effectively interface with the media player 625. The media player 625 may be configured to receive DRM-protected content with and/or without an accompanying DRM license/certificate.

When the first software application 530 sends DRM-protected content to the media player 625 for rendering in conjunction with the DRM client 615, it will be understood that only a DRM client 615 having access to an appropriate DRM license will be able to render the DRM-protected content on the device 500. Thus, the first software application 530 is further configured to communicate with a DRM server 430 associated with the DRM client 615 to thereby ensure that the DRM client 615 has access to a DRM license associated with the DRM-protected content. For example, the first software application 530 may be configured to request that the DRM server 430 generates a DRM license to enable the DRM client 615 to render DRM-protected content that originates from the first software application 530. Alternatively, the first software application 530 may be configured to obtain the DRM license from the DRM server 430 and to send the obtained DRM license to the DRM client 615 via the media player 625. The first software application 530 may further be configured to package the DRM license with the DRM-protected content for sending to the media player 625.

It will be appreciated that a single DRM license may be sufficient for the DRM client 615 to render all subsequent DRM-protected content received from the first software application 530 via the media player 625. In this case, the first software application 530 may generally forward DRM-protected content to the media player 625 with an indication of the DRM license to be used, rather than with the actual DRM license itself. Instead, the DRM license may be securely stored locally by the DRM client 615 and may be accessed as necessary by the DRM client 615 when receiving rendering requests that originate from the first software application 530 (where such requests will specify that that DRM license is the one to use). The DRM client 615 may have initially received the locally stored DRM license with initial DRM-protected content originating from the first software application 530 (i.e. received from the media player 625c with an initial rendering request deriving from the first software application 530). Alternatively, the DRM client 615 may have initially received/retrieved the locally stored DRM license from the DRM server 430 without the first software application 530 having had access to the DRM license at all (i.e. the DRM license may be received via a different path than the DRM-protected content). This is feasible since the first software application 530 itself does not require access to the DRM license.

The DRM-protected content may comprise a shared secret known by a provider of the first software application 530 (i.e. the service provider 540) and by a user of the first software application 530. The inclusion of such a shared secret enables the user to verify that the rendered DRM-protected content derives from the provider 540 of the first software application 530. This helps to prevent attacks whereby an attacker causes the device 500 to render attacked content instead of the original content from the service provider 540. For example, the shared secret may comprise video or image content (e.g. a photograph of the user, a particular colour scheme, a particular icon, or a particular display layout) known only to the user and to the service provider 530. A shared secret comprising video or image content may be used as a background during rendering of the protected content on the computing device. The shared secret may instead/also include audio content (such as a recording of the user's name). To provide the best protection, the shared content is known only by the service provider 540 and the user.

In summary, according to this media player embodiment, there is provided a method for a first software application to access a DRM client (a secured software application) on a computing device. The first software application is not configured to interface with the DRM client. The computing device includes a media player application (an interfacing application) configured to interface with the DRM client. The method comprises the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content.

A number of applications of the media player embodiment of FIG. 6 are described in detail below. Many of these applications allow for both a client/server implementation in which the computing device connects to a server, and an alternative local implementation on the computing device itself. Regarding a local implementation, the method further comprises the first software application generating the DRM-protected content by means of secured software code that is resistant against whitebox attacks. The secured software code may be secured by means of software obfuscation (i.e. use of a transformed domain). The secured software code may be configured to generate or select content to be DRM-protected, and to encrypt the content, thereby generating the DRM-encrypted content. The content may be encrypted using a whitebox encryption module. Data associated with the DRM client (e.g. a public key or DRM client ID) may be used in encrypting the content. In one embodiment, the secured software code may be configured to encrypt the content using a content encryption key (CEK), and the secured software code may be configured to package the encrypted content with the CEK to generate the DRM-protected content. In each case, the DRM client is configured to decrypt the DRM-protected content.

Regarding a client-server implementation, the method further comprises the first software application receiving the DRM-protected content from a server. The method may further comprise the first software application sending data associated with the DRM client (e.g. a public key or DRM client ID) to the server for use in generating the DRM-protected content. The method may further comprise (a) the first software application receiving user input in response to the rendering of the DRM-protected content on the computing device; (b) the first software application sending to the server the received user input; and (c) the first software application receiving a verification message from the server, wherein the verification message is based on a comparison between the received user input and a predetermined response associated with the DRM-protected content. The method may further comprise the first software application sending to the server identification information associated with a user of the computing device for use in generating the DRM-protected content. The verification message may further be based on said identification information.

Application A: Robot Avoidance

CAPTCHA is a well-known technology that is used to verify that a software application is interacting with a human end user and not with another software application (i.e. a robot or bot) that is emulating an end user. The methodology described herein can be used to achieve the same objective as CAPTCHA technology (i.e. verifying the presence of an end user) in a different way.

In this robot avoidance application example, the first software application 530 is a software application which aims to verify that the end user is a real person rather than a robot/automated program. In essence, the first software application 530 uses the media player 625 and the DRM client 615 to generate an output that requests a particular input from the end user. Having received input from the end user, the first software application 530 only continues with meaningful functioning after verifying the validity of the input.

In one embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to robot avoidance, the content comprises audio and/or video challenge content comprising a challenge having an associated predetermined response, and the computing device further comprises an input device for obtaining a user input. The method further comprises: (b) obtaining/receiving a user input from the input device in response to the rendering of the challenge content on the computing device; and (c) comparing the obtained user input with the associated predetermined response so as to verify whether the first software application is interacting with a human end user. Step (b) may be performed by the first software application. Step (c) may be performed by the first software application in a local implementation, or by a server in a client/server implementation.

Regarding a local implementation, the method further comprises the first software application generating the DRM-protected content by means of secured software code that is resistant against whitebox attacks. The secured software code may be secured by means of software obfuscation (i.e. use of a transformed domain). The secured software code may be configured to generate or select content to be DRM-protected, and to encrypt the content, thereby generating the DRM-encrypted content. The content may be encrypted using a whitebox encryption module. Data associated with the DRM client (e.g. a public key or DRM client ID) may be used in encrypting the content. In one embodiment, the secured software code may be configured to encrypt the content using a content encryption key (CEK), and the secured software code may be configured to package the encrypted content with the CEK to generate the DRM-protected content. In each case, the DRM client is configured to decrypt the DRM-protected content. The secured software code may be further configured to perform the comparing step (c). Such implementation is equally applicable to at least some local implementations of Applications B, C, and D described below.

Regarding a client-server implementation, the method further comprises the first software application receiving the DRM-protected content from a server. The method may further comprise the first software application sending data associated with the DRM client (e.g. a public key or DRM client ID) to the server for use in generating the DRM-protected content. The method may further comprise the first software application sending to the server the received user input, and the first software application receiving a verification message from the server, wherein the verification message is based on a comparison between the received user input and a predetermined response associated with the DRM-protected content. The method may further comprise the first software application sending to the server identification information associated with a user of the computing device for use in generating the DRM-protected content. The verification message may further be based on said identification information.

Since the DRM client 615 is configured to prevent and/or restrict other software applications executing on the computing device 500 from accessing the challenge content, the challenge content is only discernible by a human end user by means of a video or image display on the computing device 500, and/or by means of an audio output from a speaker of the computing device 500. Thus, given that the challenge content could be selected from any number of possibilities, a bot would be selecting a random response, whereas a human end user could input the correct predetermined response having seen and/or heard the rendered challenge content. Thus, the method is suitable for verifying that the first software application on the computing device is interacting with a human end user.

Using the secure/protected video path provided by the DRM client 615, the securely rendered challenge could be rendered on a display and/or via an audio speaker of the computing device 500. For example, the rendering could include displaying a verification screen requesting data entry from the user based on the displayed verification screen. The verification screen might include a simple message with an OK button at a variable location. The verification screen might include a verification code in the form of a string of characters, and a request for the user to enter the verification code before proceeding. Alternatively, the verification screen may ask the user a closed question such as "What colour is the circle below—red, green or blue?" or "How many butterflies are shown in the image above?" Only a real person will be able to view the displayed verification screen so as to correctly enter the requested data, thereby ensuring that the first software application 530 is only able to be used by real users. There is no need to use a random keypad in this case since the data requested by the verification screen can change for each use of the first software application 530, so monitoring the user input will not be of any value to an attacker in this case. Alternatively, rendering could include securely outputting audio via a speaker of the computing device 500. For example, the audio output might be "Please enter the following verification code by means of your keypad: 3 7 5 9". Furthermore, the securely rendered challenge could include both audio and video components. For example, a verification screen might show an image of butterflies, and the audio output might be "Please enter the number of butterflies shown in the image". As the DRM content may contain an image, a video and/or an audio fragment, a broad range of mechanisms are available to convey the challenge to the end user. Similarly, there are a wide range of inputs that can be requested from the end user. Examples of user inputs are: a sequence of mouse clicks, a sequence of keyboard data, a sequence of touchpad gestures, a recording of the microphone (an audio sample), a recording of the camera (photo or video), and/or a recording of a biometric scanning device (e.g. fingerprint detector). As will be understood, there are an endless number of possibilities for determining challenges using secure audio and/or video output from the computing device 500, making it virtually impossible for a robot to be able to enter the correct data (even assuming that the robot knows that data entry is required).

Figure 7A:
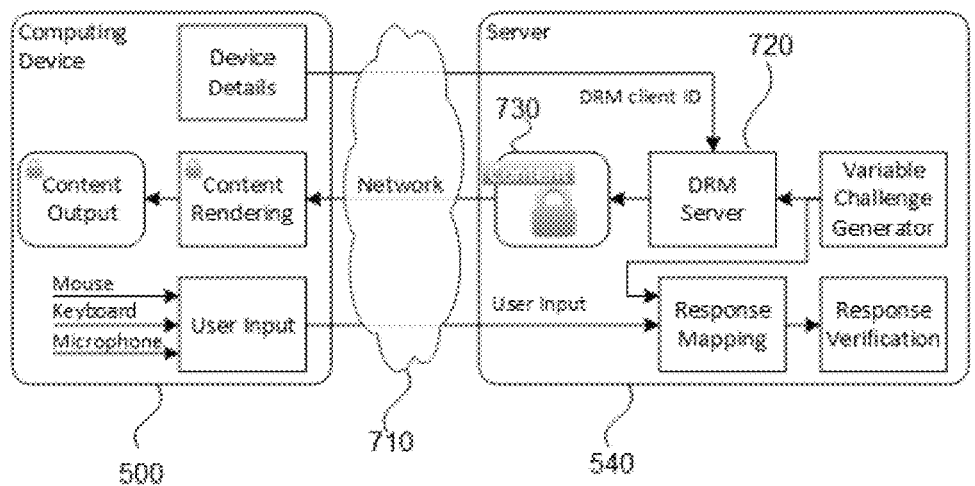
FIG. 7A schematically illustrates a device/server implementation for robot avoidance using the media player embodiment of FIG. 6.

FIG. 7A schematically illustrates an exemplary implementation of this robot prevention embodiment where the computing device 500 is connected by means of a network 710 to a server/service provider 540. As previously, the computing device 500 includes the first software application 530, the media player application 625, and the secured DRM client 615 which all function together to enable secured rendering and output of content on the computing device 500. The first software application 530, the media player application 625, and the secured DRM client 615 are not explicitly shown in FIG. 7A, but their functions are described below with reference to the elements shown in the Figure. The server 540 includes a DRM server 720 for creating DRM-protected content for rendering on the computing device 500 using the DRM client 615. In particular, DRM-protected content generally includes audio and/or video content that is encrypted using a Content Encryption Key (CEK) which is represented by the notation $\{Content\}_{CEK}$. As will be well understood by a person skilled in the art, the DRM-protected content also includes a DRM rights object which includes:

(i) optionally, the DRM client ID (MID);
(ii) the encrypted content key $\{CEK\}_{MID\_PK}$, which has been encrypted using the Public Key of the DRM client 615 (MID_PK);
(iii) usage rules associated with the DRM-protected content; and
(iv) optionally, a DRM System Authentication Code (DRM AC) which is typically a cryptographic hash for the data in the DRM rights object using a DRM system key.

The DRM server 720 generally uses public key cryptography for the encryption of the CEK as this enables the DRM server 720 to generate a random CEK and use a public key to encrypt it for use in the DRM client 615 of the mobile computing device 500 of intended recipient.

With reference to FIG. 7A, at some point during execution, the first software application 530 wishes to perform a check to confirm that it is interacting with a real end user rather than a robot. Thus, the first software application 530 instructs the computing device 500 to send information relating to its DRM client 615 (e.g. a DRM client ID) to the server 540. The server 540 then uses a challenge generator to generate or select variable challenge content in the form of a video and/or audio content file which includes a request for a user to provide a specified input in response to the challenge content. The challenge content is "variable" in the sense that the challenge content will vary each time challenge content is generated or selected. Based on the DRM client ID, the DRM server 720 converts/encrypts the challenge content into DRM-protected challenge content 730 suitable for rendering on the computing device 500, as described above. The server 540 sends the DRM-protected challenge content 730 to the computing device 500. The first software application 530 sends the DRM-protected challenge content 730 to the media player application 625 to thereby cause the media player application 625 to access the DRM client 615 so as to enable secured rendering of the challenge content 730 on the computing device 500 (see the "content rendering" and "content output" of FIG. 7A). The DRM client 615 protects the rendered output against access by other software applications executing on the same computing device 500. The end user then provides an input in response to the rendered challenge content. The user input might be a key board sequence, a mouse click sequence, some audio input, etc. The first software application 530 obtains (i.e. collects and records) this input and instructs the computing device 500 to send the user input (or a sequence of inputs) to the server 540. The server 540 may optionally use a response mapping module to map the user input to a user response using information about the generated variable challenge content. Alternatively, the user response need not be dependent on the generated variable challenge content, in which case, the response mapping module is not required. The server 540 then uses a response verification module to compare the user response to a predetermined response associated with the challenge content. As part of the verification procedure, the server 540 provides a verification message to the first software application 530 indicating whether or not the user response was the same as the predetermined response. The first software application 530 then proceeds accordingly based on the received verification message. For example, the first software application 530 may be configured such that meaningful execution of the application only continues if the verification message is positive (i.e. the obtained input matched the predetermined response). This mode of operation is common in web based applications and can be realised in modern web browsers that support an API for DRM-protected content playback. Since an attacker does not have access to the challenge content (due to the DRM secured transmission and rendering), an attacker/robot is unable to provide the correct input data from the multitude of possibilities such that there is provided a secure bot prevention mechanism even when the computing device 500 has been compromised.

Figure 7C:
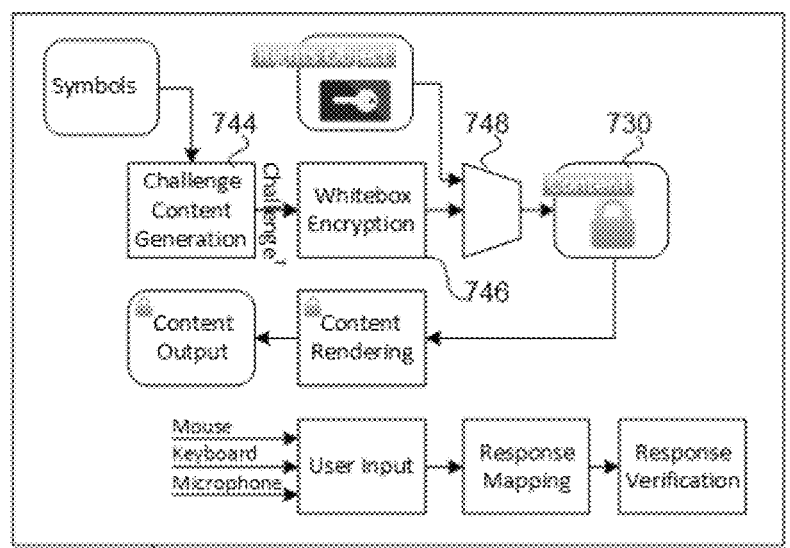
FIG. 7C schematically illustrates a local device implementation for robot avoidance embodiment using the media player embodiment of FIG. 6.
Figure 7B:
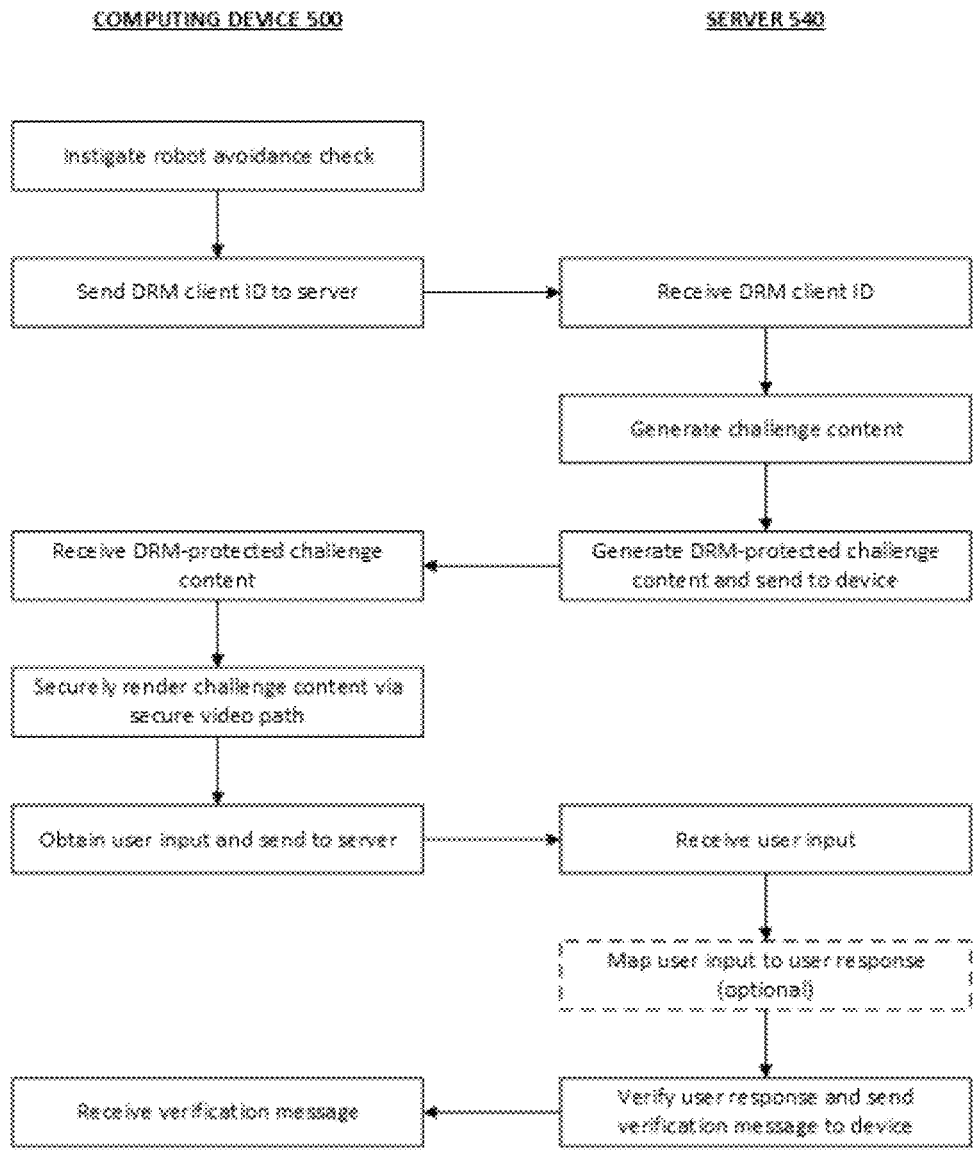
FIG. 7B is a flow chart schematically illustrating the methodology relating to the device/server implementation for robot avoidance of FIG. 7A.

The above described server/device methodology is schematically illustrated in FIG. 7B which is a flow chart showing the method steps carried out by the computing device 500 and the method steps carried out by the server 540.

In a variant, the above-described robot prevention methodology can be implemented entirely locally on the computing device 500 without the need for a server, as illustrated schematically in FIG. 7C. In this embodiment, the computing device 500 generates or selects the variable challenge content internally. In particular, the first software application 530 is configured to generate or select the DRM-protected challenge content 730. The challenge content itself is similar to the types of video and/or audio content files described above with reference to FIG. 7A. In order to protect against other software applications obtaining the challenge content from the code of the first software application 530 or from its data structures during execution, the first software application 530 may use software obfuscation and white-box encryption technology for generating the challenge content in a secured manner, as described below.

In the embodiment shown in FIG. 7C, the DRM-protected challenge content 730 is generated as follows. Firstly, the first software application 530 uses a challenge content generation module 744 to generate or select a variable challenge, and then to generate a challenge content file in the transformed domain using the challenge data and pre-stored transformed symbols that can be used to generate transformed content. Use of the transformed domain obfuscates the software code and associated data structures such that the original (non-transformed) code and data may not easily be discerned by an attacker. Next, a white-box encryption module 746 of the first software application 530 encrypts the transformed challenge content using white-box encryption which is configured to operate on transformed data. The white-box encryption module 746 encrypts the data using a content encryption key (CEK). The same CEK is contained in a DRM rights object. The encrypted data is then passed to a content packager or multiplexer 748 to package the encrypted data together with the DRM rights object associated with usage of the challenge content, thereby outputting the DRM-protected challenge content 730. The first software application 530 sends the DRM-protected challenge content 730 to the media player application 625 to thereby cause the media player application 625 to access the DRM client 615 so as to enable secured rendering of the challenge content 730 on the computing device 500 (see the "content rendering" and "content output" of FIG. 7C). In particular, the DRM client is configured to un-package the DRM rights object from the DRM-protected challenge content 730, and to use it to decrypt the DRM-protected challenge content 730 for rendering. The DRM client 615 also protects the rendered output against access by other software applications executing on the same computing device 500. As in the server embodiment of FIG. 7A, there is then a user input followed by response mapping (optional) and response verification, but these processes all take place locally in the embodiment of FIG. 7C. Each of modules 744, 746, 748 of the first software application 530, as well as the pre-stored transformed symbols and the response mapping and response verification modules are all secured against attackers using software obfuscation.

Figure 7D:
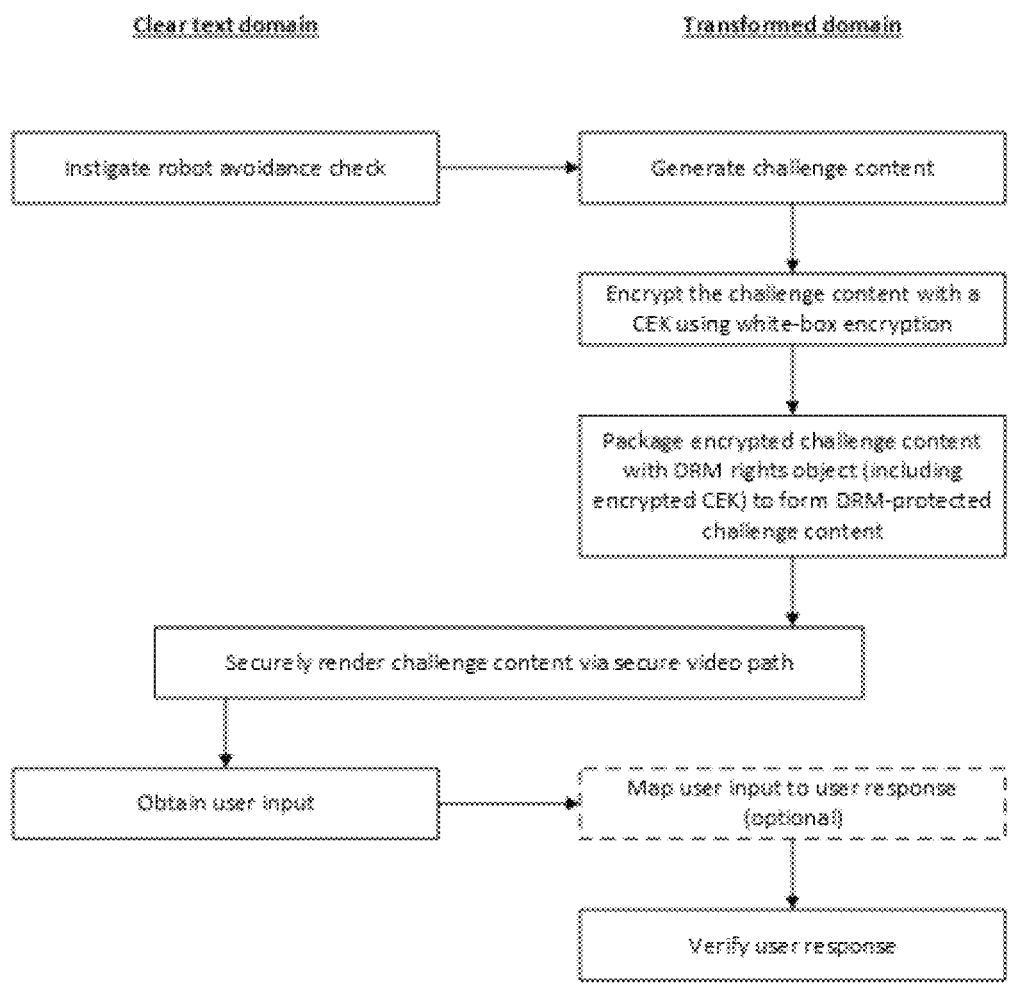
FIG. 7D is a flow chart schematically illustrating the methodology relating to the local device implementation for robot avoidance of FIG. 7C.

The above described local device methodology is schematically illustrated in FIG. 7D which is a flow chart showing the method steps carried out in the clear text domain (i.e. without software obfuscation) and the method steps carried out in the transformed domain. As is schematically illustrated in FIG. 7D, the secure rendering of the challenge content could take place in the clear text domain and/or the transformed domain. For example, the DRM client 615 may be secured by software obfuscation (which indicates use of the transformed domain) or could be secured by use of the secured module 510 (which need not require software obfuscation).

In an alternative local embodiment to the one shown in FIG. 7C, the first software application 530 may use one of a number of pre-packaged DRM-protected challenge content files and a protected (e.g. transformed) version of the expected response. It should be noted that the local generation/selection of the DRM-protected challenge content 730 is discussed in detail in PCT/EP2014/070669, the entire contents of which is incorporated herein by reference.

An alternative local methodology for generating the DRM-protected challenge content 730 is described at the end of the "Application D: Secure code generation" section with reference to FIGS. 12A-D; this alternative local methodology avoids the use of the white-box encryption module 746. In this case, the "image" to be encrypted is the challenge content. The library of pre-encrypted blocks of data will be chosen dependent on the variety of challenge content.

Due to the protection of the video memory (i.e. due to the use of the secure video path made up of the media player application 625 and the DRM client 615), it is not possible for attack software to acquire the rendered challenge. Hence, it is not possible for such attack software to (reliably) generate the appropriate response in order to convince the first software application 530 that it is interfacing with a normal human end-user.

The present methodology for verifying that a first software application on a computing device is interacting with a human end user has a number of advantages over current CAPTCHA technology. CAPTCHA technology implements a human presence detection mechanism by obscuring the challenge request to the end-user such that it is very difficult for a software program to read the text. The obscuring technology needs to be resistant against a wide range of attacks such as image recognition using neural networks and human feedback. In contrast, the new robot avoidance methodology described above does not require any obfuscation of the user input request, so it can implement the human presence detection with an easy to read and understand request image and/or audio clip.

As the DRM content may contain an image, a video and/or an audio fragment, a broad range of mechanisms are available to convey the input request to the end user. Similarly, there are a wide range of inputs that can be requested from the end user. Examples of user inputs are: a sequence of mouse clicks, a sequence of keyboard data, a sequence of touchpad gestures, a recording of the microphone (an audio sample), a recording of the camera (photo or video), and/or a recording of a biometric scanning device (e.g. fingerprint detector). For a simple end-user presence detection a simple user input request is preferable. In order to prevent replay attacks, it is desirable that the user input (and the input request) vary between users as well as between different instances.

Application B: Verification of User Identity

The robot avoidance technology described above enables the first software application 530 to ensure that it is providing services to a human end user rather than an automated instance. Some software programs (or web services) want to provide their services only to a particular human end user. In order to identify a particular end user, existing software programs rely on detecting something that the end user has (e.g. a dongle, a smart card, a specific secured data store, a fingerprint, a specific voice pattern, etc.) or something that the end user knows (e.g. a PIN code, a password, a passphrase, etc.). The media player embodiment described above may be employed for verifying user identity, as described below. In this case, the first software application 530 is a software application operable to verify the identity of an end user.

One example of identifying a particular user based on something that the user knows will now be briefly described in terms of PIN entry. In this case, the PIN is the information that the user knows, and the first software application 530 is a software application requiring PIN entry by the user. In essence, the first software application 530 interfaces with the media player 625 so as to use the DRM client 615 to display PIN entry image content by means of the secure video path. Importantly, since the PIN entry image content is displayed via the secure/protected video path described above, other software applications executing on the device 500 are unable to view or access the PIN entry image content. The PIN entry image content may include a PIN entry request. Alternatively, the PIN entry request may be displayed prior to display of the PIN entry image content, or the PIN entry request may be issued audibly by means of a speaker on the computing device 500 (e.g. a voice saying "please enter your PIN"). The PIN entry image content includes a set of characters (e.g. in the form of a numeric or alphanumeric keypad) to enable a user to enter their PIN. Preferably, the locations of the characters (e.g. numbers and/or letters) in the PIN entry image content may be randomly assigned (i.e. the keypad buttons have unique locations for different instances) so that the same character ordering/layout is unlikely to be used twice. This means that the character ordering is not known to an attacker even if the attacker knows the character ordering from a different (e.g. legitimate) instance of using the first software application 530 for PIN entry. This makes it very difficult for an attacker to determine the entered PIN by monitoring a user input sequence, since the input sequence is randomly associated with the entered PIN. In one embodiment, the PIN entry image content may request entry of more than one field of data (e.g. login ID and PIN). In an alternate embodiment, separate graphics may be used to request entry of each data field. A shared secret may also be displayed in some embodiments. The first software application 530 receives the user input sequence. Only applications with knowledge of the PIN entry image content (e.g. the keypad configuration/layout) can determine the entered PIN from the user input sequence. Subsequently, a comparison of the entered PIN with the predetermined PIN associated with the end user determines the continued operation of the first software program 530.

There follows a generic description of a first software application 530 that wants to verify user identity based on something secret that the end user knows. This supports the "something you know" model in which the end user enters the secret knowledge required to gain entry using an input mechanism that does not provide meaningful information to an attacker even on a compromised computing device. In this example, the secret knowledge is a user passcode, which may be a PIN, a phrase, a password, or any other secret user-identifying knowledge.

Figure 8A:
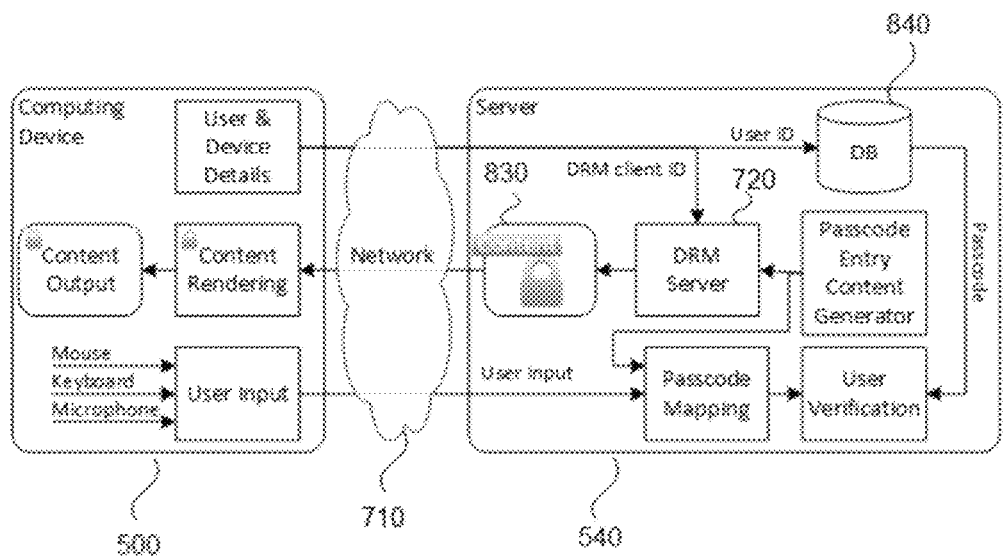
FIG. 8A schematically illustrates a device/server implementation for verification of user identity using the media player embodiment of FIG. 6.

FIG. 8A schematically illustrates an exemplary implementation of this user identity verification embodiment where the computing device 500 is connected by means of a network 710 to a server/service provider 540. As previously, the computing device 500 includes the first software application 530, the media player application 625, and the secured DRM client 615 which all function together to enable secured rendering and output of content on the computing device 500. The first software application 530, the media player application 625, and the secured DRM client 615 are not explicitly shown in FIG. 8A, but their functions are described below with reference to the elements shown in the Figure. The server 540 includes a DRM server 720 for creating DRM-protected content for rendering on the computing device 500 using the DRM client 615. As described below, the computing device 500 and the server 540 exchange information in order to verify the identity of the end-user.

At some point during execution, the first software application 530 wishes to verify the identity of a user by means of a passcode known only to a particular user. Thus, the first software application 530 instructs the computing device 500 to send non-sensitive user identifying information (i.e. a user ID such as a nick name, a user name, an email address, a customer ID, etc.) to the server 540. The first software application 530 also instructs the computing device 500 to send information relating to its DRM client 615 (e.g. a DRM client ID) to the server 540; this enables the server to prepare DRM-protected content for the specific computing device 500 on which the first software application 530 is running. The server has access to a database 840 containing all possible user IDs and the corresponding passcodes (which might be PIN codes or passphrases, etc.).

Upon request of the first software application 530, the server 540 uses a passcode entry content generator to generate or select variable passcode entry content in the form of a video and/or audio content file which will be used to support the first software application 530 in obtaining the user passcode.

The variable passcode entry content may be a passcode entry graphic comprising a keypad, as described above with reference to the PIN entry example described above. Other examples of variable passcode entry content are a passcode entry graphic comprising a set of images and/or icons or any other virtual input graphic that can take different layouts such that only the issuer of the graphic can reconstruct the secret user knowledge (i.e. the passcode) from the collected user input sequence. Each of these examples relies on positions/locations of the user input sequence to reconstruct the passcode input by the user based on knowledge of the graphic layout. Alternatively, the variable passcode entry content may be constructed to rely on timings of the user input sequence to reconstruct the passcode input by the user based on knowledge of the variable passcode entry content. For example, the variable passcode entry content may comprise a looping sequence (i.e. a video) of symbols and/or characters. The timing of a mouse click, a key press or a screen touch by the user can then can be mapped to a specific symbol/character being displayed at that time. In this example, each user input event to the first software application 530 triggers the collection of the video display time (e.g. from the video player API) and possibly other event related values. Note that, in this example, the actual value of the key press, the screen touch or the mouse position/location is not relevant for determining the selected symbol/character. The passcode entry content may combine the above described systems of (a) selecting a symbol/character from a time series of symbols/characters (i.e. a rotating carousel of symbols/characters), and (b) the position/location-based system described above. In particular, timings and/or locations of a user input sequence may be mapped to indicate the passcode entered by the user. For example, the passcode entry content might be a rotating carousel of keypads (or other passcode entry graphics) comprising a number of different characters/symbols per graphic. Alternatively, a variant where a passcode entry graphic (e.g. keypad layout) changes after each single user input event may be used. This can be implemented with a sequence of passcode entry graphics (e.g. keypad layouts) in which each user event (e.g. screen touch) triggers the first software application 530 to interface with the media player 625 so as to get the DRM client 615 to continue playback to the next passcode entry graphic by means of the secure video path. Another variant of the passcode entry content involves audio. For example, the rotating carousel of characters/symbols could be presented audibly to the user via a speaker (rather than being presented visibly via a screen/display as described above). Similarly, rather than receiving a user input via a keyboard, mouse or touchscreen, the user input sequence may be an audible input sequence received by a microphone of the computing device. Thus, the user may speak a passcode if the DRM client 615 on the computing device is able to securely receive the microphone input without allowing other software applications executing on the computing device to access the microphone input. Alternatively, using the rotating carousel timing-based input sequence, a user may provide spoken inputs (e.g. "yes" or "no") in response to some or each of the symbols/characters rendered by the rotating carousel so as to effectively provide a sequence of symbols/characters as input.

As mentioned above, the server 540 generates or selects variable passcode entry content in the form of a video and/or audio content file. Based on the DRM client ID (which was previously provided by the computing device 500), the DRM server 720 converts the passcode entry content into DRM-protected passcode entry content 830 suitable for rendering on the computing device 500. The server 540 sends the DRM-protected passcode entry content 830 to the computing device 500. The first software application 530 sends the DRM-protected passcode entry content 830 to the media player application 625 to thereby cause the media player application 625 to access the DRM client 615 so as to enable secured rendering of the passcode entry content 830 on the computing device 500 (see the "content rendering" and "content output" of FIG. 8A). The DRM client 615 protects the rendered output against access by other software applications executing on the same computing device 500. The end user then provides an input (i.e. an input sequence) in response to the rendered passcode entry content. The user input might be a key board sequence, a mouse click sequence, a sequence of screen touches, some audio input, etc., as described above. The first software application 530 obtains this user input sequence that represents the passcode as input by the user. The first software application 530 obtains this input sequence and instructs the computing device 500 to send the user input sequence to the server 540. The user input sequence sent to the server 540 may include timings and/or locations of the user inputs. For audio inputs, timings and/or spoken words of the user input may be sent to the server 540. The server 540 uses a passcode mapping module to map the user input sequence to an input passcode using information about the generated variable passcode entry content. For example, in the case of a variable keypad, the sequence of button push coordinates maps to a sequence of buttons pressed. As the server 540 knows the location of each symbol/character button on the keypad, it can generate the sequence of symbols/characters representing the passcode as input by the user. The server 540 then uses a user verification module to compare the passcode as input by the user to the passcode stored in the database 840 for that user ID. Thus, the end-user identifying information (i.e. the user ID) is used in this verification step. As part of the verification procedure, the server 540 provides a verification message to the first software application 530 indicating whether or not the input user passcode was the same as the stored user passcode. The first software application 530 then proceeds accordingly based on the received verification message. In other words, the verification message determines the continued execution of the first software application 530. Such further functional steps based on the result of the verification message are well known and do not form part of the invention.

As described above, the content rendering module and the display memory (i.e. the content output module) in FIG. 8A are both protected (i.e. secured) so that only a very small set of software applications can access the decoded data or the video memory. Preferably, only the first software application 530 is able to access the decoded data or video memory. This is enforced by the software in the secured module 510; specifically, this is enforced by the DRM client 615. The audio and/or video content of the passcode entry content is thus not accessible to attack software, to malware, or by a compromised kernel (or operating system) itself. As described above, the audio and/or video content of the passcode entry content is used to transform the sequence of user inputs to generate the passcode input by the user. Knowledge of the passcode entry content is therefore required in order to map the sequence of user inputs to the input passcode. The passcode entry content is different on each instantiation and the rendered content is not accessible to other software applications executing on the application processor module of the computing device. These two factors secure the passcode entry mechanism even on a compromised computing device.

Figure 8C:
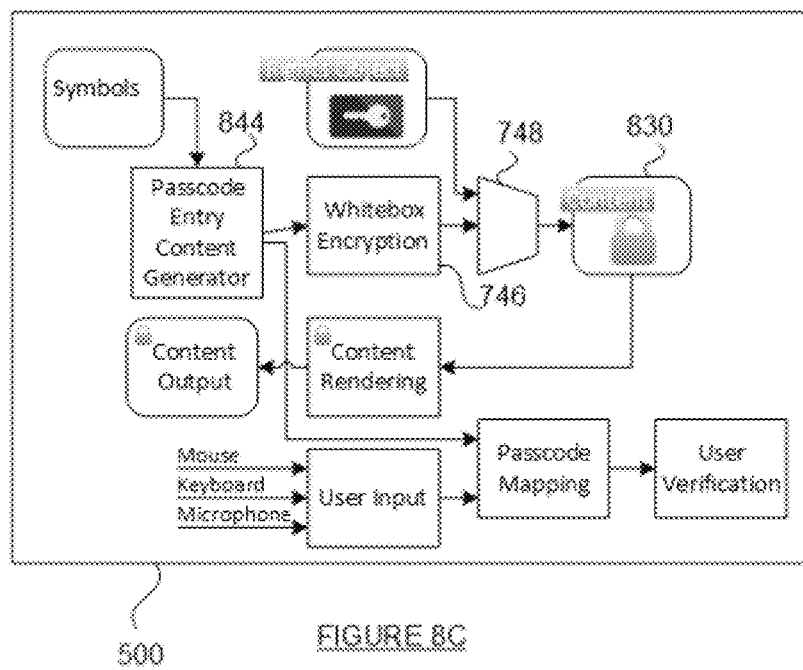
FIG. 8C schematically illustrates a local device implementation for verification of user identity using the media player embodiment of FIG. 6.
Figure 8B:
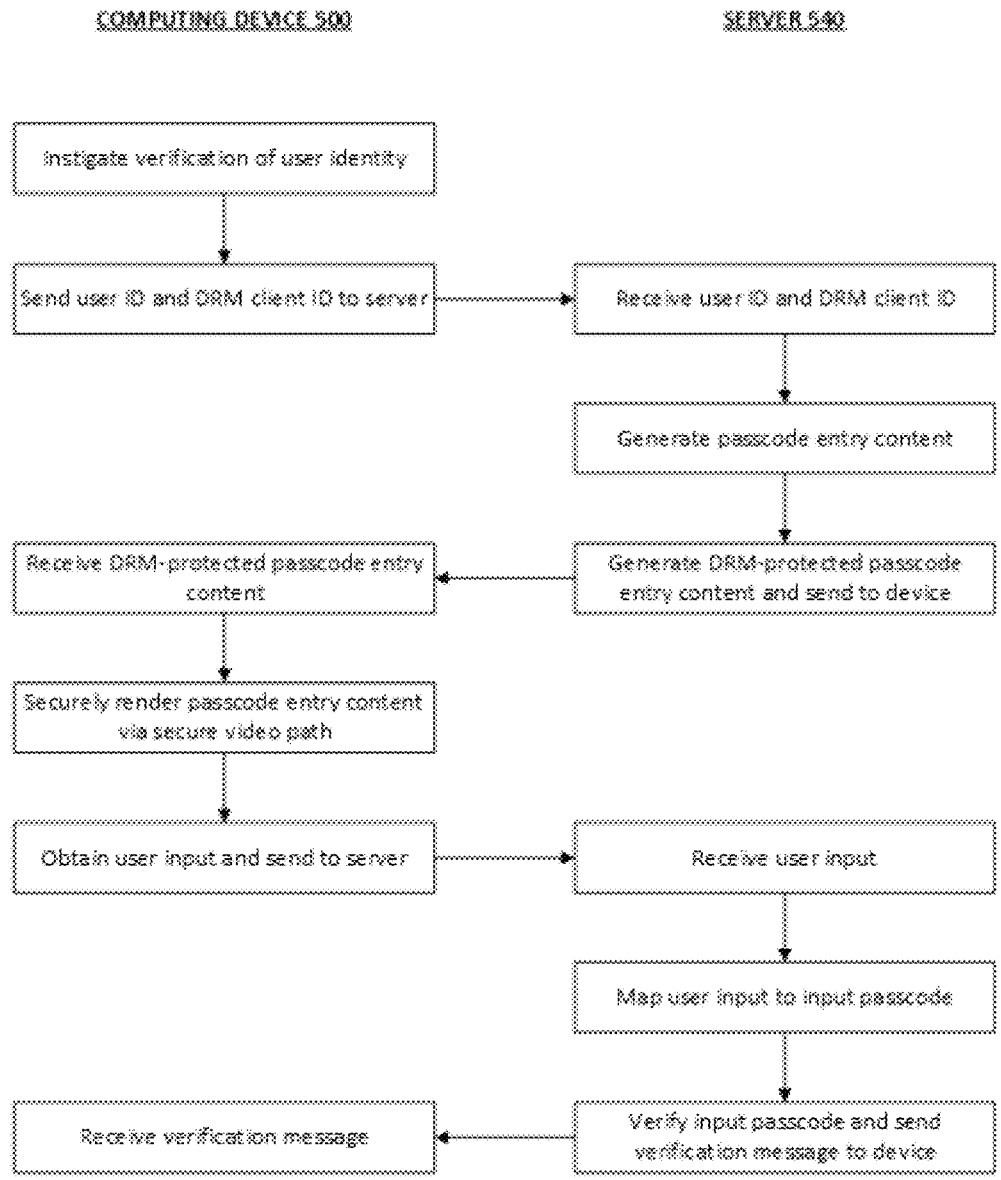
FIG. 8B is a flow chart schematically illustrating the methodology relating to the device/server implementation for verification of user identity of FIG. 8A.

The above described server/device methodology is schematically illustrated in FIG. 8B which is a flow chart showing the method steps carried out by the computing device 500 and the method steps carried out by the server 540. The main difference as compared to the robot avoidance methodology of FIG. 7B is that the mapping step is no longer optional in the user identity verification embodiment of FIG. 8B since it is necessary that the passcode input by the user not be accessible to an attacker as the passcode represents sensitive data. In contrast, it does not matter if an attacker is able to access a challenge response input by a user as this is not sensitive data.

This application of the media player embodiment is particularly relevant to mobile computing devices having touchscreens, such as smart phones and tablets and the like.

The system can be further secured if the secured module 510 (e.g. the DRM client 615) supports a way to provide secured input (e.g. secured audio input by means of a secured microphone). In theory it is possible for the secured module 510 to protect the memory addresses of the control registers of input devices. However, this might be difficult to control in a multi-tasking environment, as this would block other software applications from receiving user inputs. Currently, one example of a secured input device might be a fingerprint reader or similar biometric input devices.

As illustrated schematically in FIG. 8C, the above-described user identity verification methodology can be implemented entirely locally on the computing device 500 without the need for a server. This local implementation is more vulnerable to attacks, so it is typically used for exceptional situations such as a temporary absence of a communication network to the server 540. In this embodiment, the computing device 500 generates or selects the variable passcode entry content internally. In particular, the first software application 530 is configured to generate or select the DRM-protected passcode entry content 830.

FIG. 8C shows three server modules of FIG. 8A that are now implemented locally on the computing device 500 under the control of the first software application 530. In particular, the passcode entry content generator module, the passcode mapping module and the user verification module are implemented on the computing device 500 in the local embodiment of FIG. 8C. As in the local robot avoidance embodiment shown in FIG. 7C, an attacker may have access to the code and data of the first software application 530 in the computing device 500, so these three modules use data transformation and software obfuscation technologies for security. The database with user IDs and passcodes is encoded in the transformed data of the first software application 530. The DRM server 720 on the server 540 of FIG. 8A is replaced by a white-box encryption module 746 that encrypts the encoded content containing the video and/or audio content of the variable passcode entry content. In particular, the DRM-protected passcode entry content 830 is generated in a corresponding manner to the generation of the DRM-protected challenge content 730 describe above with reference to FIG. 7C. The only difference is that the passcode entry content generator module 844 is used in the embodiment of FIG. 8C, as opposed to the challenge content generation module 744 of FIG. 7C.

As in the server embodiment of FIG. 8A, there is then a user input followed by response mapping and response verification, but these processes all take place locally in the embodiment of FIG. 8C. Each of modules 844, 746, 748 of the first software application 530, as well as the pre-stored transformed symbols and the response mapping and response verification modules are all secured against attackers using software obfuscation.

Figure 8D:
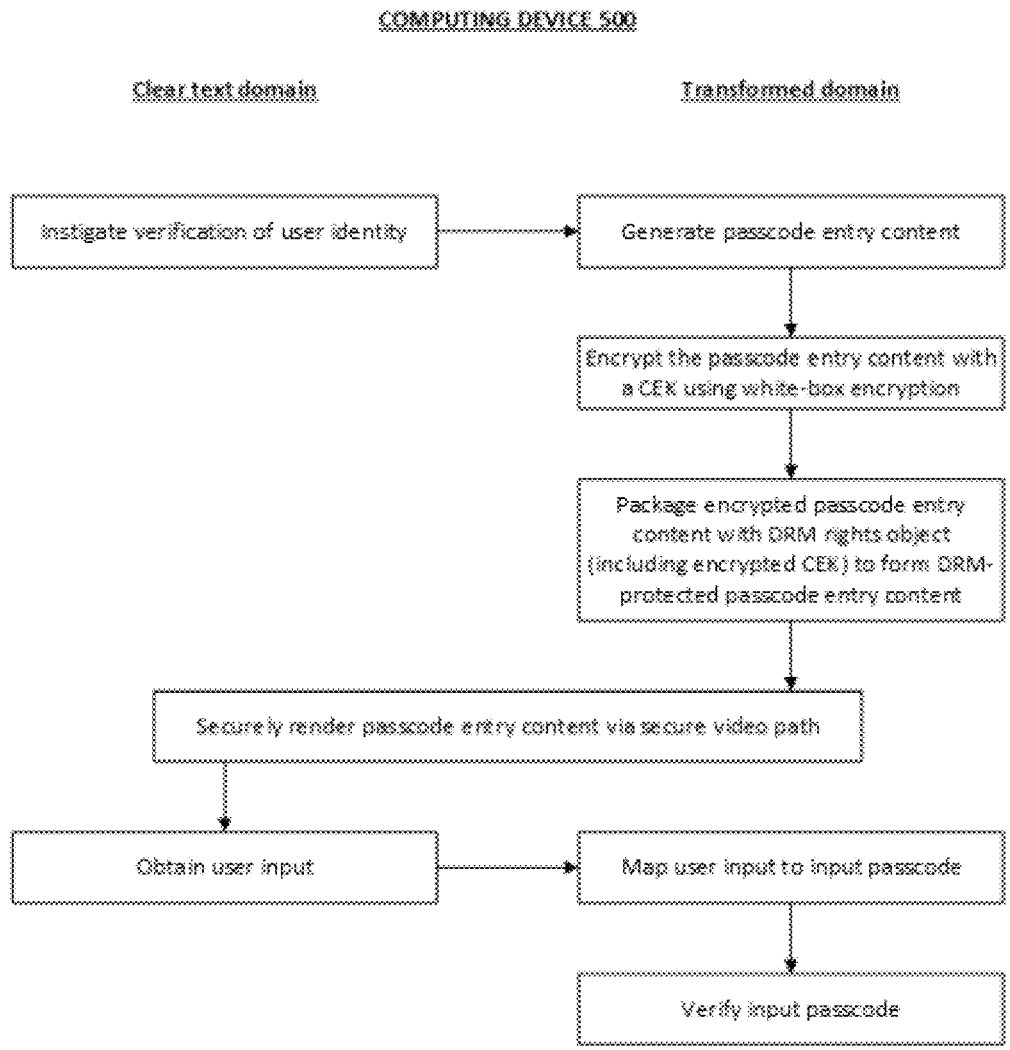
FIG. 8D is a flow chart schematically illustrating the methodology relating to the local device implementation for verification of user identity of FIG. 8C.

The above described local device methodology is schematically illustrated in FIG. 8D which is a flow chart showing the method steps carried out in the clear text domain (e.g. without software obfuscation) and the method steps carried out in the transformed domain.

An alternative local methodology for generating the DRM-protected passcode entry content 830 is described at the end of the "Application D: Secure code generation" section with reference to FIGS. 12A-D; this alternative local methodology avoids the use of the white-box encryption module 746. In this case, the "image" to be encrypted is the passcode entry content. The library of pre-encrypted blocks of data will be chosen dependent on the variety of passcode entry content.

In one embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to the above-described methodology for verification of user identity based on what a user knows, the computing device further comprises an input device for obtaining a user input, and the content comprises audio and/or video passcode entry content. The method further comprises: (b) requesting user input of a passcode associated with a particular user ID; and (c) obtaining a user input from the input device in response to the rendering of the passcode entry content on the computing device. Notably, the content may further comprise audio and/or video content representing the request for user input of the passcode associated with the particular user ID, as in step (b). Thus, steps (a) and (b) may be performed concurrently (i.e. the user input request of step (b) may implicitly form part of the rendered content in step (a)). Local and client-server embodiments are described below in general terms.

The local implementation of the verification of user identity may have many features/steps in common with the local robot avoidance implementation described above, so these features/steps will not be repeated here. However, in a local identity verification embodiment, the method further comprises the first software application performing the steps of (d) mapping the obtained user input to an input passcode, wherein said mapping requires access to the passcode entry content; and (e) comparing the input passcode with the passcode associated with the particular user ID so as to verify whether the first software application is interacting with the user having that particular user ID. Steps (b) and (c) should be implemented by means of secured software code, like the secured software code used to generate the DRM-protected content. An attacker does not have access to the passcode entry content. Thus, an attacker monitoring user inputs on the input device is unable to map the user inputs to an input passcode, so cannot gain access to this sensitive data. Thus, the method is suitable for verifying that the first software application on the computing device is interacting with a user having a particular user ID.

The client-server implementation of the verification of user identity may have many features/steps in common with the client-server robot avoidance implementation described above, so these features/steps will not be repeated here. However, with reference to verifying user identity, the verification message is based on a comparison between the received user input and a passcode associated with the particular user ID. Thus, the server maps the received user input to an input passcode based on the passcode entry content, and then the server performs a comparison of the input passcode and the passcode associated with the particular user ID so as to generate a verification message for sending to the computing device.

As described above, the audio and/or video passcode entry content may include an image comprising a set of characters such that the locations of inputs by the user are associated with corresponding characters. The locations of the characters in the image are randomly assigned such that a software application monitoring locations of the inputs by a user is unable to determine the corresponding character inputs without access to the image. The audio and/or video passcode entry content may additionally/alternatively include a video displaying a set of characters at different times such that the timings of inputs by the user are associated with corresponding characters. The timings of the characters in the video are randomly assigned such that a software application monitoring locations of the inputs by a user is unable to determine the corresponding character inputs without access to the video.

Verification of user identity as described above may include the display of a keypad as part of the passcode entry content. The process of entering a passcode code in a virtual environment is subject to a wide range of attacks. One such attack involves an attacker observing the key presses, mouse clicks and screen coordinates to obtain the passcode for a particular end-user. One way to mitigate such an attack is to randomise the numeric values of the keypad. In other words, the integers 0-9 may be randomly assigned to the keypad buttons. Thus, rather than using the ordering 1-2-3-4-5-6-7-8-9-0, an alternative random ordering is sometimes used instead (e.g. 2-6-4-5-9-8-0-1-3-7). The random ordering can change for each instantiation such that an attacker observing screen presses or mouse clicks would not be able to determine the entered passcode without knowledge of the particular random ordering used in each case.

A disadvantage of the above described keypad randomisation technique is that it defeats the muscle memory of the end user that aids in remembering a passcode. Thus, when presented with a randomized keypad, the user might not be able to remember their passcode since the muscle memory of the input pattern no longer be a suitable aide-memoire. Therefore, it is desirable to be able to generate a secure keypad which still enables the use of muscle memory of passcodes. UK patent application number 1506048.6, which is hereby incorporated by reference, provides a user input mechanism (e.g. a keypad) generated by applying a geometric transformation operation to a predetermined standard code input mechanism.

According to a first aspect of UK patent application number 1506048.6, there is provided a method of securing user input of sensitive information. The method comprises (a) generating a first layout of a plurality of symbols for display on a first display to enable provision of a first sequence of user inputs, each user input corresponding to a respective one of the symbols on the first display; and (b) at a subsequent time, generating a second layout of the plurality of symbols for display on a second display to enable provision of a second sequence of user inputs, each user input corresponding to a respective one of the symbols on the second display. The first and second layouts are different from one another, and the first and second layouts each maintain a predetermined two-dimensional ordering of the plurality of symbols.

According to a second aspect of UK patent application number 1506048.6, there is provided a method of securing user input of sensitive information. The method comprises generating a layout of a plurality of symbols for display on a display to enable provision of a sequence of user inputs, each user input corresponding to a respective one of the symbols on the display. The generated layout is a modified version of a predetermined standard layout of the plurality of symbols. In other words, the generated layout is different from a predetermined standard layout of the plurality of symbols. Furthermore, the generated layout maintains a two-dimensional ordering of the predetermined standard layout of the plurality of symbols.

According to UK patent application number 1506048.6, the second layout may be scaled differently from the first layout. The second layout may be translated relative to the first layout. The second layout may be rotated relative to the first layout. The predetermined two-dimensional ordering of the plurality of symbols may comprise rows and columns of the plurality of symbols. The second layout may comprise a different spacing between one or more pairs of rows or columns as compared to the first layout. At least one of the first and second layouts may comprise one or more dummy symbols in addition to the plurality of symbols such that a user input corresponding to one of the dummy symbols is treated as a null input. The one or more dummy symbols may be arranged to form an extra row and/or column in the predetermined two-dimensional ordering of the plurality of symbols.

It is envisaged that the various keypad layouts described in UK patent application number 1506048.6 could be generated to form part of the passcode entry content described above in connection with the verification of user identity.

Notably, FIGS. 8A and 8C have been describe above in connection with verifying an end-user identity by means of some secret information that the end user knows. However, another option is for the end-user to demonstrate that they "have something" (e.g. a dongle, a smart card, a specific secured data store, a fingerprint, a specific voice pattern, etc.). Such an implementation operates by returning a variable end-user input sequence that is linked to the rendering of a variable request contained in a secured content file that was delivered to the computing device 500. The variable request rendered on the computing device 500 thus needs to result in a variable response. Some examples of possible variable user inputs based on something that the end-user has are as follows:

- The user is requested to upload a specific part of a specific video, using a video editing tool. Thus, the thing that the user has in this case is a specific video file.
- The user is requested to take a "selfie" and select a particular facial feature by cropping the image using some editing facility provided by the first software application 530. Thus, the thing that the user has in this case is their own face.
- The user is requested to make a voice recording of a particular word or phrase, or of a description of an item shown in an image or video. Thus, the thing that the user has in this case is their own voice.
- The user is requested to take a photo of a provider issued item with a specified background. Thus, the thing that the user has in this case is the provider issued item.
- The user is requested to make a fingerprint scan of a specific finger (or a sequence of such scans). Thus, the thing that the user has in this case is their own fingerprint(s).

In this embodiment, the server 540 has the information necessary to determine that the user input based on the request includes the requested part of the thing that the end-user has. Thus, the server 540 has a database 840 having the information necessary to compare the user input against the requested content. The database 840 may include a copy of a file (e.g. a specific video file), an image of an item issued to the end-user, the characteristics of the user's voice, fingerprint scans, or similar data. It will be appreciated that small functional changes to the system shown in the FIGS. 8A and 8C will be sufficient to implement this "something you have" user verification scheme.

In one embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to the above-described methodology for verification of user identity based on what a user has, the content comprises audio and/or video request content comprising a request for particular data associated with a particular user ID. The method further comprises: (b) obtaining data from the user in response to the rendering of the request content on the computing device; and (c) comparing the data from the user with the particular data associated with the particular user ID so as to verify whether the first software application is interacting with the user having that particular user ID.

An attacker does not have access to the request content, and possibly also does not have access to the particular data, so the attacker will not be able to fulfil the data request properly. Thus, this methodology potentially provides a double layer of security. As discussed above, the data may be an image file, a video file, an audio file, biometric data, or the like. Importantly, the data relates to something that only the particular end user has unrestricted access to. Thus, the method is suitable for verifying that the first software application on the computing device is interacting with a user having a particular user ID.

Finally, it should be noted that FIGS. 8A-8D share many similarities with FIGS. 7A-7D respectively, except where specific differences have been described.

Application C: Secure Transactions

Payment software applications often require some user interaction to define a transaction which usually concludes with a final interaction in which the user authorises a bank to perform a specified transaction. These final authorising steps might include displaying an amount to be authorised, and/or having the user enter a PIN that authorises the transaction. In one known attack against payment applications, an attacker has a software application running in the device that tampers with the display to change the amount and/or the details of the party that the amount is payable to. This causes the user to authorise a different transaction than the one displayed on the screen. The first aspect of the present invention is able to provide a defense against such attacks, as described below.

In this application example, the first software application 530 is a software application operable to obtain approval for a particular transaction that the first software application 530 performs on behalf of a particular end-user. The first software application 530 may utilise existing DRM clients 615 (and the corresponding media player applications 625) to enable secure payments/transactions. Examples of such transactions are a purchase from an electronic store, a purchase made within a computer game, or a bank transaction. The embodiments described below enable a software program to obtain an approval (or confirmation) from the user that is very hard to forge by an attacker.

An introductory transaction approval example is now briefly described. A payment amount to be approved/authorised would normally be displayed to a user (e.g. via the screen 120 of FIG. 1) as part of a still image which also includes a keypad. Preferably, the still image is randomly laid out and may have other countermeasures such as fine patterns in the graphic such that an attacker trying to overlay onto the screen would need to match the layout (which they do not have access to). For example, in a preferred embodiment, a variable keypad is used such that the locations of the characters (e.g. numbers and/or letters) in the displayed keypad are randomly assigned so that the character ordering is not known to an attacker. Thus, the same character ordering is unlikely to be used twice. This makes it very difficult for an attacker to determine a user's PIN by monitoring the input sequence, since the input sequence is randomly associated with the user's PIN. The still image may further comprise a shared secret (i.e. secret data that is known only to the user and the provider of the payment application) such as a particular logo and/or photograph, and/or specific text. The shared secret is not available to the attacker (as it is securely rendered by the DRM client 615), which makes it very difficult for an attacker to tamper with the display without alerting the user. In particular, a user will be alerted that the display has been tampered with if the shared secret is not correctly displayed (or is not displayed at all). Thus, the correct display of the shared secret may be used to verify to the user that the display has not been tampered with.

To enable confirmation of a transaction in this secure payment embodiment, an I-Frame (or video sequence) is generated based on the still image. The I-Frame is then made accessible to a DRM packager so as to generate a DRM-protected version of the I-Frame as well as a rights object for enabling the user's device 500 to unlock the video (as per standard DRM procedure). The I-Frame is then played on the user's device 500 through the protected video path as any normal piece of high value content would be. In other words, the first software application 530 sends the DRM-protected I-Frame to the media player 625 which accesses the DRM client 615 so as to enable secure rendering of the video on the client device 500. An attacker who has complete access to the device's main CPU (i.e. complete access outside the secured module) cannot see the rendered video because the DRM and video playback is isolated from the main CPU.

Confirmation of the transaction continues by the user pressing the "OK" button or entering a PIN on the keypad. The payment application 530 captures the location of the screen touches (or mouse clicks, for a non-touchscreen embodiment) and verifies (e.g. by reference to the relevant server 540) that the touches match the appropriate locations on the screen. An attacker can see the locations of the touches but does not know which digits they correspond to. Thus, the entire transaction is effectively invisible to any insider who has complete control of the non-secured application processor (i.e. main CPU) on the computing device 500.

This application of the media player embodiment is particularly relevant to mobile computing devices having touchscreens, such as smart phones and tablets and the like.

Figure 9A:
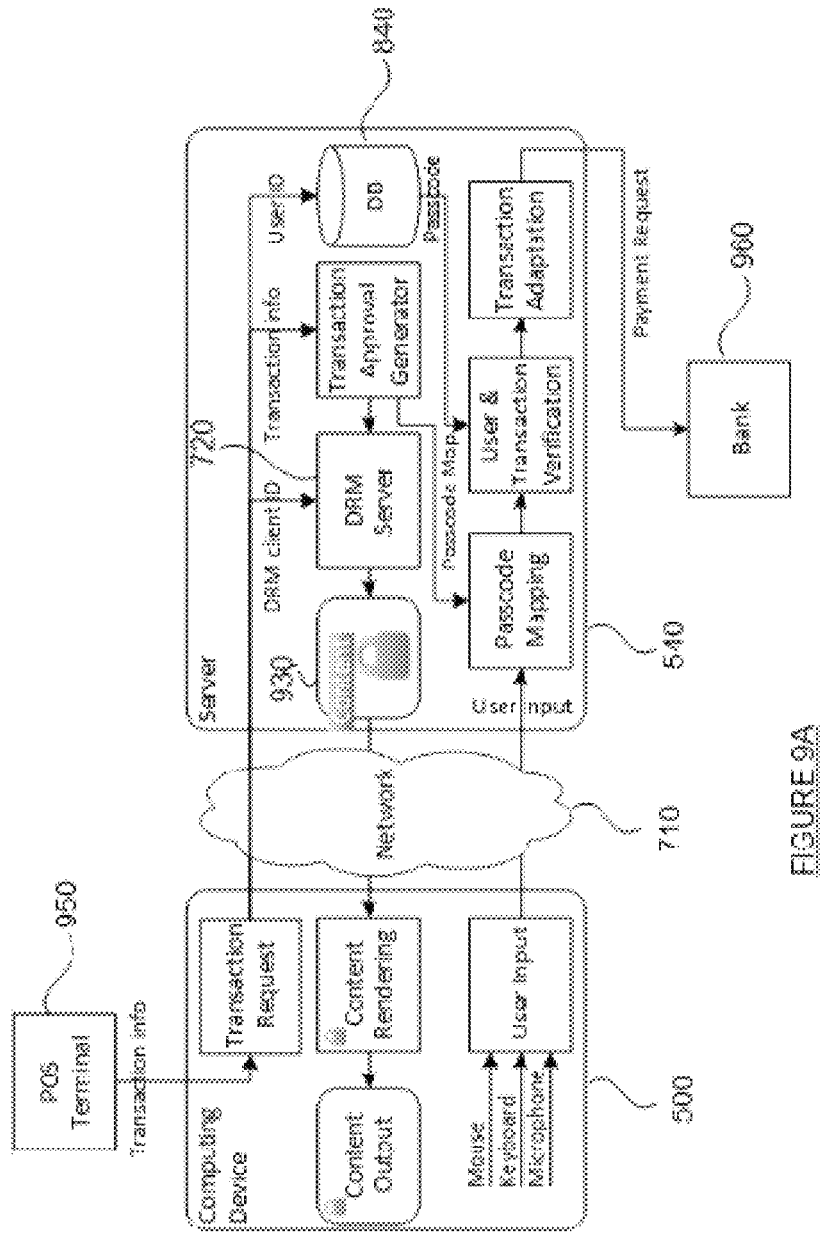
FIG. 9A schematically illustrates a device/server implementation for secure transactions with a POS terminal, again using the media player embodiment of FIG. 6.

FIG. 9A schematically illustrates an exemplary implementation of this secure transaction embodiment where the computing device 500 is connected by means of a network 710 to a server/service provider 540. As previously, the computing device 500 includes the first software application 530, the media player application 625, and the secured DRM client 615 which all function together to enable secured rendering and output of content on the computing device 500. The first software application 530, the media player application 625, and the secured DRM client 615 are not explicitly shown in FIG. 9A, but their functions are described below with reference to the elements shown in the Figure. The server 540 includes a DRM server 720 for creating DRM-protected content for rendering on the computing device 500 using the DRM client 615. The transaction details are provided by an external point of sale (POS) terminal 950, although other external sources could alternatively generate the transaction details (e.g. an online game software application triggering an in-game purchase). As described below, the computing device 500 exchanges information with the POS terminal 950 and the server 540 in order to enable the end-user to securely approve a transaction.

At some point during execution, the first software application 530 wishes to have a transaction with the POS terminal 950 approved by a particular user. The first software application 530 receives relevant transaction information (e.g. transaction amount, payee, etc.) from the POS terminal 950. This transaction information is sent to the server 540 upon instructions from the first software application 530. In addition, the first software application 530 instructs the computing device 500 to send non-sensitive user identifying information/user details (i.e. a user ID such as a nick name, a user name, an email address, a customer ID, a user account number, etc.) to the server 540. The first software application 530 also instructs the computing device 500 to send information relating to its DRM client 615 (e.g. a DRM client ID) to the server 540; this enables the server to prepare DRM-protected content for the specific computing device 500 on which the first software application 530 is running. The server has access to a database 840 containing all possible user IDs and the corresponding secret passcodes (which might be PIN codes or passphrases, etc.).

Upon request of the first software application 530, the server 540 uses a transaction approval generator to generate or select variable transaction approval content in the form of a video and/or audio content file which will be used to support the first software application 530 in obtaining user approval for the transaction. The video and/or audio content of the transaction approval content includes variable passcode entry content such as a variable keypad image for passcode entry (other examples of variable passcode entry content are described above with referenced to FIG. 8A). The video and/or audio content of the transaction approval content also includes at least some of the transaction information (which was previously provided to the server 540 by the computing device 500), and may include other content relevant to the commercial application.

Next, based on the DRM client ID (which was previously provided to the server 540 by the computing device 500), the DRM server 720 converts the transaction approval content into DRM-protected transaction approval content 930 suitable for rendering on the computing device 500. The server 540 sends the DRM-protected transaction approval content 930 to the computing device 500. The first software application 530 sends the DRM-protected transaction approval content 930 to the media player application 625 to thereby cause the media player application 625 to access the DRM client 615 so as to enable secured rendering of the transaction approval content on the computing device 500 (see the "content rendering" and "content output" of FIG. 8A). The DRM client 615 protects the rendered output against access by other software applications executing on the same computing device 500. The end user views and/or listens to the rendered transaction approval content which provides at least some of the transaction details and requests entry of a passcode. If the user wishes to proceed with the transaction then they provide an input (i.e. an input sequence) in response to the rendered passcode entry content. The user input might be a key board sequence, a mouse click sequence, a sequence of screen touches, some audio input, etc., as described above. The first software application 530 obtains this user input sequence that represents the passcode as input by the user. The first software application 530 obtains this input sequence and instructs the computing device 500 to send the user input sequence to the server 540. The user input sequence sent to the server 540 may include timings and/or locations of the user inputs. For audio inputs, timings and/or spoken words of the user input may be sent to the server 540.

Having received the user input sequence, the server 540 uses a passcode mapping module to map the user input sequence to an input passcode using information about the generated variable passcode entry content, as described above with reference to FIG. 8A. The server 540 then uses a user & transaction verification module to compare the passcode as input by the user to the passcode stored in the database 840 for that user ID. Thus, the end-user identifying information (i.e. the user ID) is used in this verification step. As part of the verification procedure, the server 540 provides a verification message to the first software application 530 indicating whether or not the input user passcode was the same as the stored user passcode. The first software application 530 then proceeds accordingly based on the received verification message. In other words, the verification message determines the continued execution of the first software application 530. For example, the first software application 530 is likely to return a transaction response message to the POS terminal 950 based on the verification message.

Figure 9B:
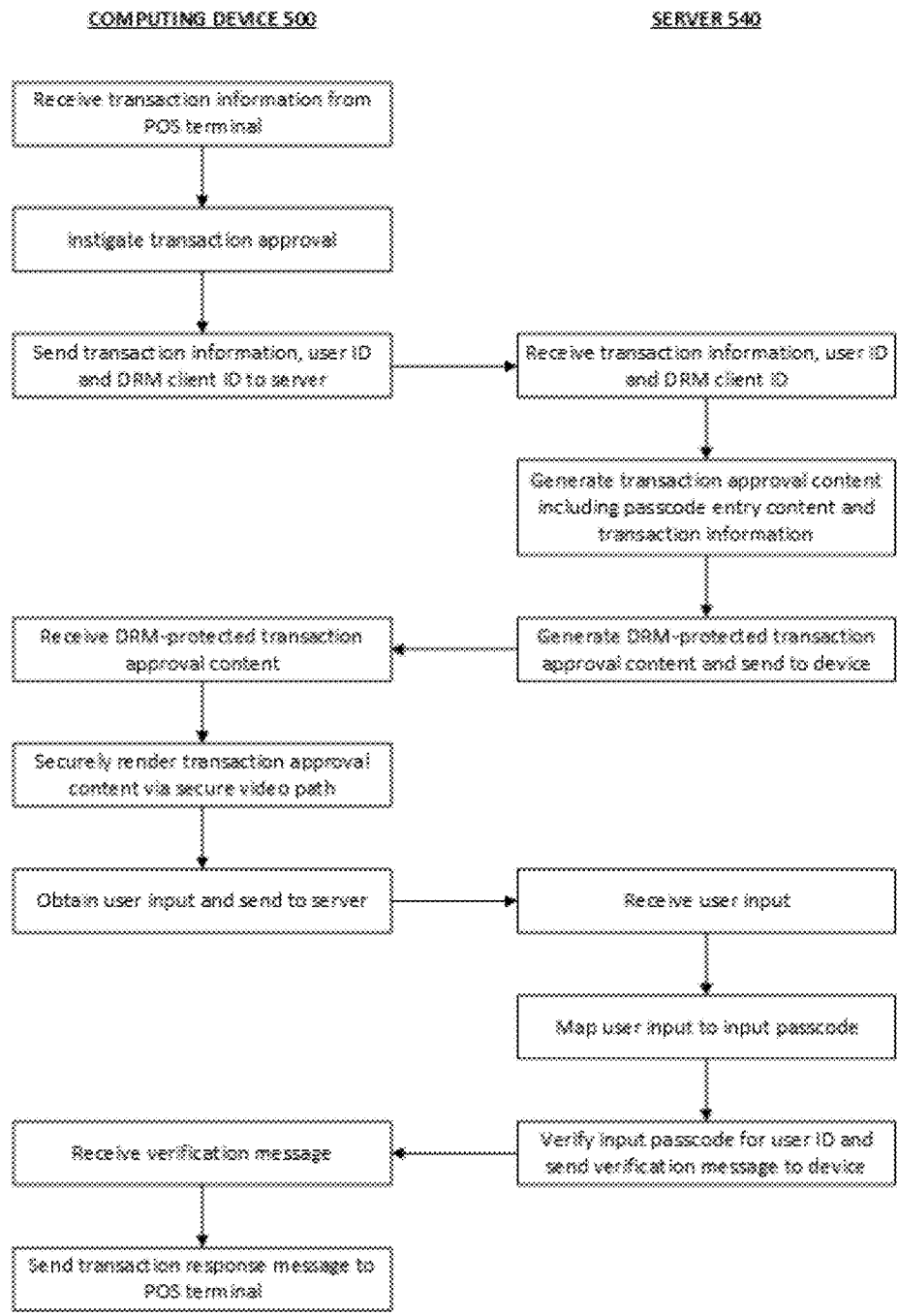
FIG. 9B is a flow chart schematically illustrating the methodology relating to the device/server implementation for secure transactions of FIG. 9A.

The above described server/device methodology is schematically illustrated in FIG. 9B which is a flow chart showing the method steps carried out by the computing device 500 and the method steps carried out by the server 540.

FIG. 9A shows a server 540 that enables the computing device 500 to securely approve a purchase transaction. After the user has approved the transaction as displayed in the transaction approval content, an optional transaction adaptation module in the server 540 may convert the approved transaction into a format suitable for processing in a legacy transaction infrastructure. In other words, the transaction information from the approved transaction may be reformatted and/or augmented for compatibility with a particular transaction infrastructure (e.g. the transaction infrastructure associated with the bank 960 shown in FIG. 9A). This may involve adding user-specific information, such as a bank details, and using cryptographic keys associated with the end-user to perform some cryptographic operations required for further processing. The additional user-specific information and the relevant cryptographic keys are contained in the database 840 on the server 540. Thus, in the embodiment of FIG. 9A, the computing device 500 does not need to have access to any sensitive user information and/or keys required for approving payments. This provides additional security.

The transaction adaptation functionality is commonly referred to as a "virtual secure element". The combination of the first software application 530 in the computing device 500 with a virtual secure element on the server 540 is equivalent to the functionality provided by traditional (wireless) banking smart cards and credit cards. The secure transaction methodology described herein extends the virtual secure element concept with the ability to securely approve payment transactions even on a compromised client computing device.

Figure 9C:
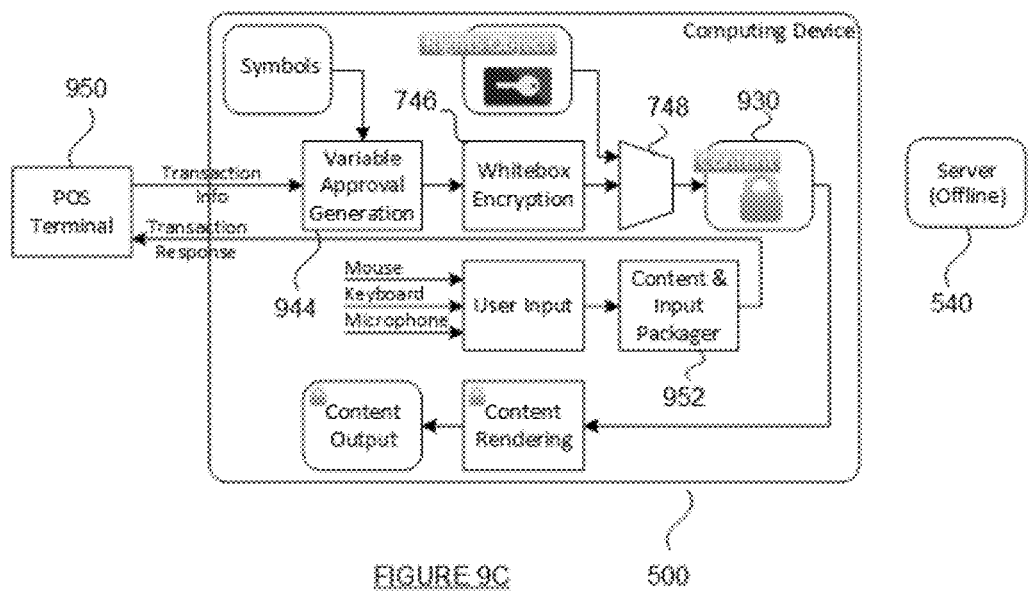
FIG. 9C schematically illustrates an alternative implementation of the secure transaction implementation of FIG. 9A for when the server is offline.

If the communication network 710 between the computing device 500 and the server 540 is not operational, the embodiment described above with reference to FIG. 9A is not able to provide approval of any transaction. FIG. 9C schematically illustrates a local embodiment in which the first software application 530 is able to approve a transaction even when server 540 is temporarily offline. In this embodiment, the computing device 500 generates or selects the transaction approval content internally. In particular, the first software application 530 is configured to generate or select the DRM-protected transaction approval content 930.

As before, the first software application 530 executes on the computing device 500 (e.g. in the application processor module 220). The first software application encodes (at least some of) the transaction information together with variable passcode entry content into a transaction approval content file. The first software application 530 then uses the previously described steps (see FIGS. 7B and 8C) to generate DRM-protected transaction approval content 930. As before, the first software application 530 sends the DRM-protected transaction approval content to the media player application 625 to thereby cause the media player application 625 to access the DRM client 615 so as to enable rendering of the transaction approval content on the computing device 500. The transaction approval content is thereby rendered on the computing device 500 using the protected content rendering pathway. The DRM client 615 is configured to prevent and/or restrict other software applications executing on the computing device 500 from accessing the transaction approval content. As before, the end user views and/or listens to the rendered transaction approval content, which provides at least some of the transaction details and requests entry of a passcode.

Next, the first software application 530 obtains (i.e. collects and records) the user input (which may be a sequence of user inputs) and packages it with the DRM-protected transaction approval content 930 using a content and input packager 952. As the server 540 is offline, the packaged data is returned as transaction response message to the POS terminal 950. The POS terminal 950 may then forward the transaction response message for further processing in the payment infrastructure. In particular, the POS terminal 950 and its payment infrastructure may forward the transaction response message to the server 540 when the server 540 is back online. The transaction response message may then be analysed by the server 540 and converted into a verification message that is compatible with the payment infrastructure of the POS terminal 950. This may require some adaptations of the data processing protocols in the payment infrastructure. The main benefits of the embodiment of FIG. 9C are that it is hard for an attacker to observe or modify the passcode entry content, and that only a single communication is required from the first software application 530 in the computing device 500 to the POS terminal 950.

Figure 9E:
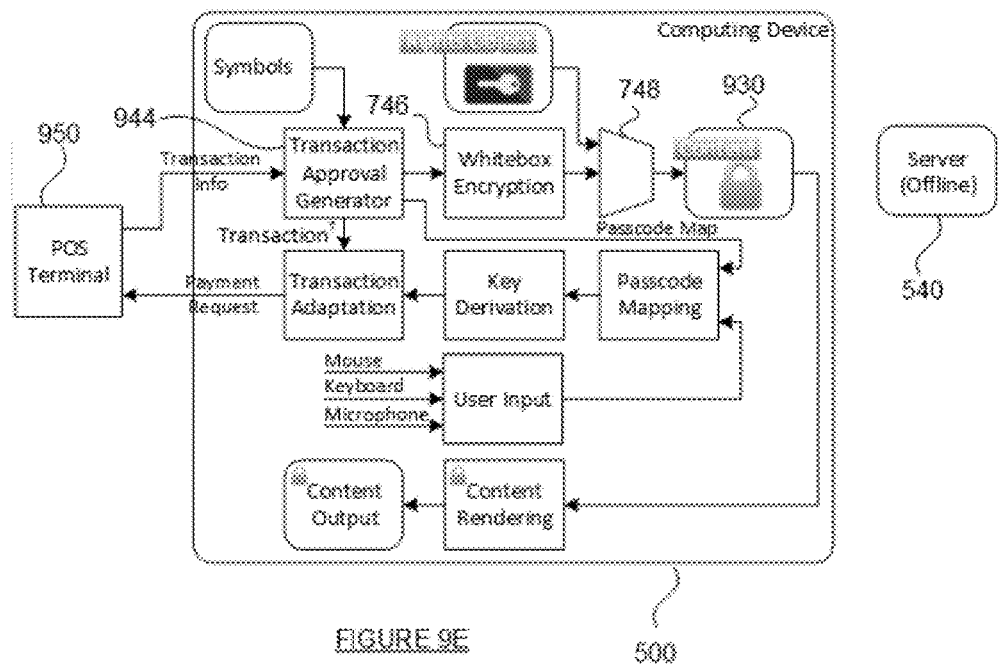
FIG. 9E schematically illustrates a local device implementation for secure transactions with a POS terminal, again using the media player embodiment of FIG. 6.
Figure 9D:
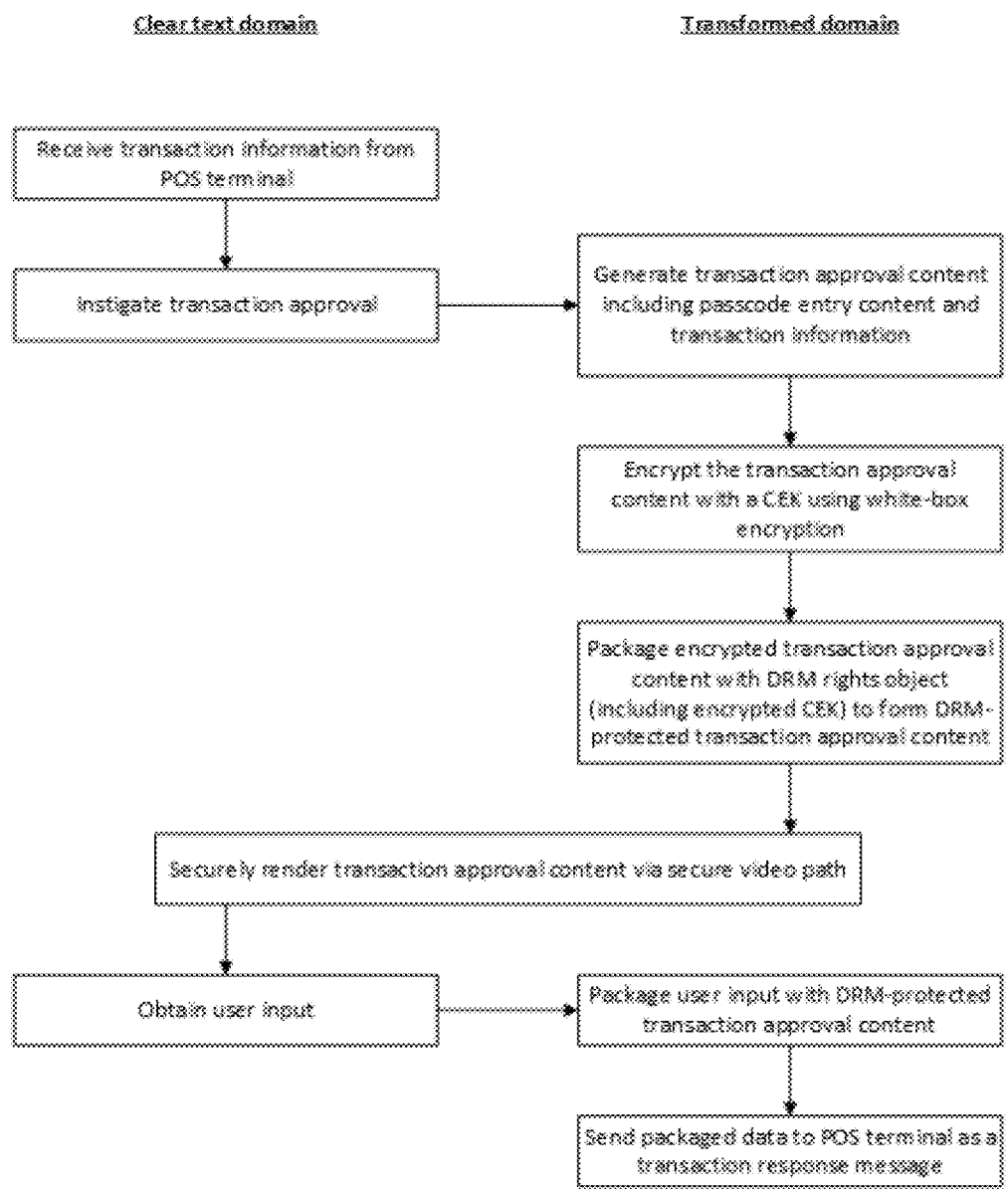
FIG. 9D is a flow chart schematically illustrating the methodology relating to the offline server implementation for secure transactions of FIG. 9C.
Figure 9E:
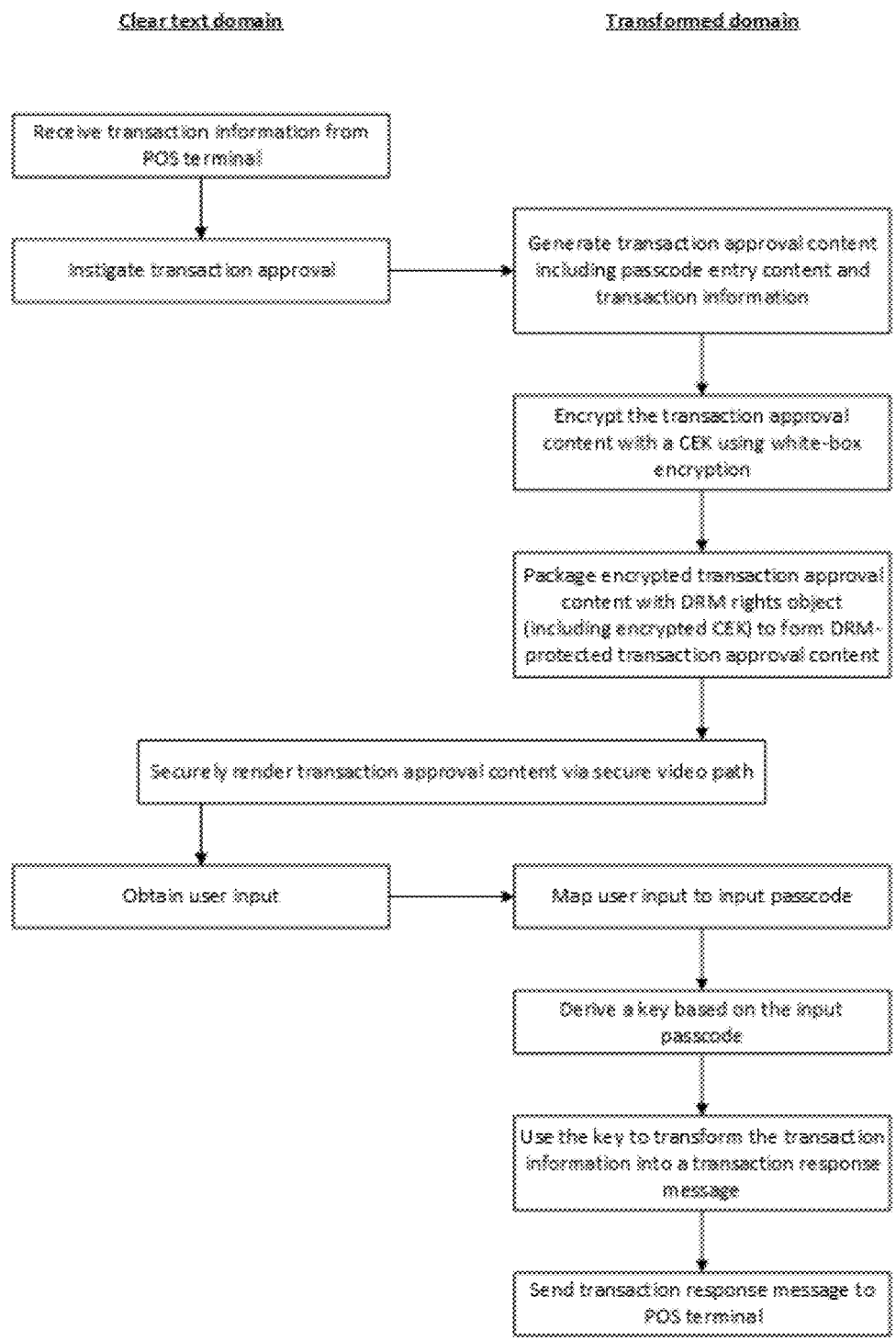

The above described local device methodology is schematically illustrated in FIG. 9D which is a flow chart showing the method steps carried out in the clear text domain (i.e. without software obfuscation) and the method steps carried out in the transformed domain.

It should be noted that FIGS. 9A-9D share many similarities with FIGS. 7A-7D (and 8A-8D) respectively, except where specific differences have been described.

If the protocols of the payment infrastructure or of the POS terminal 950 do not support the inclusion and forwarding of the transaction response message to the server 540 (as in the implementation of FIG. 9C), a different implementation is necessary. Such a modified implementation is schematically illustrated in FIG. 9E, which shows the architecture of a first software application 530 operable to approve a payment transaction and to return a transaction response message (e.g. a payment approval) that is compatible with the existing POS terminal 950 and its payment infrastructure. FIG. 9E contains several elements that have been described above.

After the POS terminal 950 requests approval for a transaction (a payment for a service, goods and the like), the first software application 530 generates the DRM-protected transaction approval content 930 as described above with reference to FIG. 9C. In the transformed domain (e.g. using software obfuscation), the sequence of user inputs is mapped to a sequence of code entry symbols. In particular, the first software application 530 accesses the passcode entry content (in the transformed domain) and uses this to map the user input to an input passcode. Still in the transformed domain, the input passcode is then combined with transformed data of the first software application to derive a key. A transaction adaptation module of the first software application 530 then uses the key to transform the transaction information into a transaction response message (e.g. a payment authorisation or a payment refusal) that can be processed by the POS terminal 950 and its payment infrastructure.

The first software application 530 is more vulnerable to attack in the implementation of FIG. 9E than in the implementations of FIG. 9A or 9C. For example, an attacker might be able to insert modified transaction information into the transaction adaptation module after the end-user has approved a different transaction. Software obfuscation measures can be used to make this attack more difficult. It is envisaged that the implementation of FIG. 9A would be used where possible, with FIG. 9C providing the fallback implementation, and then FIG. 9E representing a last resort implementation. Thus, a further defensive measure against attacks relies on the fact that the mode of operation shown in FIG. 9E will be used relatively infrequently. It would also be possible to include elements in the payment request and the cryptographic keys for limiting the maximum transaction value for the mode of operation shown in FIG. 9E. For higher value transactions the more secure online implementation of FIG. 9A (or possibly FIG. 9C) would then need to be used. With such additional measures, the implementation of FIG. 9E can provide a useful degradation of functionality in case of limited network connectivity.

The above described local device methodology is schematically illustrated in FIG. 9F which is a flow chart showing the method steps carried out in the clear text domain (i.e. without software obfuscation) and the method steps carried out in the transformed domain.

An alternative local methodology for generating the DRM-protected transaction approval content 830 is described at the end of the "Application D: Secure code generation" section with reference to FIGS. 12A-D; this alternative local methodology avoids the use of the white-box encryption module 746. In this case, the "image" to be encrypted is the transaction approval content. The library of pre-encrypted blocks of data will be chosen dependent on the variety of transaction approval content.

Importantly, whilst the above transaction examples describe the computing device 500 undergoing a transaction with a POS terminal 950, it will be understood that a variety of other transaction approval environments exist where the present methodology would be equally applicable. Specifically, a POS terminal is one example of a third party with which the computing device 500 wishes to transact. Instead, other third party devices/servers could provide the relevant transaction information, etc. In addition, other intermediaries may be involved (e.g. an online game software application triggering an in-game purchase would involve a third party gaming server instead of the POS terminal 950). In another example, online banking transactions only require interaction between the computing device 500 and the server 540 (i.e. there would be no external third party such as the POS terminal 950). In this case, the transaction information would already be known by the server 540, so there would be no need for the device 500 to send the transaction information to the server as part of the flow shown in FIG. 9B. Thus, it will be understood that the description above with reference to FIGS. 9A-9F is exemplary rather than limiting, and a per son skilled in the art will appreciate the more general applicability of the methodology to general transactions between the computing device 500 and another party which require approval by the user.

In one embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to the above-described secure transaction embodiment, the computing device further comprises an input device for obtaining a user input. The content comprises audio and/or video approval code entry content and transaction content, wherein the transaction content comprises transaction information relating to a transaction to be approved by a user having a particular user ID. The method further comprises: (b) requesting user input of an approval code associated with the particular user ID; and (c) obtaining a user input from the input device in response to the rendering of the content on the computing device. Notably, the content may further comprise audio and/or video content representing the request for user input of the approval code associated with the particular user ID, as in step (b). Thus, steps (a) and (b) may be performed concurrently (i.e. the user input request of step (b) may implicitly form part of the rendered content in step (a)). The method may further comprise the first software application initially receiving a transaction request comprising the transaction information. The approval code may be a passcode associated with the particular user ID. In this case, the approval code entry content comprises passcode entry content, such as a keypad. Alternatively, the approval code may comprise another form of approval input, such as a fingerprint, or photo, or dongle, etc.

In a preferred embodiment the computing device has access to a server (as in FIG. 9B) to verify the input approval code. The method may further comprise the first software application attempting to connect to a server, and continuing with some/all of the steps described in this paragraph in response to a successful connection to the server. In this embodiment, the method further comprises the first software application receiving the DRM-protected content from the server. The method may further comprise the first software application sending data associated with the DRM client (e.g. a public key or DRM client ID) to the server for use in generating the DRM-protected content. The method may further comprise the first software application sending to the server identification information associated with a user of the computing device (e.g. a user ID). The identification information may be used in generating the DRM-protected content. The method may further comprise the first software application sending at least some of the transaction information to the server for use in generating the transaction content. The method may further comprise the first software application sending to the server the received user input, and the first software application subsequently receiving a verification message from the server, wherein the verification message is based on a comparison between the received user input and an approval code associated with the particular user ID. Thus, using the approval code entry content, the server maps the received user input to an input approval code. Then, using the identification information, the server performs a comparison of the input approval code and the approval code associated with the particular user ID so as to generate a verification message for sending to the computing device.

Now consider the alternative embodiment whereby the computing device does not have access to the server. Thus, in response to a failed connection to the server, the method may further comprise some/all of the steps described in this paragraph. The local implementation of secure transactions may have many features/steps in common with local implementations described above in sections 4A and 4B, so these features/steps will not be repeated here. However, in a first local secure transaction embodiment, the method further comprises the first software application ($d_1$) packaging the obtained user input with the DRM-protected content to form packaged data, and ($e_1$) providing the packaged data as a response to the initial transaction request. Thus, in this embodiment, the device receiving the packaged data will subsequently send the packaged data to the server (e.g. once the server is back online) so that the server can map the obtained user input to the input approval code using the approval code entry content (as in the client-server embodiment), but this mapping will be performed later once the POS terminal is able to connect to the server. In a second local secure transaction embodiment, the method may further comprise the first software application instead performing the steps of ($d_2$) mapping the obtained user input to an input approval code, wherein said mapping requires access to the approval code entry content; and ($e_2$) comparing the input approval code with the approval code associated with the particular user ID so as to verify the particular user has approved said transaction. Thus, in this second local embodiment, the mapping step is performed locally on the computing device 500 by the first software application 530. Steps ($d_2$) and ($e_2$) should be implemented by means of secured software code, like the secured software code used to generate the DRM-protected content. In this second local embodiment, the verification step ($e_2$) may include steps of deriving a key based on the input approval code, and using the key to transform the transaction information into a transaction response message, wherein the transaction response message is a transaction approval message if the input approval code matches the approval code associated with the particular user ID, and wherein the transaction response message is a transaction refusal message if the input approval code does not match the approval code associated with the particular user ID.

In both the client-server and local embodiments, an attacker does not have access to the approval code entry content. Thus, an attacker monitoring user inputs on the input device is unable to map the user inputs to an input approval code, so cannot gain access to this sensitive data.

Application D: Secure Code Generation

A barcode is an optical machine-readable code which represents/encodes particular data. One-dimensional (1D) barcodes systematically represent data by varying the widths and spacings of parallel lines. More recently, barcodes have evolved to use rectangles, dots, hexagons and other geometric patterns in two dimensions (2D). A matrix code, also termed a 2D barcode or simply a 2D code, is a two-dimensional way to represent information. It is similar to a linear (1-dimensional) barcode, but can represent more data per unit area. A QR code is an example of a matrix code.

There are existing transaction authorisation systems that rely on a merchant at a POS to optically scan a barcode (e.g. a QR code) from the screen of an end user's mobile computing device. In such existing systems, a local barcode generation software application obtains a secret code from the end user, combines it with other parameters established during initialisation and/or associated with the environment of the mobile application (GPS, WiFi network data, etc.) and uses this information to generate the barcode for display on the mobile computing device. The merchant scans the screen of the mobile computing device displaying the generated approval code, attaches it to transaction information and forwards this to the payment infrastructure. The user of the device only allows the scanning process when finalising the purchase.

However, a problem with the above described existing systems is that the barcode generation software application is vulnerable to attacks, e.g. attacks launched from a compromised or rooted mobile computing device. A compromised mobile computing device contains malware (see, e.g. http://en.wikipedia.org/wiki/Malware), and a rooted mobile computing device contains a rootkit (see, e.g., http://en.wikipedia.org/wiki/Rootkit). Embodiments of the present invention may be used to solve this problem by generating and displaying DRM-protected content comprising the barcode. In this case, the first software application 530 is a software application operable to securely generate a barcode (or other machine-interpretable code).

Figure 10A:
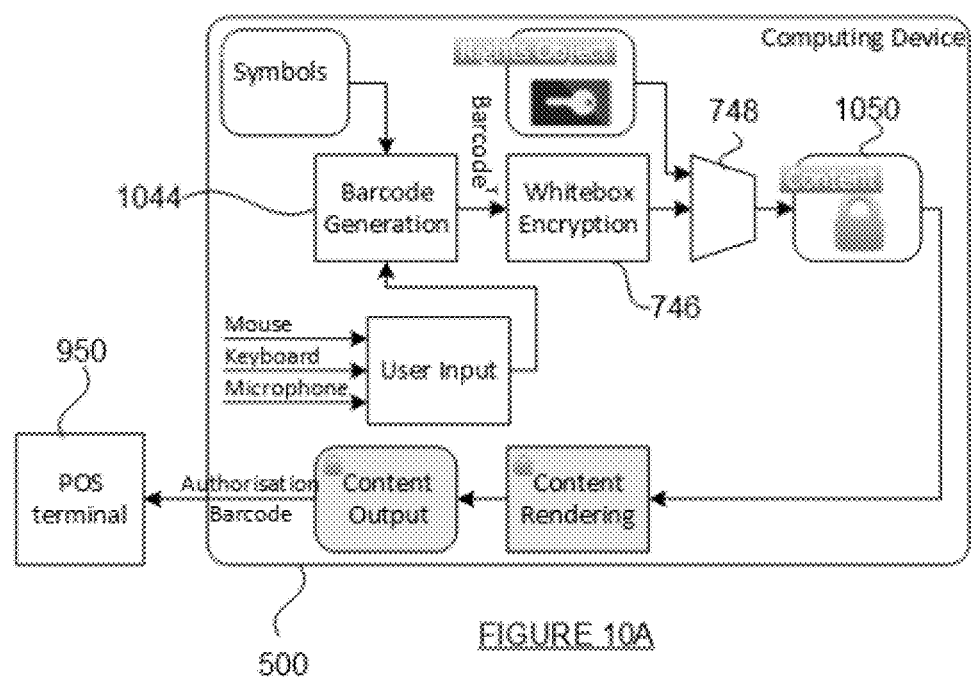
FIG. 10A schematically illustrates a local device implementation for secure code generation, e.g. to enable transactions with a POS terminal, again using the media player embodiment of FIG. 6.

FIG. 10A schematically illustrates an exemplary implementation of this secure barcode generation embodiment where the barcode is generated locally on the computing device 500. As previously, the computing device 500 includes the first software application 530, the media player application 625, and the secured DRM client 615 which all function together to enable secured rendering and output of content on the computing device 500. The first software application 530, the media player application 625, and the secured DRM client 615 are not explicitly shown in FIG. 10A, but their functions are described below with reference to the elements shown in the Figure. FIG. 10A shows how the first software application 530 on the computing device may be used to generate the barcode for authorisation of a transaction or identification of an end user at a POS terminal 950.

At some point during execution, the first software application 530 wishes to provide a barcode representing data for use by the POS terminal. It may be desired that the barcode simply represents user or device data as stored on the mobile computing device 500. For example, it may be desired that the barcode represent user or device identification information (such as a telephone number), or bank or credit card details of the user, or a customer number of the user relating to the POS terminal 950. In such cases, no user input is required, and the computing device 500 may generate a secure barcode based on this data without interaction from the user. Thus, in the transformed domain (e.g. using software obfuscation techniques), the first software application 530 takes the transformed data and uses a barcode generator module 1044 to generate a transformed barcode (barcode$^T$). For example, the first software application might take transformed bank account details, and then apply a transformed barcode generation algorithm. It is optionally possible to use a transformed compression algorithm during generation of the transformed barcode. The first software application 530 then encrypts the transformed barcode using a white-box encryption module 746. The encrypted and transformed barcode is then combined (using a multiplexer 748) with a corresponding DRM rights object to produce DRM-protected barcode content 1050. An alternative local methodology for generating the DRM-protected barcode content 1050 is described at the end of this section; this alternative local methodology avoids the use of the white-box encryption module 746.

The first software application 530 sends the DRM-protected barcode content 1030 to the media player application 625 to thereby cause the media player application 625 to access the DRM client 615 so as to enable secured rendering of the barcode content 1030 on the computing device 500 (see the "content rendering" and "content output" of FIG. 10A). The DRM client 615 protects the rendered output against access by other software applications executing on the same computing device 500. The securely rendered barcode may then be scanned by an optical reader at the POS terminal 950, e.g. for approval of a transaction. The first software application 530 for secure code generation as described above prevents an attacker from reading the screen or to displaying the generated DRM-protected barcode content on another device. Thus, an attacked would be forced to reverse engineer the secured code generation of the first software application 530.

In a variant, user input may additionally be required for generation of the barcode. For example, the first software application 530 may be modified to request and authenticate a passcode (e.g. PIN) from the end user prior to generating and securely rendering the barcode. This is illustrated by the arrow from the user input module to the barcode generation module 1044 in FIG. 10A. In this case, the barcode not only shows that a specific mobile computing device 500 was present at the POS terminal 950, but also that there was a particular end user present during the generation of the barcode. Passcode entry is described in detail in the "Verification of user identity" section above, so will not be repeated here.

Figure 10B:
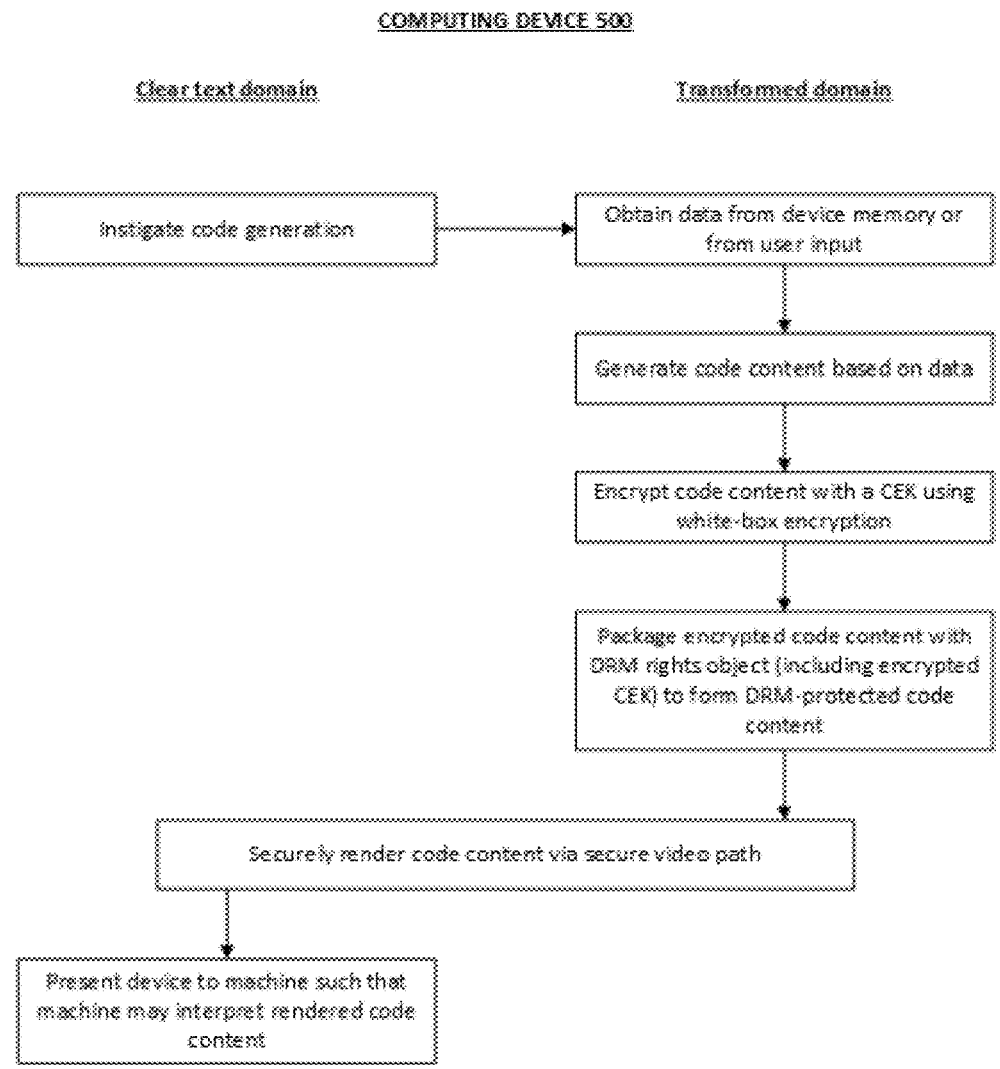
FIG. 10B is a flow chart schematically illustrating the methodology relating to local device implementation for code generation of FIG. 10A.

The above described local device methodology is schematically illustrated in FIG. 10B which is a flow chart showing the method steps carried out in the clear text domain (i.e. without software obfuscation) and the method steps carried out in the transformed domain.

An alternative example requiring user input is now described. In this case, the barcode not only shows that a specific mobile computing device 500 is present at the POS terminal 950, but also that there is a human person present during the generation of the barcode (rather than a machine). Thus, this embodiment has some similarities with the robot avoidance embodiment described previously.

In this embodiment, the first software application 530 may be modified such that it initially generates and securely displays a barcode that is (at least) partially obscured in such a way that it cannot be read/recognised/interpreted by the barcode scanner at the POS terminal 950. Generation and display of the obscured barcode are accomplished exactly as described above with reference to FIG. 10A except that an obscuration step takes place prior to the whitebox encryption in this case.

Figure 10C:
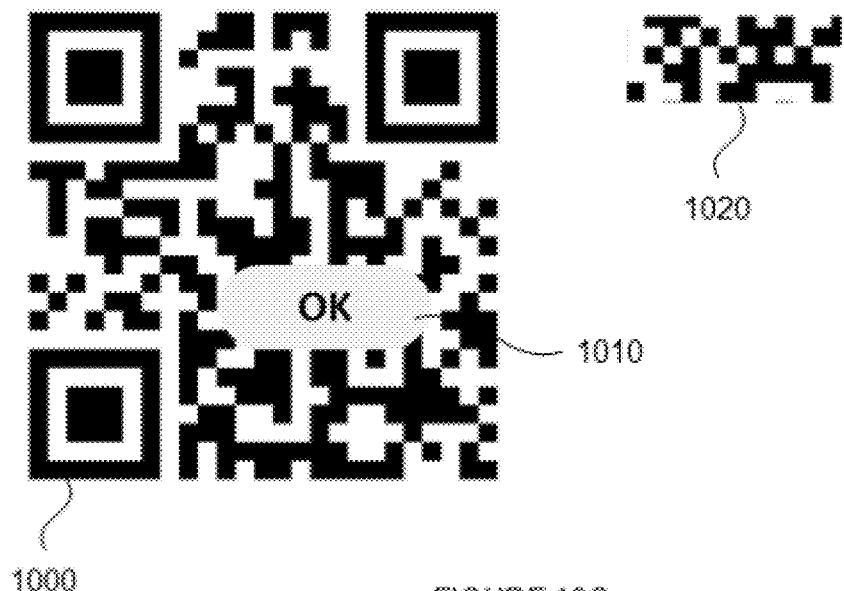
FIG. 10C shows an example of a partially obscured QR code which might be generated as an intermediate step using the methodology of FIG. 10A.
Figure 10D:
FIG. 10D shows a corrected (i.e. non-obscured) version of the partially obscured QR code of FIG. 10C.

An example of a partially obscured barcode 1000 is shown in FIG. 10C. In this example, the barcode is a QR code, but other types of barcodes could equally be used. The QR code 1000 is partially obscured by an "OK" button 1010 at a random location in the image. In this example, the missing portion 1020 of the obscured QR code 1000 is securely rendered in the displayed image to the side of the obscured QR code 1000, but the display of the missing portion 1020 is not essential. In response to the securely rendered (and partially obscured) QR code 1000, the user presses the "OK" button 1010 on the screen of the computing device 500. The first software application 530 then receives the user input, i.e. the coordinates of the screen press. Assuming that the coordinates of the screen press match the coordinates of the "OK" button 1010, the first software application 530 goes on to generate and securely render a corrected (i.e. final) QR code 1030 (with no obscuration), as shown in FIG. 10D. Specifically, the first software application re-uses the barcode generation module 1044, the white-box encryption module 746 and the multiplexer 748 to generate the corrected barcode 1030. Since the coordinates of the "OK" button 1010 can be varied, it is not possible for an attacker (who does not have access to the securely rendered content) to know the correct input (i.e. the correct coordinates) for the correction process. In one example, the coordinates of the user input may be used to correctly position the missing portion 1020 on top of the "OK" button 1010.

Figure 10E:
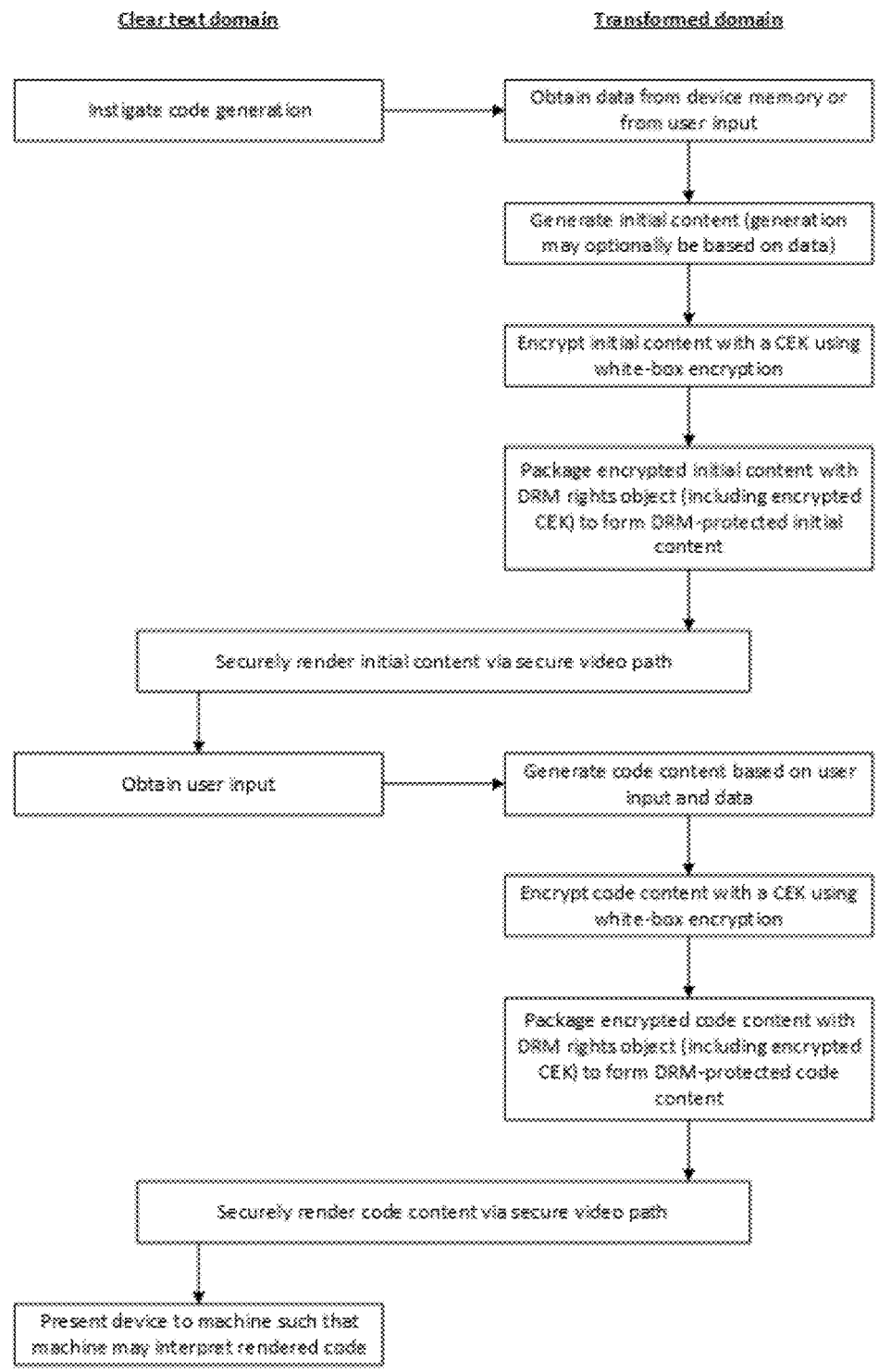
FIG. 10E is a flow chart schematically illustrating an alternative methodology relating to local device implementation for code generation of FIG. 10A.

The above described local device methodology is schematically illustrated in FIG. 10E which is a flow chart showing the method steps carried out in the clear text domain (i.e. without software obfuscation) and the method steps carried out in the transformed domain. In FIG. 10E, the partially obscured barcode is referred to as "initial content".

Whilst the "OK" button 1010 was used for obscuration purposes in the example above, it will be understood that other obscuring techniques may alternatively be used. Exemplary obscuration techniques include reduced contrast, colour mapping, blurring, and similar techniques to prevent the barcode from being able to be scanned by the POS terminal. The obscuring process can also be combined with human presence detection techniques as described above with respect to the robot avoidance embodiment.

Also, it should be noted that passcode entry can be combined with obscuring the barcode, such that the correction process involves the user input representing the passcode (rather than the user input representing the location of the "OK" button in the above example).

It will be understood that secure barcode generation (as described above) may occur sequentially after obtaining a user input using any of the mechanisms described in the previous application sections A, B and C. These variant sequential processes provide similar functionality and a comparable level of protection, and they all are secure even in severely compromised (mobile) computing devices 500.

This secure code generation embodiment of the invention has been described above with reference to barcodes. However, it will be understood that any DRM-protected output (video, image, audio) that can be machine-interpreted can be used in alternative embodiments.

Thus, in this embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to the above-described secure code generation embodiment, the content comprises audio and/or video content in the form of a machine-interpretable code. The method further comprises: (b) presenting the computing device to a machine separate from the computing device such that the machine may interpret the code rendered on the computing device.

An attacker does not have access to the rendered code. Thus, an attacker cannot gain access to this sensitive data. The method enables the first software application on the computing device to be used to approve/authorise a transaction using the code, for example.

Optionally, the computing device further comprises an input device for obtaining a user input and, prior to steps (a) and (b), the method further comprises: (c) the first software application sending DRM-protected initial content to the media player application to thereby cause the media player application to access the DRM client so as to enable rendering of the initial content on the computing device, wherein the DRM client is configured to prevent and/or restrict other software applications executing on the computing device from accessing the initial content; (d) obtaining a user input from the input device in response to the rendering of the initial content on the computing device; and (e) in response to the user input being a valid user input associated with the rendered initial content, proceeding to perform steps (a) and (b).

The initial content may comprise a partially obscured version of the machine-interpretable code that is securely rendered in step (a). In this case, the user input may be related to a location of the obscuration. Alternatively, the initial content may comprise audio and/or video passcode entry content, as described previously. Alternatively, the initial content may comprise audio and/or video request content, as described previously.

In a preferred embodiment, the machine-interpretable code is a barcode, such as a QR code.

The DRM-protected content may be generated locally on the device 500, or may be generated by a server.

In a client-server implementation, the method further comprises the first software application receiving the DRM-protected content (and, where applicable, the initial DRM-protected content) from a server. The method may further comprise the first software application sending data associated with the DRM client (e.g. a public key or DRM client ID) to the server for use in generating the DRM-protected content (and, where applicable, the initial DRM-protected content). The method may further comprise the first software application sending to the server the received user input such that the server may verify whether the received user input is valid for the initial content. In this case, the server need only send the subsequent DRM-protected content to the device (for rendering in step (a)) when the received user input is valid.

Regarding a local implementation, the method further comprises the first software application generating the DRM-protected content (and, where applicable, the initial DRM-protected content) by means of secured software code that is resistant against whitebox attacks. The secured software code may be secured by means of software obfuscation (i.e. use of a transformed domain). The secured software code may be configured to generate or select content to be DRM-protected, and to encrypt the content, thereby generating the DRM-encrypted content. The content may be encrypted using a whitebox encryption module. Data associated with the DRM client (e.g. a public key or DRM client ID) may be used in encrypting the content. In one embodiment, the secured software code may be configured to encrypt the content using a content encryption key (CEK), and the secured software code may be configured to package the encrypted content with the CEK to generate the DRM-protected content. In each case, the DRM client is configured to decrypt the DRM-protected content.

One local methodology for generating the DRM-protected code content 1050 was described above with reference to FIGS. 10A and 10B. We now describe an alternative methodology for generating a DRM-protected version of an image (e.g. the DRM-protected barcode content 1050). This alternative local methodology avoids the use of the white-box encryption module 746 of FIG. 10A by instead using a library of pre-encrypted blocks of data, as described below.

In summary, there is described a method of generating an encrypted version of an image (e.g. a machine-readable code) using a library of pre-encrypted blocks of data, the same content encryption key (CEK) having been used to encrypt each of the pre-encrypted blocks of data. The method comprises forming the encrypted version of the image from an ordered sequence of pre-encrypted blocks of data from the library, where each pre-encrypted block of data in the ordered sequence corresponds to a respective sub-image of a plurality of sub-images making up the image. This method will be described below with reference to an embodiment in which the image comprises a QR code, but it will be appreciated that the image to be protected could instead comprise another form of machine-readable code (such as a barcode), or could comprise a keypad, for example. In fact, the image to be protected could be any image which is made up of a pre-determined set (or "alphabet") of sub-images. For example, an image consisting of text could be formed using a predetermined set of sub-images corresponding to letters, numbers and punctuation marks.

Figure 12A:
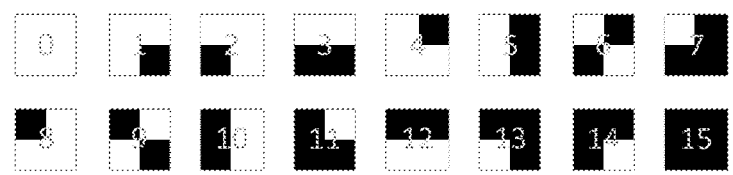
FIG. 12A shows a set of sub-images which may together be used to generate any QR code.

With reference to the QR code example, FIG. 12A shows 16 different sub-images which may be used to generate any QR code. Notably, the same 16 sub-images may also be used to generate any other black and white (binary) image. The 16 sub-images have been numbered from 0 to 15 in FIG. 12A. It will be appreciated that the 16 sub-images shown in FIG. 12A are exemplary, and that a QR code could in fact be formed from a number of different sets of sub-images. One other example is a set of 2 sub-images, one being a black square (e.g. a 1 pixel square, or bigger) and the other being a corresponding white square. It will be appreciated that other such sets of sub-images also exist. Preferably, for processing efficiency, the sub-images are larger than a single pixel, e.g. at least an order of magnitude larger (10 or more pixels) or two orders of magnitude larger (100 or more pixels). In this way, an image may be generated from a total number of sub-images that is smaller than the total number of pixels in the image. Thus, the present methodology is more suited to generating encrypted versions of images that do not have a high spatial resolution. Hence, the present methodology is particularly well-suited to generated encrypted versions of QR codes, for example, which are very simple binary (black and white) images with low spatial resolution relative to a standard smart phone screen resolution, for example.

Figure 12B:
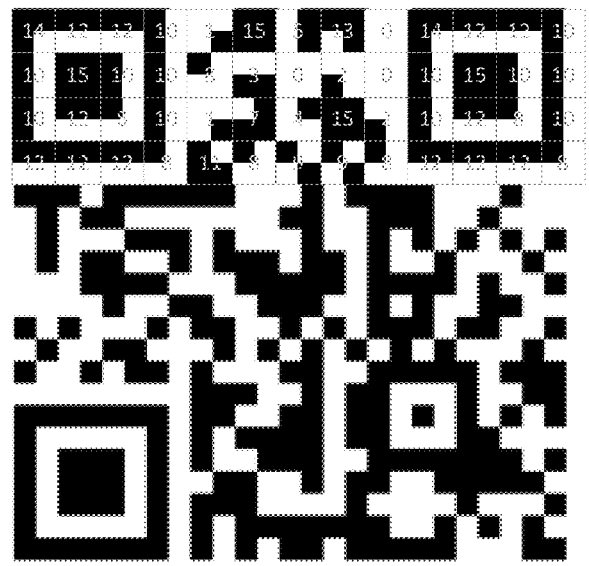
FIG. 12B shows an exemplary QR code and illustrates the sub-images of FIG. 12A that are used to form the top portion of the QR code.

An exemplary QR code is shown in FIG. 12B. In FIG. 12B, the top part of the QR code is overlaid with a sequence of numbered sub-images corresponding to the numbered sub-images shown in FIG. 12A. If the content encoding scheme uses a left to right and top to bottom scan line format and the block size equals the scan line size, the block sequence {14, 12, 12, 10, 1, 15, 5, 13, 0, 14, 12, 12, 10, 10, 15, 10, 10, 8, 3, 0, 2, 0, 10, 15, 10, 10, 10, 12, 8, 10, 1, 7, 4, 15, 2, 10, 12, 8, 10, 12, 12, 12, 8, 11, 8, 9, 9, 8, 12, 12, 12, 8} encodes the first four lines (rows) of the QR image. It should be clear that the entire image can be encoded using this mechanism. Thus, any QR code can be constructed based on an ordered sequence of the sub-images shown in FIG. 12A.

Therefore, in order to avoid the use of a white-box encryption module, it is possible to pre-encrypt each of the pre-determined "alphabet" of sub-images shown in FIG. 12A to form a library of pre-encrypted blocks of data. Each of the pre-encrypted block of data is encrypted using the same CEK. The library of pre-encrypted blocks of data is accessible to a software application (referred to hereafter as "the app") on the device. The app may be the first software application. The app has knowledge of what each encrypted block of data contains. In other words, the app has access to the mappings between the sub-images shown in FIG. 12A and the pre-encrypted blocks of data stored in the library. As each pre-encrypted block of data always corresponds to the same sub-image, it is possible to use data transformation techniques to make it difficult for an attacker to obtain the encrypted blocks from the application software. Given the library of pre-encrypted blocks of data, the app can use a modified QR code generation algorithm that generates a sequence of block identifiers and outputs a corresponding sequence of pre-encrypted blocks of data from the library to produce an encrypted version of the image/QR code. As video encoding formats assign implicit placement information based on the order of the encoded image data (e.g. a left to right, top to bottom sequence), the placement order of pre-encrypted blocks of data can be used to generate different QR codes using only pre-encrypted blocks of data.

In a preferred embodiment, the encrypted version of the image (comprising the ordered sequence of pre-encrypted blocks of data) is packaged with an encrypted (i.e. pre-encrypted) version of the content encryption key to form a DRM-protected version of the image. For example, the encrypted version of the image may be packaged with a pre-generated DRM rights object, where the pre-generated DRM rights object comprises a pre-encrypted version of the CEK. The DRM rights object has been pre-generated and stored for access by the app. Thus, the packaged content comprises a DRM-protected version of the image/QR code. The CEK is required for decryption of the encrypted version of the image. The CEK may be encrypted in such a way that it may only be decrypted by a particular DRM client. For example, the CEK may be encrypted using the public key of a particular DRM client. This secures the CEK, and consequently the encrypted content file, against third party access. The DRM client is configured to process the encrypted content file by first decrypting the supplied CEK. In particular, the app may send the DRM-protected QR code to the media player application to thereby cause the media player application to access the DRM client so as to enable rendering of the QR code on the computing device. In an alternative embodiment, it is possible to provide the CEK separately from the encrypted version of the image (i.e. the packaging step is optional). In a further alternative embodiment, provision of the CEK might not be required at all. Instead, the CEK could be the public key of a particular DRM client such that the DRM client is able to decrypt the encrypted version of the image with its own private key.

Thus, in this embodiment, a QR code is generated in the encrypted domain by the app on the device 500. Specifically, the app make selections of the pre-encrypted blocks of data to create a QR code that can be decrypted by the DRM client and displayed on screen. This content construction method avoids use of a whitebox encryption step. This variant provides performance benefits and prevents attacks against the whitebox implementation of an encryption algorithm. As the technique replaces the transformed image generation and encryption step, similar benefits may be provided by applying this technique to any of the preceding applications of the first aspect of the invention. For example, it will be understood that a keypad for passcode entry could be constructed in the encrypted domain according to the present methodology. In this case, the pre-determined sub-images would include digits of the keypad. Fixed sub-images could be used to create the surrounding keypad itself.

In MPEG you can define slices which are areas of a video/image frame. If you align the slices to the sub-images that make up the QR code you can build the QR image by combining slices. Thus, the library of pre-encrypted blocks of data may comprise pre-encrypted I-frame slices, each I-frame slice being an encrypted version of a respective sub-image. For example, if the sub-images are black or white squares, both sub-images (the black one and the white one) may be encoded as I-frame slices. The app then decides which slice to choose. By selecting between the slices and possibly having some fixed slices or slices sent from the server, the app can piece together a complete frame. Thus, each block of data in the ordered sequence of pre-encrypted blocks of data forms a respective slice of an I-frame in the encrypted version of the image.

In one embodiment, each block of data in the library of pre-encrypted blocks of data represents a sub-image of n×m pixels, where n and m are integers. For simplicity, it is preferable that m=n. In a specific embodiment, m=n=16 such that each block of data in the library of pre-encrypted blocks of data represents a sub-image of 16×16 pixels and corresponds to a macro block in the MPEG-2 video encoding format. Hence, each sub-image can be encoded in a macro block of an MPEG-2 video I-frame. In another embodiment, m=n=8 such that each block of data in the library of pre-encrypted blocks of data represents a sub-image of 8×8 pixels and corresponds to a DCT block in the MPEG-2 video encoding format. For other video encoding formats different mappings to pixels might be preferred. The size of the sub-images can be adapted to the video (image) encoding scheme to enable the scan line order and scan line pixel heights. The library contains pre-encrypted versions of the I-frames containing the macro blocks encoding the pixel values in each sub-image. Prior to the pre-encryption step, the I-frame is optionally adjusted to match the requirement of the encryption process. In case of a block cipher, the I-frame is extended to the block size of the encryption algorithm using data that the video rendering process will ignore (so-called 'bit stuffing'). As all encrypted blocks have been pre-encrypted with the same CEK, the app can place a series of blocks in the appropriate scan line order and package it with the pre-encrypted CEK targeted at the local DRM client. It will be understood from the above description that the encrypted version of the image may form part of an encrypted video.

As mentioned previously, the sequence of pre-encrypted blocks of data from the library may be combined with one or more fixed blocks of data, or blocks of data received from the server. Thus, in one embodiment, the method further comprises receiving at least one encrypted block of data from a server. The at least one encrypted block of data corresponds to a respective at least one sub-image of the plurality of sub-images making up the image. The at least one encrypted block of data has been encrypted using the same CEK as the pre-encrypted blocks of data in the library. In this embodiment, the at least one encrypted block of data from the server is combined with the ordered sequence of pre-encrypted blocks of data from the library to form the encrypted version of the image. Alternatively/additionally, the ordered sequence of pre-encrypted blocks of data from the library may comprise at least one fixed block of data at a fixed location in the ordered sequence. Fixed blocks of data may be used to represent the border of a QR code, or the outline of a keypad, for example.

Figure 12C:
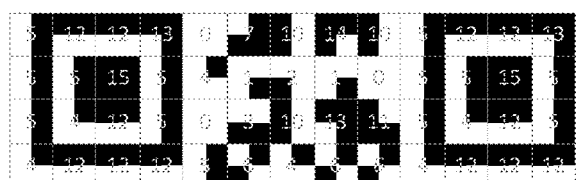
FIGS. 12C and 12D show how the top portion of the QR code of FIG. 12B may be generated from alternative orderings of the sub-images of FIG. 12A.
Figure 12D:
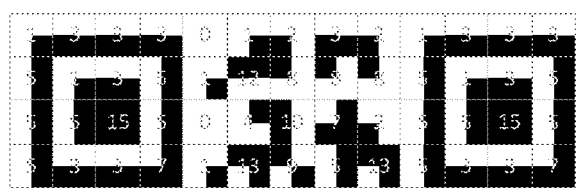

In FIG. 12B, the splitting of the QR code into sub-images starts with the top left of the QR code corresponding to the top left corner of the first sub-image. The same QR code may be split into sub-images in a number of different ways. For example, FIG. 12C shows an alternative where the scan line starts half a block earlier, and FIG. 12D shows a further alternative where the scan line also starts half a block higher up. In each of these alternatives, the initial QR code image may be considered to be slightly different. For example, the QR code image of FIG. 12B has a vertical line of white space on the right hand side, the QR code image of FIG. 12C has a vertical line of white space on the left hand side, and the QR code image of FIG. 12D has a vertical line of white space on the left hand side as well as a horizontal line of white space above the QR code. The various ways of splitting the QR code into sub-images can be used to enable different QR code generation methods. Varying the QR generation process can be useful in securing the QR code generation against whitebox attack scenarios.

Notably, the methodology described above for generating an encrypted version of an image has been particularly described in connection with generating DRM-protected code content (e.g. see the DRM-protected code content 1050 shown in FIG. 10A). However, it will be appreciated that the same methodology may be used in alternative local implementations of the media player embodiment. For example, the methodology may be used to construct DRM-protected challenge content 730 in the local robot avoidance example discussed above with reference to FIG. 7C. Also, the methodology may be used to construct DRM-protected passcode entry content 830 in the local user verification example discussed above with reference to FIG. 8C. In addition, the methodology may be used to construct DRM-protected transaction approval content 930 in the local secure transaction example discussed above with reference to FIG. 9C. In each case, this alternative methodology avoids the use of the white-box encryption modules 746 by instead using a library of pre-encrypted blocks of data. In each case, the library of pre-encrypted blocks of data should be chosen appropriately. For example, when generating DRM-protected passcode entry content 830, the image may comprise a keypad. Thus, the library of pre-encrypted blocks of data should represent sub-images which can be used to construct a suitable keypad. The methodology is only limited by the size of the library. Clearly, a relatively small library is required to construct a QR code (or other binary code), whereas a larger library would be required to construct a coloured image. Thus, the methodology is particularly appropriate for constructing simple images (such as binary black and white images, e.g. QR codes and the like).

Application E: Secure Messaging

Messaging applications on mobile computing devices (such as mobile phones) enable an end user to send a message to the mobile computing device of another end user. Examples of such messaging applications are SMS, Messages, WhatsApp, WeChat, Telegram, Tencent QQ, Facebook Messenger, Viber, Line, and Snapchat. A message can contain text, emoticons, graphics, images, photos, links, audio fragments and/or video fragments. Some messaging applications allow users to send images/photos with the option to prevent the recipient from storing or capturing the received image/photo. Existing applications implement this functionality by deleting (parts of) the message after the first rendering of the content (see, e.g., Snapchat) or after a few seconds. They also take some measures to prevent copying of the rendered message content and to complicate capturing the rendered message with a camera/recorder.

Thus, in this embodiment, there is provided a method for a first software application to access a DRM client (a secured software application) on a computing device. The first software application is not configured to interface with the DRM client. The computing device includes a media player application (an interfacing application) configured to interface with the DRM client. The method comprises: (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content. With reference to secure messaging, the content comprises audio and/or video message content.

In this application example, the first software application 530 is a messaging application. The messaging application interfaces with the media player 625 so as to use the DRM client 615 to display messages by means of the secure video path. It is even possible to use the DRM client's limited number of playbacks or time window to define the time to live of the message. In other words, the DRM-protected content may further comprise a DRM rights object comprising rules for accessing the content, and the DRM client may be configured to provide access to the content in accordance with the rules of the DRM rights object. The rules may specify a total number of times that at least a portion of the content may be rendered on the computing device. The rules may specify a lifetime of at least a portion of the content on the computing device. Other types of DRM rules will be well known to a person skilled in the art and could equally be applied here as appropriate.

Let us now consider methods of generating of the DRM-protected message content.

A new message could be typed using the keypad screen overlay described above with regard to the secure transactions application. Again, this means that the locations of screen presses may be known to an attacker, but these mean nothing without knowledge of the screen overlay (which is protected by the use of the secure video path). Alternatively the messaging application could process the screen presses, convert them into key strokes, refresh the image (of the message), generate the DRM-protected I-frame of the image, and send it back to the secure video path (using the media player 625 and the DRM client 615) to refresh the screen.

Figure 11A:
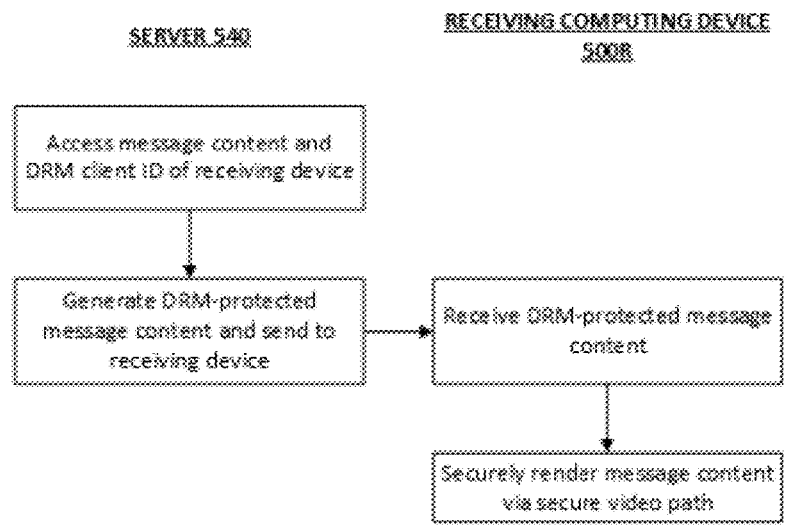
FIG. 11A is a flow chart schematically illustrating a methodology for secure messaging using the media player embodiment of FIG. 6.

In one implementation, the message content and intended recipient(s) are accessible to a messaging server, such as server 540. Thus, with regard to receiving a message, the DRM server 720 on the server 540 is able to package the message content as DRM-protected message content suitable for rendering on the computing device(s) 500 of the intended recipient(s). In particular, the server 540 is able to associate the intended recipient(s) with particular computing device(s) having particular DRM client (s) 615. The first software application 530 on the computing device is then sent the DRM-protected message content (audio, image, video, etc.) and uses the secure video path (i.e. the combination of the media player application 625 and the DRM client 615) to securely render the message content on the computing device 500. The DRM rights object of the DRM-protected message content ensures that the DRM client 615 protects the message content against screen scraping and/or limits the amount of plays for the protected content (for example it can be set to play once only). The methodology of this implementation is schematically illustrated in FIG. 11A, which shows the method steps that are performed by the server and the method steps that are performed by the computing device (i.e. the receiving device 500R).

In another implementation, it is desirable that the messaging server 540 does not have the ability to access a clear text version of the messages that it processes. In other words, it is desirable that the server 540 simply performs message routing between the sending and receiving computing devices 500S and 500R. This implementation requires that a messaging application 1130S on the sending computing device 500S locally generates (at least a part of) the DRM-protected message content. The system architecture for transforming a message into a protected-DRM message content file locally is schematically illustrated in FIG. 11B.

Figure 11B:
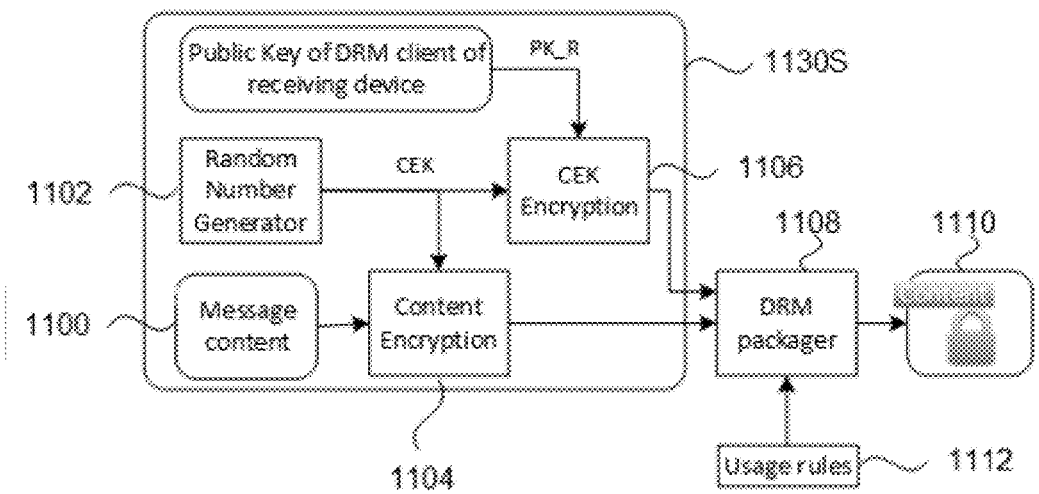
FIG. 11B schematically illustrates one way of generating DRM-protected message content to be used in the implementation of FIG. 11A.

FIG. 11B shows a messaging application 1130S on the sending computing device 500S that wants to send message content 1100 to another messaging application 1120R on the receiving computing device 500R. The public key of the DRM client 615R of the receiving device 500R (i.e. PK_R) is known to the messaging application 1130S on the sending device 500S since the receiving device 500R is a known contact of the sending device 500S. Setting up this type of contact data is known. The messaging application 1130S contains a random number generator 1102 which is used to produce a content encryption key (CEK). The messaging application 1130S also contains a content encryption module 1104 operable to encrypt the message content 1100 using the CEK. As the receiving device 500R needs to be able to recover the message content 1100, it is also necessary to send the CEK to the receiving device 500R. As for the message content 1100, the CEK also needs to be encrypted. Thus, the messaging application 1130S further contains a CEK encryption module 1106 operable to encrypt the CEK using PK_R. This is a relatively standard practice since most DRM systems encrypt the CEK using a public key cryptographic algorithm and the public key associated with the destination device. After these two encryption steps, the message content 1100 is no longer accessible to a third party (such as the messaging server 540). Thus, the encrypted data (i.e. the encrypted message content and the encrypted CEK) may be safely sent to the messaging server 540 without allowing the server 540 to access the clear text message content 540. The server 540 may then forward the encrypted data on to the intended receiving device 500R. Only the intended receiving device 500R is able to decrypt the CEK, which has been encrypted with its own public key (PK_R). Thus, only the intended receiving device 500R is able to decrypt the message content 1100 such that the message content 1100 is secured against rendering by other devices. Clearly, the relevant modules of the messaging application 1130S on the sending device 500S would need to be secured, e.g. by whitebox cryptography and/or software obfuscation, etc. as previously described.

Advantageously, a DRM packager 1108 may be used to package the encrypted data (i.e. the encrypted message content and the encrypted CEK) into DRM-protected message content 1110 in a format suitable for the receiving device 500R. Usage rules 1112 (e.g. in the form of a DRM rights object) and/or DRM authentication codes (AC) (not shown) may also be added DRM-protected message content 1110 as part of the packaging step. As described above, the rules can restrict the receiving device 500R in the rendering of the message content. For example, the rules may state that playback of the message content may only occur a limited number of times (e.g. once) and/or that the rendered message content is protected against copying (e.g. screen scraping). The DRM rights object may need to be authenticated (signed) to enable the processing by only the DRM client 615R in the receiving device 500R. The DRM packager 1108 may be implemented in the messaging server 540 without loss of communication secrecy. Alternatively, the DRM packager 1108 may be implemented in the local sending device 500S if it is configured as an authentic DRM content source. This is dependent on the specifics of the DRM system. With this functionality in the messaging application 1130S, the message content 1100 can be delivered using a legacy messaging infrastructure. As there are several different DRM systems deployed in mobile devices today, the messaging applications would ideally be configured to support multiple DRM content protection systems. The benefits of this approach are that it is harder to intercept messages and that it is more difficult to record or forward the rendered message content.

Figure 11C:
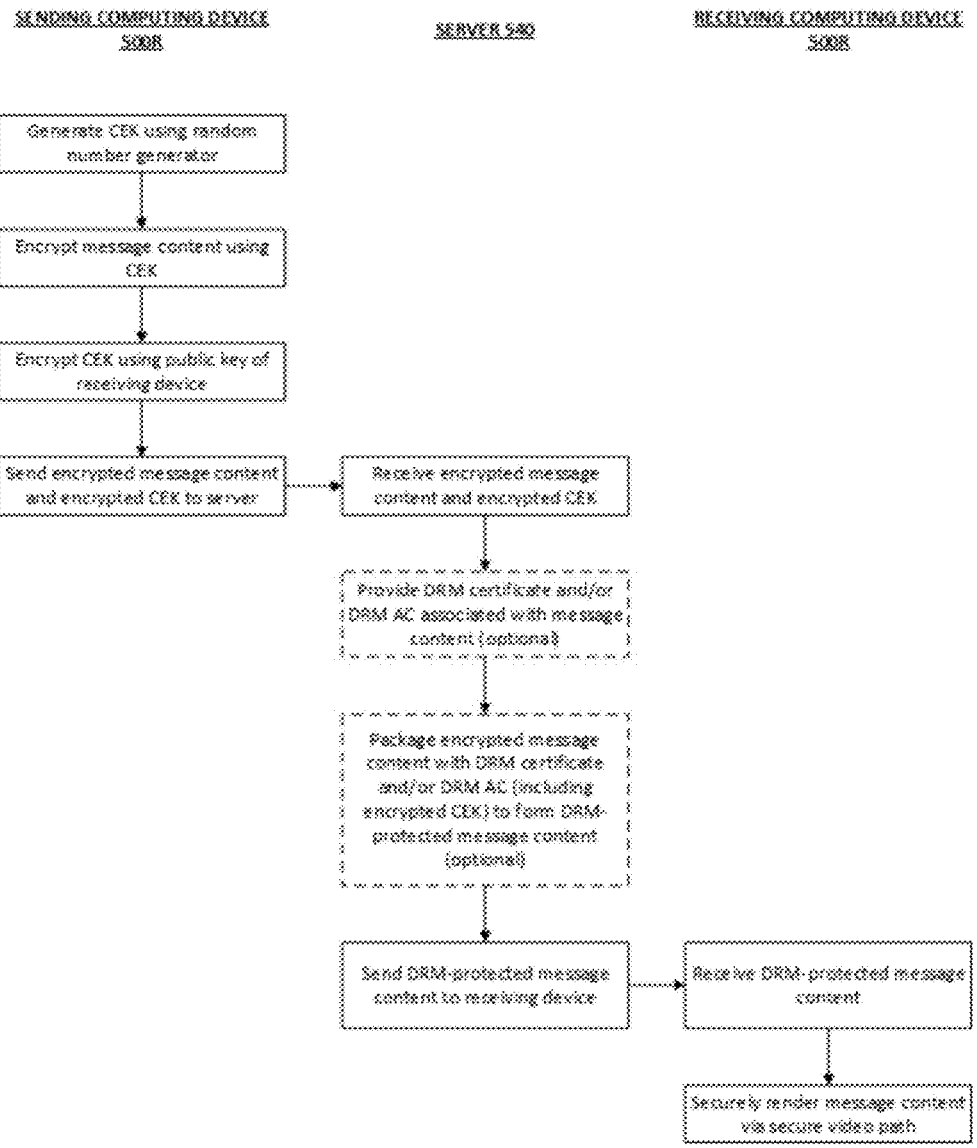
FIG. 11C is a flow chart schematically illustrating the methodology relating to generation and rendering of secured messages based on FIGS. 11A and 11B.

The methodology of the above implementation is schematically illustrated in FIG. 11C, which shows the method steps that are performed by the sending device 500S, the method steps that are performed by the server 540, and the method steps that are performed by the receiving device 500R. In the embodiment shown in FIG. 11C, it is the server 540 which includes the DRM packager 1108. However, as described above, this is optional. The DRM packager may potentially be excluded (dependent on the format of encrypted data processible in the receiving device 500R), or may form part of the sending device 500S.

Figure 11D:
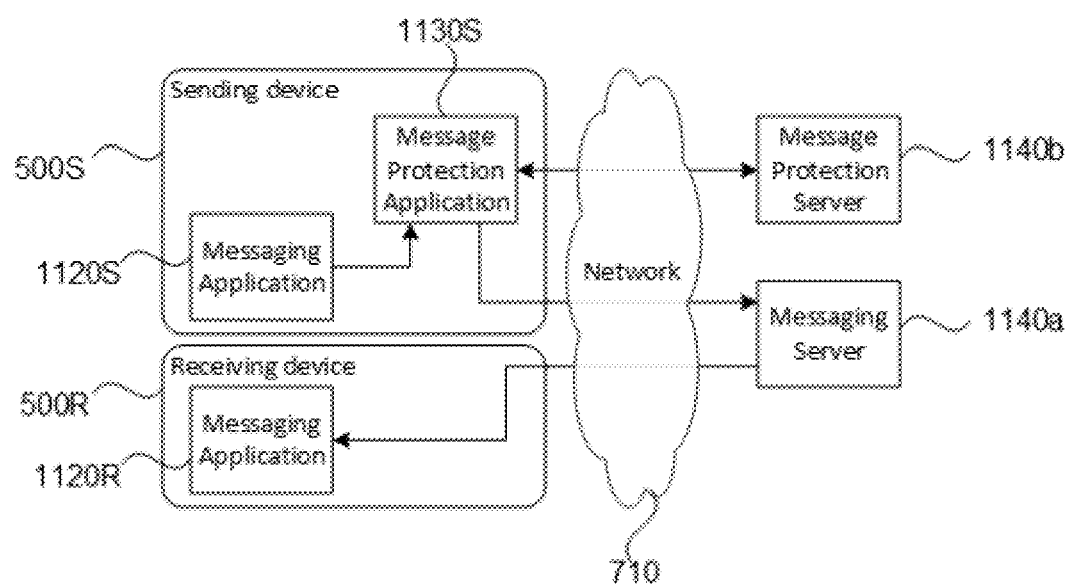
FIG. 11D schematically illustrates another way of generating DRM-protected message content to be used in the implementation of FIG. 11A.

The implementation described above with reference to FIGS. 11B and 11C relates to a situation where all the content encryption is performed within the messaging application 1130S and using the messaging infrastructure. However, as illustrated in FIG. 11D, it is also possible to make use of a separate message protection application 1130S in the sending device 500S to perform the content encryption. This enables end users to add content security features independently from the messaging application provider. Note that existing messaging platforms cannot restrict playback, copying and forwarding of message content. In contrast, the separate message protection application 1130 and the associated infrastructure described with respect to the embodiment of FIG. 11D supports adding a broad range of message protection functions to messaging applications.

FIG. 11D shows a sending device 500S comprising a messaging application 1120S and a message protection application 1130S. The message is sent via a network 710 and a messaging server 1140a to a receiving device 500R. The receiving device 500R itself include a messaging application 1120R corresponding to the messaging application 1120S of the sending device 500S.

The messaging application 1120S on the sending device 500S produces the message content 1100. However, the message protection application 1130 interfaces with the messaging application 1120S to receive the message content and to encrypt it into DRM-protected message content. This may be done in a manner similar to the generation of the DRM-protected message content 1110 shown in FIG. 11B. This may be done locally, or in conjunction with a message protection server 1140b to which the message protection application 1130S is connected over the network 710. Once the data has been encrypted, the message protection application 1130 forwards the DRM-protected message content to the messaging application 1120R of the receiving device 500R using the messaging infrastructure (namely the network 720 and the messaging server 1140b). Thus, the messaging application 1120R receives the DRM-protected message content at the receiving device 500R. Preferably, the messaging application 1120R of the receiving device 500R may then use the methodology of FIG. 11A to securely render the received message content on the receiving device 500R.

Note that the message protection application 1130S can include multiple encrypted CEKs to cover multiple receiving devices 500R associated with an end user. The message protection application 1130S can have settings to enable or exclude some of these receiving devices 500R. The message protection application 1130S also enables the user to configure the usage rules controlling the rendering of the message content on particular receiving devices 500R.

If the receiving device 500R does not have a message protection application installed (as in FIG. 11D), the public key for the receiving device 500R (PK_R) may be provided to the sending device 500S by the message protection server 1140b. Thus, the message protection server 1140b comprises a database to enable the destination address of a particular message to be mapped to the DRM client ID and the associated DRM public key (PK_R) of the receiving device 500R. If the relevant portion of the database is not populated (i.e. if the mapping information is not immediately available for a particular destination address), then the message protection application 1130S may encrypt the message content with the CEK, but may not encrypt the CEK with the relevant PK_R. Furthermore, the message protection application 1130S is not able to construct the DRM rights object until the receiving device 500R enables the message protection server 1130S to obtain the relevant DRM parameters. One way of obtaining these parameters is for the message protection application 1130S to send the message with a request to contact the message protection server 1140b and provide the required DRM parameters. After the DRM parameters for the receiving device 500R have been provided to the message protection server 1140b, the message protection infrastructure (i.e. the message protection server 1140b and the message protection application 1130S) are able to construct and provide the appropriate DRM rights object for rendering the message content.

These secure messaging applications of the media player embodiment are particularly relevant to mobile computing devices having touchscreens, such as smart phones and tablets and the like.

Application F: Secure Document Editing

In this application example, the first software application 530 is a document editing application. The document editing application interfaces with the media player 625 so as to use the DRM client 615 to display documents by means of the secure video path. The keystrokes on the keyboard are performed as per usual in this embodiment to allow for natural typing. However, the attacker would only see the changes made locally by the user and not the entire document. Again, either the creation of the user feedback is done by creating a video sequence from the cloud for the changes to the screen, or the document editing application processes the key inputs and creates a packaged DRM file that is displayed on the screen. Again DRM time windows can be applied to manage access. Additionally the associated rights objects may be required each time a document is opened—this enables very fine logging of access to sensitive files.

Application G: Secure Video Conferencing

In this application example, the first software application 530 is a video conferencing application. The video conferencing application interfaces with the media player 625 so as to use the DRM client 615 to display a received video conferencing feed/stream by means of the secure video path. The received video and/or audio may be securely displayed in this manner. This prevents an attacker from observing the video and/or audio content of the video conference.

Application H: Integrity of Display

In this application example, the first software application 530 is a software application which aims to display particular content to a user. The first software application 530 interfaces with the media player 625 so as to use the DRM client 615 to display the content by means of the secure video path. Since an attacker is unable to observe the securely displayed content, it is difficult for an attacker to modify the observed content in a minor way without alerting the user.

For example, the displayed content may include a shared secret (e.g. a particular colour scheme, layout, photograph, icon, or the like) which is known only to a provider of the first software application 530 (e.g. the service provider 540) and the user of the first software application, and any modification of the display by a user will not necessarily be able to ensure the integrity of display of the shared secret.

Another example relates to the secure banking application described above. In this case, it is possible to securely display content including, for example, a transaction amount to be verified by the user, and an "OK" button (or the like) which the user may press once they are satisfied that the displayed transaction amount is correct. An attacker would find it difficult to overlay an alternative transaction amount on the display (such that the user unintentionally authorises a much larger transaction than intended) without knowledge of the layout of the content. For example, the button and the verification amount may be displayed in random locations on the screen.

One further example of this integrity of display application relates to display of webpages. Webpages often include authorised advertisements, and attackers may aim to overlay the authorised adverts with alternative (unauthorised) adverts. In this example, the first software application 530 enables display of a webpage (i.e. the content is a webpage). The first software application 530 interfaces with the media player 625 so as to use the DRM client 615 to display the webpage by means of the secure video path. In other words, the webpage is rendered as a secured video or still image. This makes it impossible for an attacker to overlay adverts on the webpage in a way that will not interfere with the actual content of the webpage. In particular, since an attacker cannot observe the layout of the webpage (which may include an advertisement area for display of authorised advert), the attacker does not know the location of the advertisement area on the webpage so is unable to place their own (unauthorised) advert over the authorised advert(s). Thus, there is much less chance of the authorised adverts (or other authorised content) being overlaid without the knowledge of a user.

5—User Input Embodiment

In some embodiments, the computing device 500 may comprise an input device for obtaining a user input. For example, the input device may comprise the mouse 126 and/or the keyboard 124 of FIG. 1. The input device may alternatively/additionally comprise a fingerprint sensor, a touchscreen, a camera, a microphone, and/or a keypad. In such cases, the secured software application 615 may be configured to securely obtain the user input from the input device. The secured software application 615 may further be configured to prevent other software applications on the computing device from accessing the user input obtained from the input device. Thus, the first software application 530 interfaces with the interfacing application 625 to thereby cause the interfacing application 625 to access the secured software application 615 so as to securely obtain the user input from the input device. This embodiment protects the user input against snooping by other software applications on the computing device 500.

6—Modifications

It will be appreciated that features and steps of the above described embodiments and implementations of the invention may be combined unless such combinations are explicitly disclaimed in the description.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
   (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
   (b) receiving a user input from the input device in response to the rendering of the content on the computing device; and
   (c) comparing the received user input with the associated predetermined response so as to verify whether the first software application is interacting with a human end user;
   wherein the DRM client is configured to securely receive the user input from the input device such that the method comprises the first software application interfacing with the media player application to thereby cause the media player application to access the DRM client so as to securely receive the user input from the input device, the DRM client being configured to prevent other software applications on the computing device from accessing the user input received from the input device.

2. The method of claim 1 wherein the DRM client is only accessible via one or more predetermined access applications, the one or more predetermined access applications including the media player application but not including the first software application.

3. The method of claim 1 wherein the DRM-protected content comprises a shared secret known by a provider of the first software application and by a user of the first software application.

4. The method of claim 1 wherein one or both of:
   the DRM-protected content comprises audio content and the DRM client is configured to prevent other software applications on the computing device from obtaining a recording of the audio content when rendered using a speaker of the computing device; and
   the DRM-protected content comprises image content and the DRM client is configured to prevent other software applications on the computing device from obtaining a screenshot of the image content when rendered on a screen of the computing device.

5. The method of claim 1 wherein the input device is one of a fingerprint sensor, a touchscreen, a camera, a microphone, a mouse, and a keypad.

6. The method of claim 1 wherein the DRM client is secured by means of software obfuscation and/or node-locking and/or isolation provided by the computing device operating system and/or secure loading by the computing device operating system.

7. The method of claim 1 wherein the step (b) is performed by the first software application.

8. The method of claim 7 wherein the step (c) is performed by a server;
   wherein the method further comprises the first software application receiving the DRM-protected content from the server;
   wherein the method further comprises the first software application sending data associated with the DRM client to the server for use in generating the DRM-protected content;
   wherein the method further comprises the first software application sending to the server the received user input, and the first software application receiving a verification message from the server, wherein the verification message is based on the comparing the received user input with the associated predetermined response;
   wherein the method further comprises the first software application sending to the server identification information associated with a user of the computing device for use in generating the DRM-protected content; and
   wherein the verification message is further based on said identification information.

9. The method of claim 1, wherein the DRM-protected content comprises video content including said image content.

10. A method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:

(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video passcode entry content;

(b) requesting a user input of a passcode associated with a particular user ID;

(c) receiving the user input from the input device in response to the rendering of the content on the computing device;

(d) mapping the received user input to an input passcode, wherein said mapping requires access to the passcode entry content; and (e) comparing the input passcode with the passcode associated with the particular user ID so as to verify whether the first software application is interacting with the user having that particular user ID;

wherein the DRM client is configured to securely receive the user input from the input device such that the method comprises the first software application interfacing with the media player application to thereby cause the media player application to access the DRM client so as to securely receive the user input from the input device, the DRM client being configured to prevent other software applications on the computing device from accessing the user input received from the input device.

11. The method of claim 10 wherein the content further comprises audio and/or video content representing the request for user input of the passcode associated with the particular user ID such that steps (a) and (b) are performed concurrently.

12. The method of claim 11 wherein the steps (d) and (e) are performed by the first software application.

13. The method of claim 11 wherein the steps (d) and (e) are performed by a server.

14. The method of claim 10 wherein the steps (d) and (e) are performed by the first software application.

15. The method of claim 10 wherein the steps (d) and (e) are performed by a server.

16. The method of claim 10, wherein one or both of:
the passcode entry content includes an image comprising a set of characters such that locations of inputs by the user in the user input are associated with corresponding characters, wherein locations of the characters in the image are randomly assigned such that a software application monitoring the locations of inputs by the user is unable to determine the corresponding characters without access to the image; and
the passcode entry content includes a video displaying a set of characters at different times such that timings of inputs by the user are associated with corresponding characters, wherein timings of the characters in the video are randomly assigned such that a software application monitoring the timings of inputs by the user is unable to determine the corresponding characters without access to the video.

17. The method of claim 10 wherein the DRM client is only accessible via one or more predetermined access applications, the one or more predetermined access applications including the media player application but not including the first software application.

18. The method of claim 10 wherein the DRM-protected content comprises a shared secret known by a provider of the first software application and by a user of the first software application.

19. The method of claim 10 wherein one or both of:
the DRM-protected content comprises audio content and the DRM client is configured to prevent other software applications on the computing device from obtaining a recording of the audio content when rendered using a speaker of the computing device; and
the DRM-protected content comprises image content and the DRM client is configured to prevent other software applications on the computing device from obtaining a screenshot of the image content when rendered on a screen of the computing device.

20. The method of claim 10 wherein the input device is one of a fingerprint sensor, a touchscreen, a camera, a microphone, a mouse, and a keypad.

21. The method of claim 10 wherein the DRM client is secured by means of software obfuscation and/or node-locking and/or isolation provided by the computing device operating system and/or secure loading by the computing device operating system.

22. The method of claim 10, wherein the DRM-protected content comprises video content including said image content.

23. An apparatus for allowing a first software application to access a Digital Rights Management (DRM) client on a computing device, the computing device comprising an input device for receiving a user input, the first software application not being configured to interface with the DRM client, the computing device including a media player application configured to interface with the DRM client, the apparatus comprising:

at least one computer processor; and
at least one memory operatively coupled to the at least one computer processor and storing instructions which, when executed by the at least one computer processor, cause the at least one processor to:

(a) cause the first software application to send DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;

(b) receive a user input from the input device in response to the rendering of the content on the computing device; and (c) compare the received user input with the associated predetermined response so as to verify whether the first software application is interacting with a human end user;

wherein the DRM client is configured to securely receive the user input from the input device such that the first software application interfaces with the media player application to thereby cause the media player application to access the DRM client so as to securely receive the user input from the input device, the DRM client being configured to prevent other software applications on the computing device from accessing the user input received from the input device.

24. Non-transient computer-readable media having instructions stored thereon which, when executed by the at least one computer processor, cause the at least one computer processor to execute a method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
    (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
    (b) receiving a user input from the input device in response to the rendering of the content on the computing device; and
    (c) comparing the received user input with the associated predetermined response so as to verify whether the first software application is interacting with a human end user;
    wherein the DRM client is configured to securely receive the user input from the input device such that the method comprises the first software application interfacing with the media player application to thereby cause the media player application to access the DRM client so as to securely receive the user input from the input device, the DRM client being configured to prevent other software applications on the computing device from accessing the user input received from the input device.

25. An apparatus for allowing a first software application to access a Digital Rights Management (DRM) client on a computing device, the computing device comprising an input device for receiving a user input, the first software application not being configured to interface with the DRM client, the computing device including a media player application configured to interface with the DRM client, the apparatus comprising:
    at least one computer processor; and
    at least one memory operatively coupled to the at least one computer processor and storing instructions which, when executed by the at least one computer processor, cause the at least one processor to:
        (a) cause the first software application to send DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video passcode entry content;
        (b) request a user input of a passcode associated with a particular user ID;
        (c) receive the user input from the input device in response to the rendering of the content on the computing device;
        (d) map the received user input to an input passcode, wherein said mapping requires access to the passcode entry content; and
        (e) compare the input passcode with the passcode associated with the particular user ID so as to verify whether the first software application is interacting with the user having that particular user ID;
    wherein the DRM client is configured to securely receive the user input from the input device such that the first software application interfaces with the media player application to thereby cause the media player application to access the DRM client so as to securely receive the user input from the input device, the DRM client being configured to prevent other software applications on the computing device from accessing the user input received from the input device.

26. Non-transient computer-readable media having instructions stored thereon which, when executed by the at least one computer processor, cause the at least one computer processor to execute a method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
    (a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video passcode entry content;
    (b) requesting a user input of a passcode associated with a particular user ID;
    (c) receiving the user input from the input device in response to the rendering of the content on the computing device;
    (d) mapping the received user input to an input passcode, wherein said mapping requires access to the passcode entry content; and
    (e) comparing the input passcode with the passcode associated with the particular user ID so as to verify whether the first software application is interacting with the user having that particular user ID;
    wherein the DRM client is configured to securely receive the user input from the input device such that the method comprises the first software application interfacing with the media player application to thereby cause the media player application to access the DRM client so as to securely receive the user input from the input device, the DRM client being configured to prevent other software applications on the computing device from accessing the user input received from the input device.

27. A method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
(b) receiving a user input from the input device in response to the rendering of the content on the computing device; and
(c) comparing the received user input with the associated predetermined response so as to verify whether the first software application is interacting with a human end user;
wherein the step (c) is performed by a server;
wherein the method further comprises the first software application receiving the DRM-protected content from the server;
wherein the method further comprises the first software application sending data associated with the DRM client to the server for use in generating the DRM-protected content;
wherein the method further comprises the first software application sending to the server the received user input, and the first software application receiving a verification message from the server, wherein the verification message is based on the comparing the received user input with the associated predetermined response;
wherein the method further comprises the first software application sending to the server identification information associated with a user of the computing device for use in generating the DRM-protected content; and
wherein the verification message is further based on said identification information.

28. A method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
(b) receiving a user input from the input device in response to the rendering of the content on the computing device; and
(c) comparing the received user input with the associated predetermined response so as to verify whether the first software application is interacting with a human end user;
wherein the step (c) is performed by the first software application;
wherein the method further comprises the first software application generating the DRM-protected content by means of secured software code that is resistant against whitebox attacks;
wherein the secured software code is secured by means of software obfuscation;
wherein the secured software code is configured to generate or select content to be DRM-protected, and to encrypt the content, thereby generating the DRM-encrypted content;
wherein the content is encrypted using a whitebox encryption module;
wherein data associated with the DRM client is used in encrypting the content;
wherein the secured software code is configured to encrypt the content using a content encryption key, and the secured software code is configured to package the encrypted content with the content encryption key to generate the DRM-protected content; and
wherein the secured software code is further configured to perform the step (c).

29. An apparatus for allowing a first software application to access a Digital Rights Management (DRM) client on a computing device, the computing device comprising an input device for receiving a user input, the first software application not being configured to interface with the DRM client, the computing device including a media player application configured to interface with the DRM client, the apparatus comprising:
at least one computer processor; and
at least one memory operatively coupled to the at least one computer processor and storing instructions which, when executed by the at least one computer processor, cause the at least one processor to carryout the method comprising the steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
(b) receiving a user input from the input device in response to the rendering of the content on the computing device; and
(c) comparing the received user input with the associated predetermined response so as to verify whether the first software application is interacting with a human end user;
wherein the step (c) is performed by a server;
wherein the method further comprises the first software application receiving the DRM-protected content from the server;
wherein the method further comprises the first software application sending data associated with the DRM client to the server for use in generating the DRM-protected content;
wherein the method further comprises the first software application sending to the server the received user input, and the first software application receiving a verification message from the server, wherein the verification message is based on the comparing the received user input with the associated predetermined response;

wherein the method further comprises the first software application sending to the server identification information associated with a user of the computing device for use in generating the DRM-protected content; and wherein the verification message is further based on said identification information.

30. An apparatus for allowing a first software application to access a Digital Rights Management (DRM) client on a computing device, the computing device comprising an input device for receiving a user input, the first software application not being configured to interface with the DRM client, the computing device including a media player application configured to interface with the DRM client, the apparatus comprising:
at least one computer processor; and
at least one memory operatively coupled to the at least one computer processor and storing instructions which, when executed by the at least one computer processor, cause the at least one processor to carryout the method comprising the steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
(b) receiving a user input from the input device in response to the rendering of the content on the computing device; and
(c) comparing the received user input with the associated predetermined response so as to verify whether the first software application is interacting with a human end user;
wherein the step (c) is performed by the first software application;
wherein the method further comprises the first software application generating the DRM-protected content by means of secured software code that is resistant against whitebox attacks;
wherein the secured software code is secured by means of software obfuscation;
wherein the secured software code is configured to generate or select content to be DRM-protected, and to encrypt the content, thereby generating the DRM-encrypted content;
wherein the content is encrypted using a whitebox encryption module;
wherein data associated with the DRM client is used in encrypting the content;
wherein the secured software code is configured to encrypt the content using a content encryption key, and the secured software code is configured to package the encrypted content with the content encryption key to generate the DRM-protected content; and
wherein the secured software code is further configured to perform the step (c).

31. Non-transient computer-readable media having instructions stored thereon which, when executed by the at least one computer processor, cause the at least one computer processor to execute a method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;
(b) receiving a user input from the input device in response to the rendering of the content on the computing device; and
(c) comparing the received user input with the associated predetermined response so as to verify whether the first software application is interacting with a human end user;
wherein the step (c) is performed by a server;
wherein the method further comprises the first software application receiving the DRM-protected content from the server;
wherein the method further comprises the first software application sending data associated with the DRM client to the server for use in generating the DRM-protected content;
wherein the method further comprises the first software application sending to the server the received user input, and the first software application receiving a verification message from the server, wherein the verification message is based on the comparing the received user input with the associated predetermined response;
wherein the method further comprises the first software application sending to the server identification information associated with a user of the computing device for use in generating the DRM-protected content; and
wherein the verification message is further based on said identification information.

32. Non-transient computer-readable media having instructions stored thereon which, when executed by the at least one computer processor, cause the at least one computer processor to execute a method for a first software application to access a Digital Rights Management (DRM) client on a computing device, the computing device comprising an input device for receiving a user input, the first software application not being configured to interface with the DRM client, the computing device including a media player application configured to interface with the DRM client, the method comprising steps of:
(a) the first software application sending DRM-protected content to the media player application to thereby cause the media player application to access the DRM client so as to enable rendering of the content on the computing device, wherein the DRM client is configured to prevent and/or restrict other software applications executing on the computing device from accessing the content, and wherein the content comprises audio and/or video challenge content comprising a challenge having an associated predetermined response;

(b) receiving a user input from the input device in response to the rendering of the content on the computing device; and
(c) comparing the received user input with the associated predetermined response so as to verify whether the first software application is interacting with a human end user;
wherein the step (c) is performed by the first software application;
wherein the method further comprises the first software application generating the DRM-protected content by means of secured software code that is resistant against whitebox attacks;
wherein the secured software code is secured by means of software obfuscation;
wherein the secured software code is configured to generate or select content to be DRM-protected, and to encrypt the content, thereby generating the DRM-encrypted content;
wherein the content is encrypted using a whitebox encryption module;
wherein data associated with the DRM client is used in encrypting the content;
wherein the secured software code is configured to encrypt the content using a content encryption key, and the secured software code is configured to package the encrypted content with the content encryption key to generate the DRM-protected content; and
wherein the secured software code is further configured to perform the step (c).

* * * * *